(12) United States Patent
Shin et al.

(10) Patent No.: US 12,417,764 B2
(45) Date of Patent: Sep. 16, 2025

(54) METHOD AND APPARATUS FOR PROVIDING VOICE ASSISTANT SERVICE

(71) Applicant: Samsung Electronics Co., Ltd., Suwon-si (KR)

(72) Inventors: Jaesick Shin, Suwon-si (KR); Sungho Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 17/248,859

(22) Filed: Feb. 10, 2021

(65) Prior Publication Data

US 2021/0249018 A1    Aug. 12, 2021

(30) Foreign Application Priority Data

Feb. 10, 2020 (KR) .................. 10-2020-0015837
Oct. 6, 2020 (KR) .................. 10-2020-0128879

(51) Int. Cl.
*G10L 15/22* (2006.01)
*G10L 15/16* (2006.01)
(Continued)

(52) U.S. Cl.
CPC .............. *G10L 15/22* (2013.01); *G10L 15/16* (2013.01); *G10L 15/18* (2013.01); *G10L 15/26* (2013.01)

(58) Field of Classification Search
CPC ......... G10L 15/00; G10L 15/16; G10L 15/18; G10L 15/22; G10L 15/26
See application file for complete search history.

(56) References Cited

U.S. PATENT DOCUMENTS 9,930,519 B2   3/2018   Kim et al.
10,521,723 B2  12/2019  Iwang et al.
(Continued)

FOREIGN PATENT DOCUMENTS

KR   10-2014-0089871 A   7/2014
KR   10-2015-0059081 A   5/2015
(Continued)

OTHER PUBLICATIONS

Notification of Transmittal of the International Search Report and the Written Opinion of the International Searching Authority, or the Declaration dated May 17, 2021 in connection with International Patent Application No. PCT/KR2021/001573, 9 pages.
(Continued)

*Primary Examiner* — Daniel C Washburn
*Assistant Examiner* — Sean E Serraguard

(57) ABSTRACT

A method of providing a voice assistant service includes receiving a first voice command from a user. The method includes determining, from among a plurality of candidate devices, a plurality of devices that the first voice command is to be transmitted. The method includes transmitting information related to the first voice command to the plurality of devices. The method includes receiving, from the plurality of devices, a plurality of service provision messages generated in response to the first voice command and a plurality of pieces of service provision history information of the plurality of devices. The method includes selecting, based on the pieces of service provision history information, at least one of the plurality of service provision messages. The method includes outputting, based on the selected at least one service provision message, a response message in response to the first voice command.

20 Claims, 20 Drawing Sheets

(51) Int. Cl.
  *G10L 15/18* (2013.01)
  *G10L 15/26* (2006.01)

(56) References Cited

U.S. PATENT DOCUMENTS

| | | | |
|---|---|---|---|
| 10,685,669 B1* | 6/2020 | Lan | G10L 15/1822 |
| 10,891,968 B2 | 1/2021 | Chung et al. | |
| 2003/0185358 A1* | 10/2003 | Sakamoto | G10L 15/26 704/E15.045 |
| 2015/0140990 A1* | 5/2015 | Kim | H04W 8/186 455/418 |
| 2016/0088419 A1* | 3/2016 | Annapureddy | H04W 4/60 455/414.1 |
| 2017/0097618 A1 | 4/2017 | Cipollo et al. | |
| 2018/0293484 A1* | 10/2018 | Wang | G06F 16/632 |
| 2018/0322881 A1* | 11/2018 | Min | G10L 15/32 |
| 2019/0028549 A1* | 1/2019 | Ledvina | H04Q 9/00 |
| 2019/0066670 A1* | 2/2019 | White | G10L 15/28 |
| 2019/0222540 A1* | 7/2019 | Relangi | H04M 3/42042 |
| 2019/0324925 A1* | 10/2019 | Toyoda | G06F 13/102 |
| 2019/0362718 A1* | 11/2019 | Bhargava | G10L 15/1815 |
| 2020/0304445 A1 | 9/2020 | Dinhthi et al. | |
| 2020/0341804 A1* | 10/2020 | Rakshit | G06N 5/02 |
| 2020/0402502 A1* | 12/2020 | Hanes | G06F 3/167 |
| 2021/0049899 A1 | 2/2021 | Shin et al. | |
| 2023/0040394 A1* | 2/2023 | Colafrancesco | G10L 15/22 |

FOREIGN PATENT DOCUMENTS

| | | |
|---|---|---|
| KR | 10-2018-0068850 A | 6/2018 |
| KR | 10-2019-0058918 A | 5/2019 |
| KR | 10-2019-0141109 A | 12/2019 |
| WO | 2017171204 A1 | 10/2017 |
| WO | 2017/222503 A1 | 12/2017 |

OTHER PUBLICATIONS

Supplementary European Search Report dated Dec. 2, 2022 in connection with European Patent Application No. 21 75 3945.1, 8 pages.

Communication pursuant to Article 94(3) EPC issued Nov. 26, 2024, in connection with European Patent Application No. 21753945.1, 7 pages.

Communication pursuant to Article 94(3) EPC dated Jun. 25, 2025, in connection with European Application No. 21753945.1, 8 pages.

* cited by examiner

| DEVICE | SERVICE PROVISION MESSAGE |
|---|---|
|  | GROUP ID/DEVICE ID/SERVICE CATEGORY/SERVICE ID/APPLICATION ID/RESULTING TEXT |
| DEVICE 1 (TV) | (I'M HUNGRY/WHAT/SHOULD I EAT)/ DEVICE 1/NOTIFICATION/SERVICE 1/APPLICATION 1/ "THERE IS POPULAR RESTAURANT NEARBY, AS SEEN ON TV." |
| DEVICE 2 (AIR CONDITIONER) |  |
| DEVICE 3 (REFRIGERATOR) | (I'M HUNGRY/WHAT/SHOULD I EAT)/ DEVICE 3/NOTIFICATION/ SERVICE 3/APPLICATION 4/" REFRIGERATOR IS EMPTY." |
| DEVICE 4 (SMARTPHONE) | (I'M HUNGRY/WHAT/SHOULD I EAT)/ DEVICE 4/NOTIFICATION/ SERVICE 5/APPLICATION 3/"MAY I ORDER PORK BELLY FOR DELIVERY?" |

902

| SERVICE PROVISION HISTORY INFORMATION |||||
|---|---|---|---|---|
| DEVICE | isSupported | PICK COUNT | NO PICK COUNT | LOCATION INFORMATION | TIME INFORMATION |
| DEVICE 1 (TV) | YES | 4 | 6 | LIVING ROOM | 22:30 |
| DEVICE 2 (AIR CONDITIONER) | NO | 0 | 0 | LIVING ROOM | 18:30 |
| DEVICE 3 (REFRIGERATOR) | YES | 1 | 8 | KITCHEN | 18:00 |
| DEVICE 4 (SMARTPHONE) | YES | 5 | 4 | LIVING ROOM | 22:30 |

903

| DEVICE INFORMATION ||||||||
|---|---|---|---|---|---|---|
| DEVICE | DISPLAY | SPEAKER | MICROPHONE | TOUCH SCREEN | DEVICE SPECIFICATIONS |
| DEVICE 1 (TV) | YES | YES | YES | NO | TV PROGRAM INFORMATION |
| DEVICE 2 (AIR CONDITIONER) | NO | YES | YES | YES | TEMPERATURE, HUMIDITY, DUST INFORMATION |
| DEVICE 3 (REFRIGERATOR) | YES | YES | YES | YES | FOOD INFORMATION |
| DEVICE 4 (SMARTPHONE) | YES | YES | YES | YES | USER RELATED INFORMATION |

METHOD AND APPARATUS FOR PROVIDING VOICE ASSISTANT SERVICE

CROSS-REFERENCE TO RELATED APPLICATIONS

This application is based on and claims priority under 35 U.S.C. § 119 to Korean Patent Application Nos. 10-2020-0015837, filed on Feb. 10, 2020 and 10-2020-0128879, filed on Oct. 6, 2020, in the Korean Intellectual Property Office, the disclosures of which are incorporated by reference herein in their entirety.

BACKGROUND

1. Field

The disclosure relates to methods and apparatuses for providing a voice assistant service, and more particularly, to methods and apparatuses for providing a voice assistant service whereby at least one service is recommended among services that a plurality of devices are able to provide.

2. Description of Related Art

With recent developments in electronic devices, such as smartphones, for performing various functions in a complex manner, electronic devices capable of speech recognition have been launched to improve operability.

A speech recognition technology may be applied to a conversational user interface for outputting a response message to a question input by a user's voice in an everyday, natural language to provide a user-friendly conversational service. The conversational user interface refers to an intelligent user interface that operates by talking in a user's language.

For example, electronic devices such as smartphones, computers, personal digital assistants (PDAs), portable multimedia players (PMPs), smart home appliances, navigation devices, wearable devices, etc., may provide conversational services by connecting to a server or executing an application.

Furthermore, with the advancement in artificial intelligence (AI) technology, the AI technology has also been applied to a speech recognition function to enable quick, accurate speech recognition for various utterances. An AI system is a computer system that implements human-level intelligence and enables machines to become smart by learning and making decisions on their own, compared to an existing rule-based smart system. Because the AI system improves its recognition rates and is capable of understanding a user's preferences more accurately through experience, existing rule-based smart systems are increasingly being replaced by deep learning-based AI systems.

SUMMARY

As more devices are capable of providing conversational services with their speech recognition function, the number and types of services that the devices are able to provide to a user have increased and become more diverse. Accordingly, in order to select and receive a desired service, a user is inconvenienced in having to fully know and utter a number of commands associated with each device.

Additional aspects will be set forth in part in the description which follows and, in part, will be apparent from the description, or may be learned by practice of the presented embodiments of the disclosure.

To solve this problem, according to various embodiments of the disclosure, provided is a method by which a voice assistant service providing apparatus connected to a plurality of devices classifies the devices into groups according to capabilities of the devices in response to a user's voice command, selects an optimal service from among services that a group of devices are able to provide, and suggests the optimal service to the user.

According to an embodiment of the disclosure, a method of providing a voice assistant service includes: receiving a first voice command from a user; determining, from among a plurality of candidate devices, a plurality of devices to which the first voice command is to be transmitted; transmitting information related to the first voice command to the plurality of devices; respectively receiving, from the plurality of devices, a plurality of service provision messages generated in response to the first voice command and a plurality of pieces of service provision history information of the plurality of devices; selecting, based on the plurality of pieces of service provision history information, at least one of the plurality of service provision messages; and outputting, based on the selected at least one service provision message, a response message in response to the first voice command.

According to another embodiment of the disclosure, an apparatus for providing a voice assistant service includes: a receiver configured to receive a voice command from a user; a communicator; a memory storing one or more instructions; at least one processor configured to run a voice assistant program by executing the one or more instructions to: control the receiver to receive a first voice command from the user; determine, from among a plurality of candidate devices, a plurality of devices to which the first voice command is to be transmitted; control the communicator to transmit information related to the first voice command to the plurality of devices and respectively receive, from the plurality of devices, a plurality of service provision messages generated in response to the first voice command and a plurality of pieces of service provision history information of the plurality of devices; select, based on the plurality of pieces of service provision history information, at least one of the plurality of service provision messages; and output, based on a result of the selecting, a response message in response to the first voice command.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 9 illustrates examples of a service provision message, service provision history information, and device information received by a voice assistant service providing apparatus, according to an embodiment of the disclosure;

DETAILED DESCRIPTION

Figure 1A:
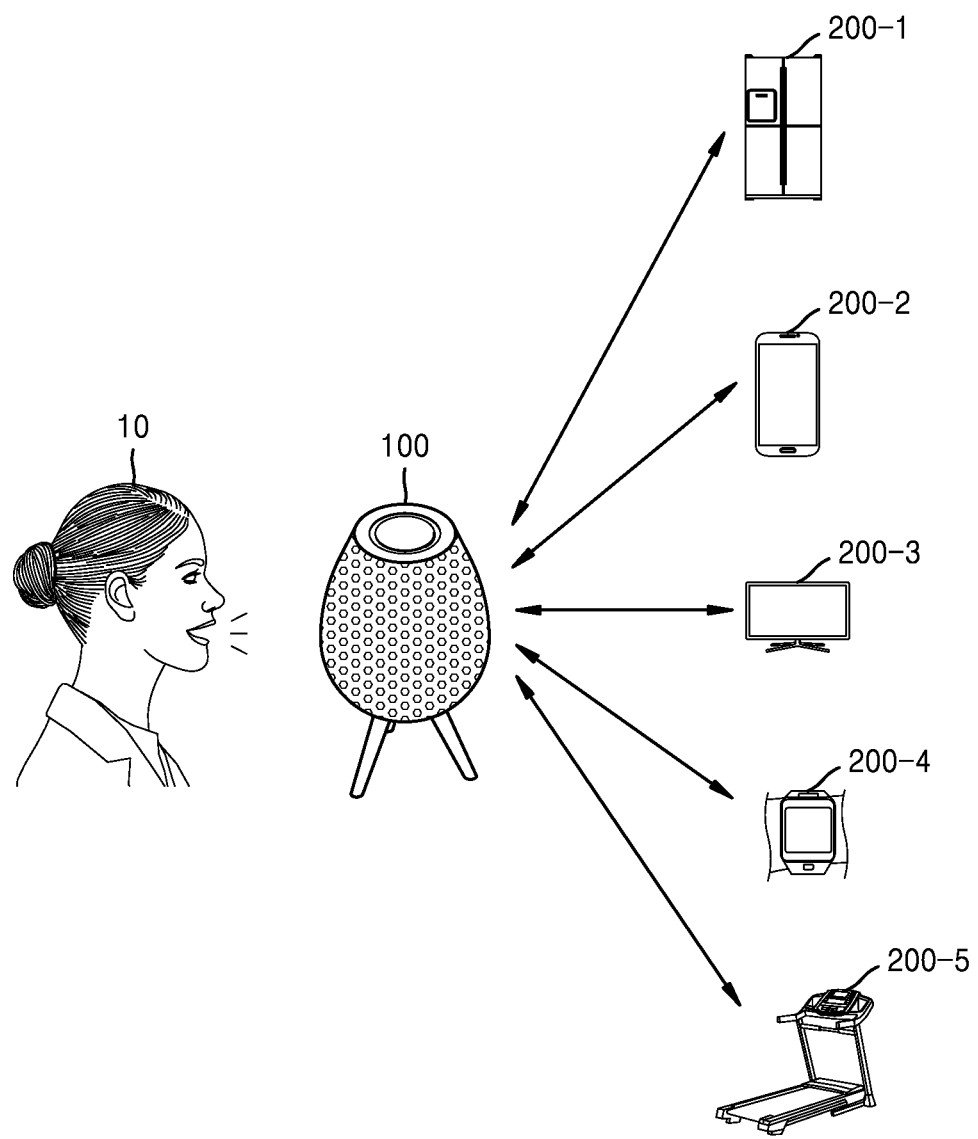
FIG. 1A illustrates a system for providing a voice assistant service, according to an embodiment of the disclosure.

FIGS. 1A through 19, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure will now be described more fully hereinafter with reference to the accompanying drawings so that they may be easily implemented by those of ordinary skill in the art. However, embodiments of the disclosure may have different forms and should not be construed as being limited to the embodiments set forth herein. In addition, descriptions not related to embodiments of the disclosure will be omitted to clearly explain the embodiments thereof in the drawing, and like reference numerals denote like elements throughout.

Throughout the disclosure, the expression "at least one of a, b or c" indicates only a, only b, only c, both a and b, both a and c, both b and c, all of a, b, and c, or variations thereof.

Some embodiments of the disclosure may be described in terms of functional block components and various processing steps. All or some of the functional blocks may be implemented using any number of hardware and/or software components configured to perform the specified functions. For example, the functional blocks of the disclosure may be implemented by one or more microprocessors or circuit components for performing predefined functions. Furthermore, for example, the functional blocks of the disclosure may be implemented with various programming or scripting languages. The functional blocks may be implemented in algorithms that run on one or more processors. Furthermore, the disclosure may employ techniques of the related art for electronics configuration, signal processing, and/or data processing.

It will be understood that, although the terms "first", "second", etc. may be used herein to describe various elements or components, these elements or components should not be limited by these terms. These terms are only used to distinguish one element or component from another element or component.

Furthermore, connecting lines or connectors shown in figures are only intended to represent exemplary functional relationships and/or physical or logical connections between components in the figures. In an actual device, connections between components may be represented by alternative or additional functional relationships, physical connections, or logical connections.

Hereinafter, the disclosure will be described in detail with reference to the accompanying drawings.

FIG. 1A illustrates a system for providing a voice assistant service according to an embodiment of the disclosure.

A voice assistant service is a service for providing a conversation with a user. According to an embodiment of the disclosure, a voice assistant service providing apparatus 100 may receive a voice command of a user 10 and provide a response message to the user 10 as if the user 10 had a conversation with a human or control another device by taking into account a context of the user 10, a context of the voice assistant service providing apparatus 100, etc. Furthermore, the voice assistant service providing apparatus 100 may appropriately generate and provide information used by the user 10 as if it were the user's personal secretary.

According to an embodiment of the disclosure, the voice assistant service providing apparatus 100 may be a mobile terminal or a fixed terminal implemented as a computer device. For example, the voice assistant service providing apparatus 100 may be at least one of a smartphone, a mobile phone, a navigation device, a computer, a notebook computer, a digital broadcasting terminal, a smart speaker, a personal digital assistant (PDA), a portable multimedia player (PMP), or a tablet PC, but is not limited thereto. The voice assistant service providing apparatus 100 may communicate with other devices and/or servers through a network by using a wireless or wired communication method.

As shown in FIG. 1A, according to an embodiment of the disclosure, the voice assistant service providing apparatus 100 may be implemented in the form of a smart speaker that provides a voice assistant service based on a voice command received from a user, but the disclosure is not limited thereto. According to an embodiment of the disclosure, the voice assistant service providing apparatus 100 may be implemented in various forms, such as a device that connects with a plurality of devices to create a home network, a home edge computer that processes data at an edge of a network, a server operating in a small-scale cloud data center, a voice assistant server that controls devices in the home by recognizing the user's voice.

The voice assistant service providing apparatus 100 may interact with a plurality of devices, i.e., a refrigerator 200-1, a smartphone 200-2, a TV 200-3, a wearable device 200-4, and exercise equipment 200-5. The voice assistant service providing apparatus 100 may provide a response message to the user 10 or control each of the devices, i.e., the refrigerator 200-1 through the exercise equipment 200-5, by interacting with the devices.

According to the relate art, to receive a desired service from a device, the user 10 is inconvenienced in having to know in advance and utter a command registered in relation to a service provided by the device.

For example, to control the third device 200-3 (e.g., a TV) to play music via the voice assistant service providing apparatus 100, the user 10 utters a voice command such as "Hey TV, play music". To utter such a voice command, the user 10 has the inconvenience of having to determine in advance whether the voice assistant service providing apparatus 100 is connected to control the TV 200-3, whether the TV 200-3 has a music playback function, and whether it is most suitable to play music through the TV 200-3 from among various devices having a music playback function.

Furthermore, as the number of devices connected to the voice assistant service providing apparatus 100 increases, the number and types of services that the voice assistant service providing apparatus 100 is able to provide to the user 10 increase and become more diverse. Accordingly, the user 10 is inconvenienced in having to fully understand and utter a number of commands in order to select and receive a desired service.

To solve this problem, according to various embodiments of the disclosure, provided is a method by which the voice assistant service providing apparatus 100 determines a plurality of devices to which a voice command of the user 10 is to be transmitted, from among a plurality of candidate devices connected to the voice assistant service providing apparatus 100, select at least one service from among services that the plurality of devices are able to provide in response to the voice command, and suggests the selected service to the user 10.

Furthermore, according to various embodiments of the disclosure, provided is a method by which the voice assistant service providing apparatus 100 forms a group of devices according to capabilities of devices in response to a user's voice command, selects an optimal service from among services providable by the group of devices, and suggests the optimal service to the user 10.

According to various embodiments of the disclosure, the voice assistant service providing apparatus 100 may activate services providable by devices based on a context of a user's voice command, forms a group of at least some of the devices that suggest the activated services, and recommend and support a service suitable for the user 10 based on information about the group of devices.

Figure 1B:
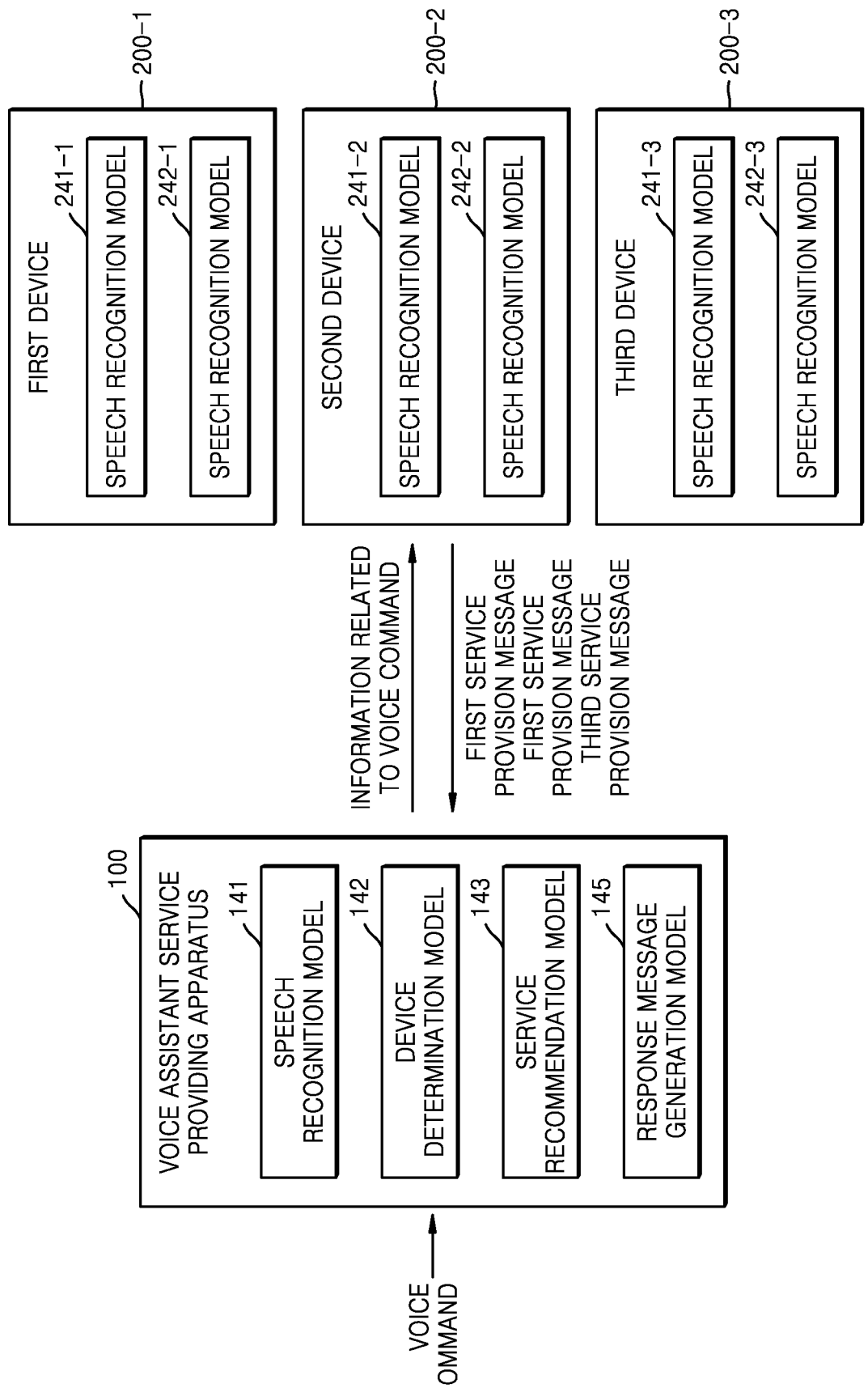
FIG. 1B illustrates an example of a block diagram of a system for providing a voice assistant service, according to an embodiment of the disclosure.

FIG. 1B illustrates an example of a block diagram of a system for providing a voice assistant service according to an embodiment of the disclosure.

FIG. 1B illustrates some components of the system including a voice assistant service providing apparatus 100 and a plurality of devices, i.e., a first device 200-1, a second device 200-2, and a third device 200-3, according to an embodiment of the disclosure. FIG. 1B shows some components used to describe operations of the voice assistant service providing apparatus 100, the first device 200-1, the second device 200-2, and the third device 200-3. Thus, components included in the voice assistant service providing apparatus 100, the first device 200-1, the second device 200-2, and the third device 200-3 are not limited to those shown in FIG. 1B.

Referring to FIG. 1B, the voice assistant service providing apparatus 100, the first device 200-1, the second device 200-2, and the third device 200-3 may be interconnected to one another and perform communication therebetween by using a wired or wireless communication method.

In an embodiment of the disclosure, the voice assistant service providing apparatus 100 may be directly connected to each of the first device 200-1, the second device 200-2, and the third device 200-3 via a communication network therebetween, but the disclosure is not limited thereto. The voice assistant service providing apparatus 100, the first device 200-1, the second device 200-2, and the third device 200-3 may be each connected to a voice assistant server (not shown), and the voice assistant service providing apparatus 100 may be connected to each of the first device 200-1, the second device 200-2, and the third device 200-3 via the voice assistant server. Furthermore, the voice assistant service providing apparatus 100, the first device 200-1, the second device 200-2, and the third device 200-3 may be each connected to an Internet of Things (IoT) server (not shown). In another embodiment of the disclosure, the voice assistant service providing apparatus 100, the first device 200-1, the second device 200-2, and the third device 200-3 may be each connected to a voice assistant server via a communication network and then to an IoT server through the voice assistant server.

Although an example in which operations of the system are performed between the voice assistant service providing apparatus 100, the first device 200-1, the second device 200-2, and the third device 200-3 will hereinafter described for convenience, the disclosure is not limited thereto. According to various embodiments of the disclosure, at least some of the operations of the voice assistant service providing apparatus 100, the first device 200-1, the second device 200-2, and the third device 200-3, as described below, may be performed by a voice assistant server or IoT server.

As shown in FIG. 1B, according to an embodiment of the disclosure, the voice assistant service providing apparatus 100 may include a speech recognition model 141, a device determination model 142, a service recommendation model 143, and a response message generation model 145 in order to provide a voice assistant service to a user.

The speech recognition model 141 may perform natural language processing on a text obtained by converting a user's voice command to extract a result of interpreting the text, indicating an intent in a user's utterance.

The device determination model 142 may determine, from among a plurality of candidate devices connected to the voice assistant service providing apparatus 100, a plurality of devices to which information related to a user's voice command is to be transmitted. For example, the information related to the user's voice command may include a text interpretation result.

The device determination model 142 may determine an intent included in the user's voice command based on the text interpretation result related to the user's voice command. The device determination model 142 may then determine, based on a relevance between the user's intent and each of the candidate devices, a plurality of devices to which the user's voice command is to be transmitted, from among the candidate devices.

According to an embodiment of the disclosure, the voice assistant service providing apparatus 100 may receive, from a server, device information including at least one of identification (ID) information (e.g., device ID information), a device type, a functional capability, location information, or status information of each of a plurality of candidate devices. By using the device determination model 142, the voice assistant service providing apparatus 100 may determine, based on the received device information, a plurality of devices to which information related to the user's voice command is to be transmitted, from among the candidate devices.

According to another embodiment of the disclosure, the voice assistant service providing apparatus 100 may receive, directly from each of a plurality of candidate devices, device information including at least one of ID information (e.g., device ID information), a device type, a functional capability, location information, or status information of each of the candidate devices. The voice assistant service providing apparatus 100 may identify a plurality of candidate devices that connect to an access point connected to the voice assistant service providing apparatus 100 and request pieces of device information from the identified candidate devices to obtain the pieces of device information. By using the device determination model 142, the voice assistant service providing apparatus 100 may determine, based on the obtained pieces of device information, a plurality of devices to which information related to the user's voice command is to be transmitted, from among the candidate devices.

The voice assistant service providing apparatus 100 may transmit, based on a result of the determination, the information related to the user's voice command to each of the first device 200-1, the second device 200-2, and the third device 200-3.

The first device 200-1, the second device 200-2, and the third device 200-3 that have received the information related to the user's voice command may respectively include corresponding speech recognition models 241-1, 241-2, and 241-3 for interpreting the information related to the user's voice command and corresponding service provision message generation models 242-1, 242-2, and 242-3.

Each of the speech recognition models 241-1, 241-2, and 241-3 may extract an intent in a user's utterance by performing natural language understanding (NLU) on the information related to the user's voice command.

Each of the first device 200-1, the second device 200-2, and the third device 200-3 may determine whether it is able to provide a service in response to the received information related to the user's voice command. When each of the first device 200-1, the second device 200-2, and the third device 200-3 determines that it is able to provide a service in response to the information related to the user's voice command, the corresponding service provision message generation model 242-1, 242-2, or 242-3 may generate a service provision message to be transmitted to the voice assistant service providing apparatus 100. Each of the service provision message generation models 242-1, 242-2, and 242-3 may determine a service suited for the user's voice command and generate, based on the determined service, a service provision message in a predefined format for transmission.

The service recommendation model 143 of the voice assistant service providing apparatus 100 may select at least one service provision message that is most suitable for the user from among a plurality of service provision messages respectively received from the first device 200-1, the second device 200-2, and the third device 200-3.

The response message generation model 145 may convert the selected at least one service provision message into a natural language that a human is able to understand and transform the natural language in text format into a speech signal to be output.

Hereinafter, an example of an overall operation method of a system for providing a voice assistant service, according to an embodiment of the disclosure, will be described with reference to FIGS. 2 and 3.

Figure 2:
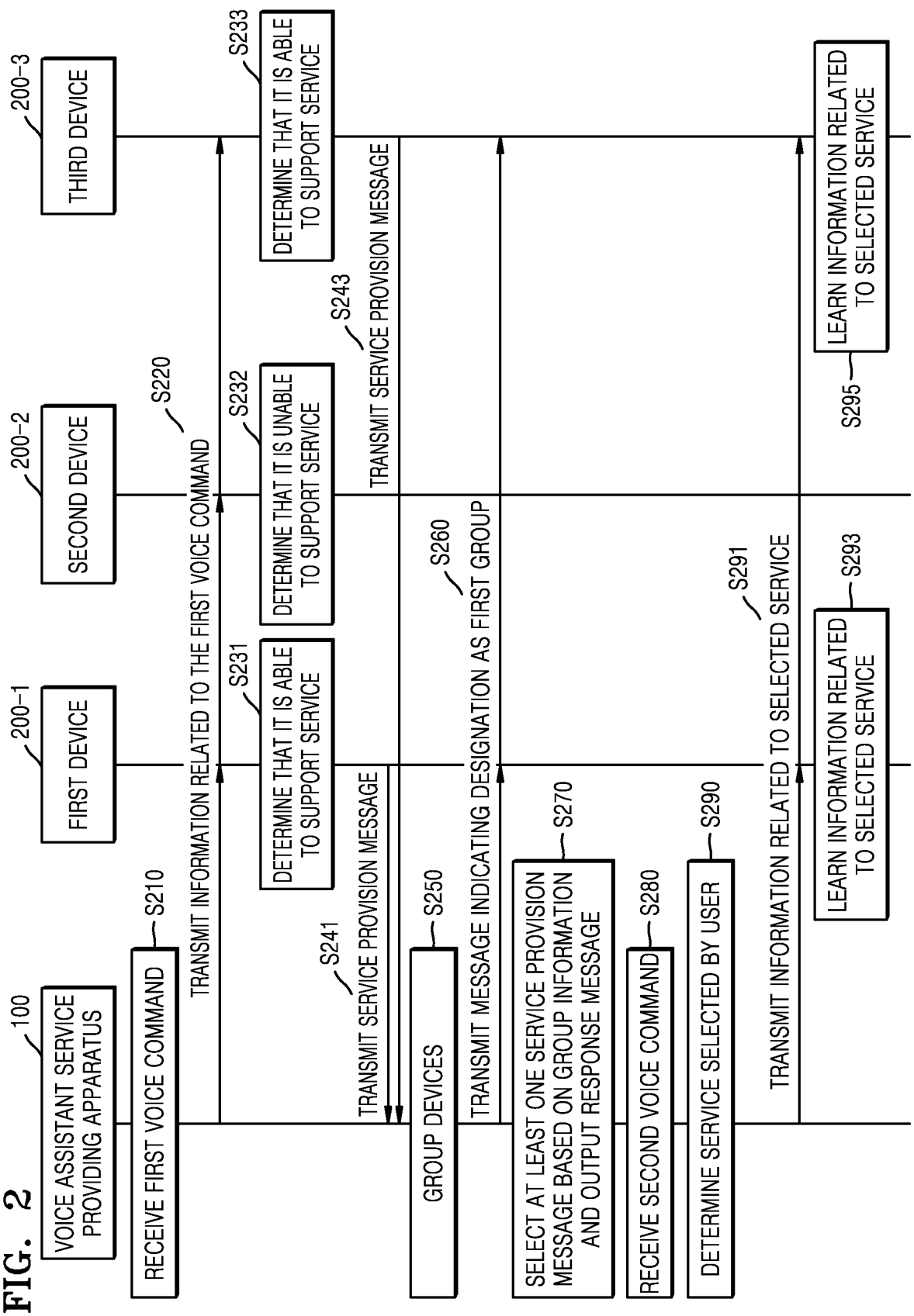
FIG. 2 illustrates a signal flowchart of an operation method of a system for providing a voice assistant service, according to an embodiment of the disclosure.

FIG. 2 illustrates a signal flowchart of an operation method of a system for providing a voice assistant service, according to an embodiment of the disclosure. FIG. 2 illustrates an example in which a voice assistant service providing apparatus 100 interworks with a plurality of devices, i.e., a first device 200-1, a second device 200-2, and a third device 200-3.

According to an embodiment of the disclosure, the voice assistant service providing apparatus 100 receives a first voice command from a user (operation S210). The voice assistant service providing apparatus 100 may receive the first voice command of the user via a microphone. The voice assistant service providing apparatus 100 may determine, from among a plurality of candidate devices connected thereto, the first device 200-1, the second device 200-2, and the third device 200-3 to which information related to the first voice command of the user is to be transmitted.

The voice assistant service providing apparatus 100 may determine a user's intent through NLU on the first voice command. The voice assistant service providing apparatus 100 may determine the first device 200-1, the second device 200-2, and the third device 200-3 from among a plurality of candidate devices, based on a relevance between the user's intent and each of the candidate devices.

For example, the voice assistant service providing apparatus 100 may obtain information about a plurality of candidate devices from an external server, an internal memory, or the candidate devices and determine relevance between a user's intent and each of the candidate devices based on the obtained information about the candidate devices.

According to an embodiment of the disclosure, the voice assistant service providing apparatus 100 transmits information related to the first voice command to the first device 200-1, the second device 200-2, and the third device 200-3 based on a result of the determination (operation S220).

The information related to the first voice command, which is transmitted to each of the first device 200-1, the second device 200-2, and the third device 200-3, may include an audio signal of the first voice command itself or a result of processing the first voice command. The voice assistant service providing apparatus 100 may convert the first voice command into a first text by performing speech recognition on the first voice command, extract an intent of an utterance by interpreting the first text via NLU, and transmit the intent to each of the first device 200-1, the second device 200-2, and the third device 200-3.

Each of the first device 200-1, the second device 200-2, and the third device 200-3 may determine whether it is able to provide a service in response to the received information related to the first voice command and learn a result of the determination. For example, each of the first device 200-1, the second device 200-2, and the third device 200-3 may determine whether the corresponding device is able to provide a service in response to the received information related to the first voice command, based on at least one of information about services providable by the device, information about sub-devices constituting the device, a type of service requested by the first voice command, current time information, or location information of the device.

Each of the first device 200-1, the second device 200-2, and the third device 200-3 may learn the information about the first voice command, which is received from the voice assistant service providing apparatus 100, information obtained by determining whether the corresponding device is able to provide a service in response to the first voice command, and context information (e.g., location information of the user, location information of the voice assistant service providing apparatus 100, location information of the device, current time information, etc.). When a device is capable of learning on its own, the device may self-learn information related to a voice command. When the device is incapable of learning on its own, the device may learn information related to a voice command by joint training with a server (or a cloud).

For example, as shown in FIG. 2, the first device 200-1 may determine that it is able to provide a service in response to the first voice command (operation S231). The second device 200-2 may determine that it is unable to provide a service in response to the first voice command (operation S232). The third device 200-3 may determine that it is able to provide a service in response to the first voice command (operation S233).

When a device determines that it is able to provide a service in response to information related to the first voice command, the device may generate a service provision message to be transmitted to the voice assistant service providing apparatus 100. A service provision message refers to a message output by a device in response to information related to a user's voice command received from the voice assistant service providing apparatus 100.

For example, the service provision message may include at least one of information about whether the device is able to provide a service in response to a voice command, information about whether the device is included in a group related to the voice command, ID information of the device, ID information of a service provided by the device in response to the voice command, a type of the service, ID information of an application used to provide the service, or a resulting text related to a service suggested by the device.

The first device 200-1 may generate a service provision message in response to the information related to the first voice command and transmit the service provision message to the voice assistant service providing apparatus 100 (operation S241). The third device 200-3 may generate a service provision message in response to the information related to the first voice command and transmit the service provision message to the voice assistant service providing apparatus 100 (operation S243).

According to an embodiment of the disclosure, a device connected to the voice assistant service providing apparatus 100 may determine a service suitable for a user's voice command and generate, based on the determined service, a service provision message in a predefined format for transmission. The device may suggest a service determined to be suitable for the user's voice command to the voice assistant service providing apparatus 100 by transmitting a service provision message.

In addition, each of the first and third devices 200-1 and 200-3 may further transmit at least one of service provision history information or device information of the corresponding device, together with a service provision message generated in response to the first voice command.

Service provision history information refers to information about a past history related to a service that has been provided or suggested by a device in response to information related to a certain voice command of the user, which is received from the voice assistant service providing apparatus 100. For example, the service provision history information may include at least one of information about whether the device is able to provide a service in response to a voice command, the number of times a service suggested by the device in response to the voice command was selected by the user, or context information (e.g., time information, location information, etc.) when the service was selected in response to the voice command.

Device information refers to information about sub-devices constituting a device. In detail, the device information may include information about whether the device includes an input/output (I/O) interface for receiving a user input from a user or providing information to the user and information related to performance of the I/O interface. For example, the device information may include information about at least one of whether the device includes a display, a resolution supported by the display, whether the device includes a microphone, an audio quality supported by the microphone, whether the device includes a speaker, a sound quality supported by the speaker, or a field of a service providable by the device.

The voice assistant service providing apparatus 100 may group devices based on service provision messages received from the devices (operation S250). The voice assistant service providing apparatus 100 may determine devices capable of providing services in response to the first voice command as a first group related to the first voice command. Referring to FIG. 2, the voice assistant service providing apparatus 100 may determine, as a first group, the first and third devices 200-1 and 200-3 that have transmitted service provision messages and transmit, to both the first and third devices 200-1 and 200-3, a message indicating that the first and third devices 200-1 and 200-3 are designated as the first group (operation S260).

The voice assistant service providing apparatus 100 may select at least one service provision message based on a result of the designating of the first and third devices 200-1 and 200-3 as one group and output a response message based on the at least one service provision message (operation S270).

The voice assistant service providing apparatus 100 may select at least one of the service provision messages respectively received from the first and third devices 200-1 and 200-3 determined as the first group. The voice assistant service providing apparatus 100 may generate and output a response message based on the selected at least one service provision message.

The voice assistant service providing apparatus 100 may select at least one of a plurality of service provision messages by using a service recommendation model that is an artificial intelligence (AI) model. The service recommendation model may be an AI algorithm trained based on the first voice command, service provision histories of a plurality of devices with respect to the first voice command, and pieces of device information regarding the devices.

For example, the voice assistant service providing apparatus 100 may select a service provision message that is most suitable for the user from among the service provision messages respectively received from the first and third devices 200-1 and 200-3 determined as the first group and output a response message based on the selected service provision message.

For example, the voice assistant service providing apparatus 100 may receive a voice command "Play music," and transmit information related to the voice command to connected devices. In response to the voice command, the voice assistant service providing apparatus 100 may receive, from a TV and a smartphone, service provision messages including information indicating that music playback is possible and information about speaker performance for the music playback. The voice assistant service providing apparatus 100 may select, based on device information of the TV and smartphone, a service provision message received from the TV with better speaker performance. The voice assistant service providing apparatus 100 may output a response message saying "I'll play music on TV" based on the selected service provision message and control the TV to play music.

As another example, the voice assistant service providing apparatus 100 may generate and output a response message by combining the service provision messages respectively received from the first and third devices 200-1 and 200-3 determined as the first group. For example, the voice assistant service providing apparatus 100 may combine service provision messages respectively received from a TV and a smartphone to output a response message saying "You can play music on TV or play music on the smartphone."

The user may listen to the response message and decide whether to accept a service suggested by the voice assistant service providing apparatus 100. The voice assistant service providing apparatus 100 may receive a second voice command from the user (operation S280). The voice assistant service providing apparatus 100 may determine, based on the second voice command, whether the user has decided to accept the service suggested by the voice assistant service providing apparatus 100.

The voice assistant service providing apparatus 100 may determine a service selected by the user (operation S290).

The voice assistant service providing apparatus 100 may determine whether a service recommended by the voice assistant service providing apparatus 100 itself to the user was selected or a service other than the recommended service was selected.

The voice assistant service providing apparatus 100 may transmit information related to the selected service to both the first and third devices 200-1 and 200-3 determined as the first group (operation S291). The first and third devices 200-1 and 200-3 may each learn the information related to the selected service (operations S293 and S295). The first and third devices 200-1 and 200-3 may update, based on the information related to the service selected by the user, 'the number of times that the service was selected by the user' or 'the number of times that the service was not selected by the user'. Devices may suggest an optimal service preferred by the user by learning a service selected by the user.

As shown in FIG. 2, according to an embodiment of the disclosure, the voice assistant service providing apparatus 100 may form a first group of devices related to the first voice command based on service provision messages from a plurality of devices. The first and third devices 200-1 and 200-3 may each learn from the message received in operation S260 that they are included in the first group related to the first voice command. The system for providing a voice assistant service, which have learned grouping information related to the first voice command, may operate as shown in FIG. 3.

Figure 3:
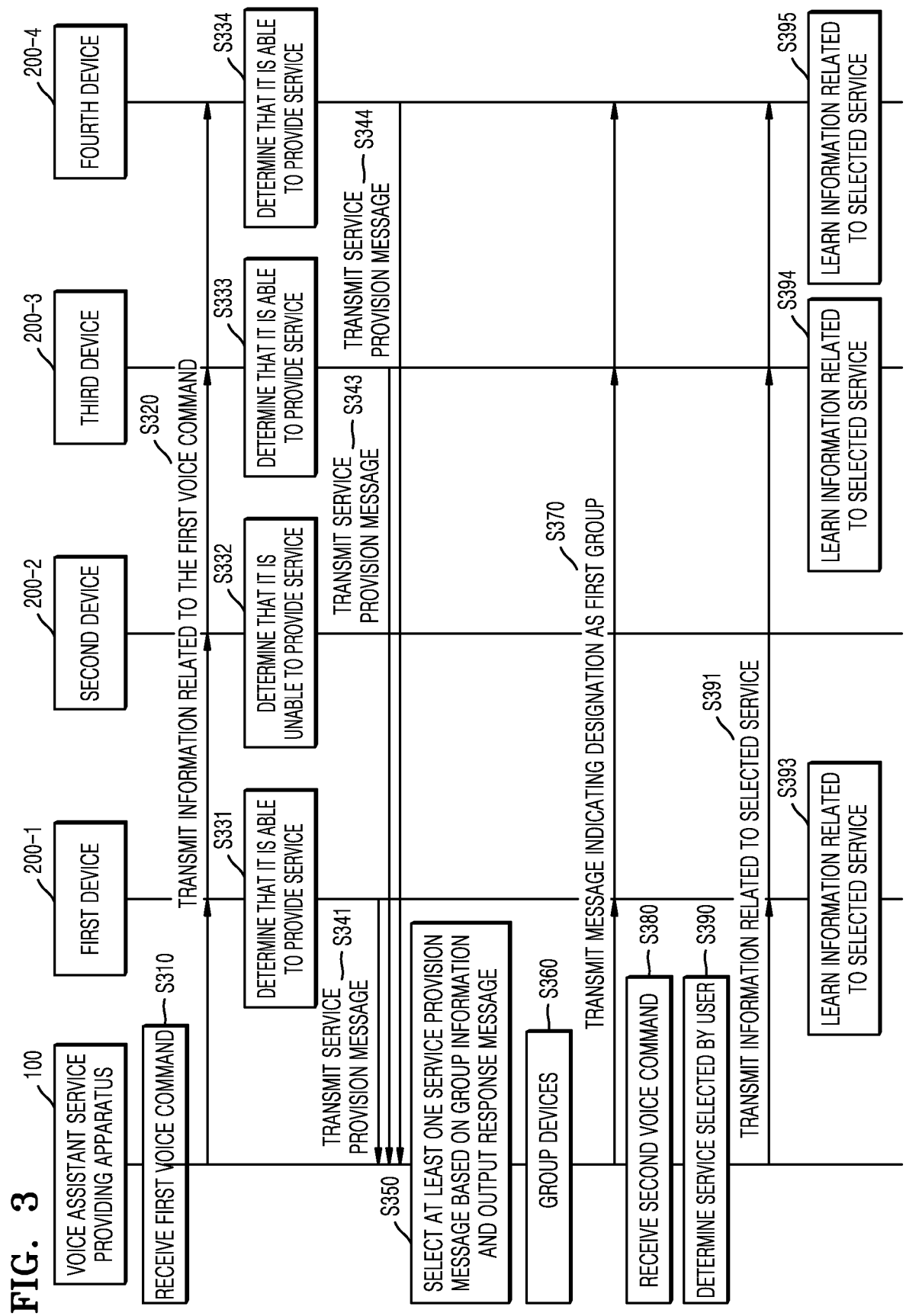
FIG. 3 illustrates a signal flowchart of an operation method of a system for providing a voice assistant service, according to an embodiment of the disclosure.

FIG. 3 illustrates a signal flowchart of an operation method of a system for providing a voice assistant service, according to an embodiment of the disclosure. FIG. 3 illustrates an example in which a fourth device 200-4 is added to the system of FIG. 2. A voice assistant service providing apparatus 100 shown in FIG. 3 operates in conjunction with a plurality of devices, i.e., a first device 200-1, a second device 200-2, a third device 200-3, and a fourth device 200-4.

Referring to FIG. 3, according to an embodiment of the disclosure, the voice assistant service providing apparatus 100 may receive the same voice command as the first voice command received in operation S210 of FIG. 2 (operation S310). The voice assistant service providing apparatus 100 may receive a first voice command of a user via a microphone. The voice assistant service providing apparatus 100 may determine, from among a plurality of candidate devices connected thereto, the first device 200-1, the second device 200-2, the third device 200-3, and the fourth device 200-4 to which information related to the first voice command of the user is to be transmitted.

According to an embodiment of the disclosure, the voice assistant service providing apparatus 100 transmits information related to the first voice command to the first device 200-1, the second device 200-2, the third device 200-3, and the fourth device 200-4 based on a result of the determination (operation S320).

The information related to the first voice command, which is transmitted to each of the first device 200-1, the second device 200-2, the third device 200-3, and the fourth device 200-4, may include an audio signal of the first voice command itself or a result of processing the first voice command. The voice assistant service providing apparatus 100 may convert the first voice command into a first text by performing speech recognition on the first voice command, extract an intent of an utterance by interpreting the first text via NLU, and transmit the intent to each of the first through fourth devices 200-1 through 200-4.

Each of the first device 200-1, the second device 200-2, the third device 200-3, and the fourth device 200-4 may determine whether it is able to provide a service in response to the received information related to the first voice command. For example, as shown in FIG. 3, the first device 200-1 may determine that it is able to provide a service in response to the first voice command (operation S331). The second device 200-2 may determine that it is unable to provide a service in response to the first voice command (operation S332). The third device 200-3 may determine that it is able to provide a service in response to the first voice command (operation S333). The fourth device 200-4 may determine that it is able to provide a service in response to the first voice command (operation S334).

When a device determines that it is able to provide a service in response to information related to the first voice command, the device may generate a service provision message to be transmitted to the voice assistant service providing apparatus 100. Each of the first, third, and fourth devices 200-1, 200-2, and 200-4 may generate a service provision message in response to the information related to the first voice command and transmit the service provision message to the voice assistant service providing apparatus 100 (operations S341, S343, and S344).

The first device 200-1 has learned, based on the message received in operation S260 of FIG. 2, that the first device 200-1 is included in a first group related to the first voice command. Thus, the service provision message transmitted by the first device 200-1 in operation S341 may include information indicating that the first device 200-1 is included in the first group related to the first voice command. The third device 200-3 also has learned, based on the message received in operation S260 of FIG. 2, that the third device 200-3 is included in the first group related to the first voice command. Thus, the service provision message transmitted by the third device 200-3 in operation S343 may include information indicating that the third device 200-3 is included in the first group related to the first voice command. However, because the fourth device 200-4 is newly added, the fourth device 200-4 has not learned group information related to the first voice command. Thus, the service provision message transmitted by the fourth device 200-4 in operation S344 may include information indicating that the fourth device 200-4 is not included in the first group related to the first voice command.

The voice assistant service providing apparatus 100 may select at least one service provision message based on group information and output a response message based on the selected at least one service provision message (operation S350).

The voice assistant service providing apparatus 100 may determine that the first and third devices 200-1 and 200-3 are included in the first group, based on the service provision messages respectively transmitted by the first, third, and fourth devices 200-1, 200-3, and 200-4. The voice assistant service providing apparatus 100 may select at least one of the service provision messages respectively received from the first and third devices 200-1 and 200-3 determined as the first group. The voice assistant service providing apparatus 100 may generate and output a response message based on the selected at least one service provision message.

In FIG. 3, the voice assistant service providing apparatus 100 may obtain group information based on service provision messages received from devices even without performing an operation of grouping the devices by analyzing all pieces of data received from the devices. Thus, according to the operation method illustrated in FIG. 3, the voice assistant service providing apparatus 100 may select at least one service provision message and output a response message more quickly compared to when using the operation method illustrated in FIG. 2.

Although FIG. 3 illustrates an example in which the voice assistant service providing apparatus 100 connects to four devices for operation, it may actually operate by connecting to a much larger number of devices. The greater the number of devices that the voice assistant service providing apparatus 100 connects to for an operation, the greater the amount of data (e.g., service provision messages, service provision histories, device information, etc.) received from the devices. Accordingly, it takes a long time for the voice assistant service providing apparatus 100 to analyze all of a large amount of data and group at least some of the devices to be included in a group related to a voice command. However, as shown in FIG. 3, according to an embodiment of the disclosure, the voice assistant service providing apparatus 100 may create a group of devices more quickly by obtaining group information previously learned by the devices through service provision messages even without analyzing all data received from the devices.

After outputting the response message in operation S350, the voice assistant service providing apparatus 100 may regroup the devices by analyzing service provision messages, service provision histories, and pieces of device information received from the devices (operation S360).

The voice assistant service providing apparatus 100 may determine the devices capable of providing services in response to the first voice command as the first group related to the first voice command. Referring to FIG. 3, the voice assistant service providing apparatus 100 may update group information such that the fourth device 200-4 is further added to the first group including the first and third devices 200-1 and 200-3. The voice assistant service providing apparatus 100 may transmit the updated group information to the first, third, and fourth devices 200-1, 200-3, and 200-4 (operation S370).

The user may listen to the response message and decide whether to accept a service suggested by the voice assistant service providing apparatus 100. The voice assistant service providing apparatus 100 may receive a second voice command from the user (operation S380). The voice assistant service providing apparatus 100 may determine, based on the second voice command, whether the user has decided to accept the service suggested by the voice assistant service providing apparatus 100.

The voice assistant service providing apparatus 100 may determine a service selected by the user (operation S390).

The voice assistant service providing apparatus 100 may determine whether a service recommended by the voice assistant service providing apparatus 100 itself to the user is selected or a service other than the recommended service is selected.

The voice assistant service providing apparatus 100 may transmit information related to the selected service to each of the first, third, and fourth devices 200-1, 200-3, and 200-4 determined as the first group (operation S391). Each of the first, third, and fourth devices 200-1, 200-3, and 200-4 may learn the information related to the selected service (operations S393, S394, and S395). Each of the first, third, and fourth devices 200-1, 200-3, and 200-4 may update, based on the information related to the service selected by the user, 'the number of times that the service was selected by the user' or 'the number of times that the service was not selected by the user' included in service provision history information. Devices may suggest an optimal service preferred by the user by learning a service selected by the user.

As described above, according to an embodiment of the disclosure, the voice assistant service providing apparatus 100 may create a group of devices according to capabilities of the devices, select an optimal service from among services that the devices in the group are able to provide, and suggest the optimal service to the user, thereby providing the user with a fast and accurate conversational service.

An operation method of the voice assistant service providing voice assistant service providing apparatus 100 will now be described in detail.

Figure 4:
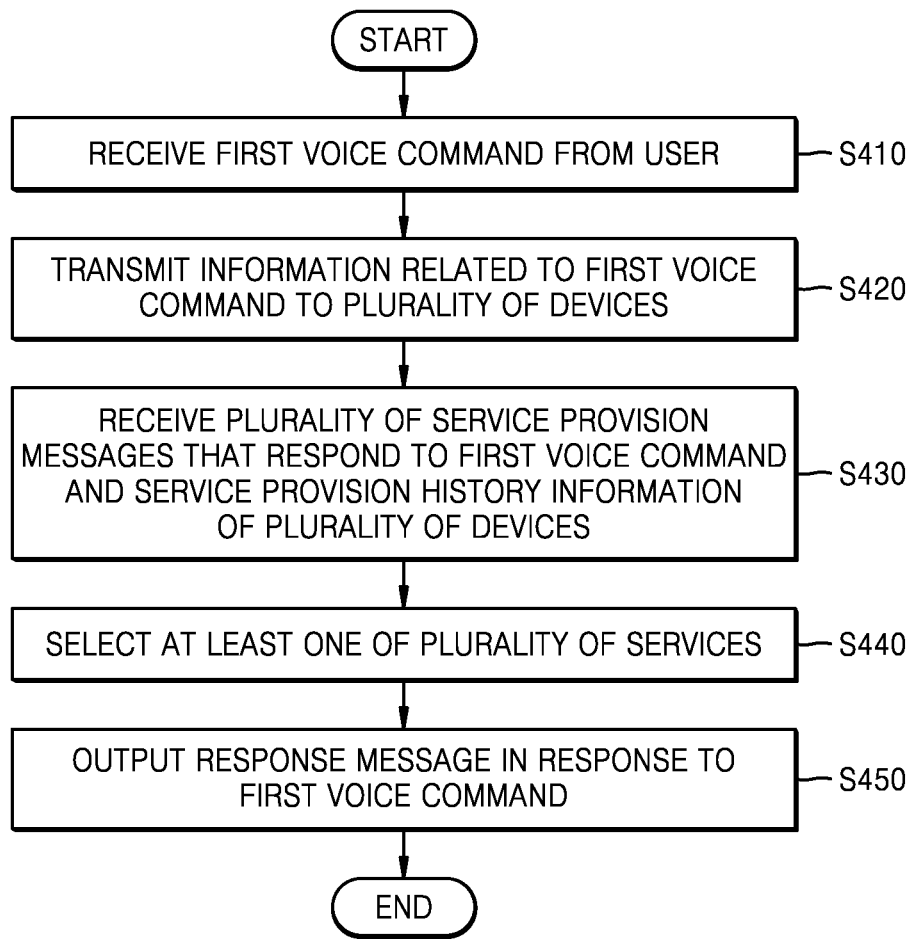
FIG. 4 illustrates a flowchart of a method of providing a voice assistant service, according to an embodiment of the disclosure.

FIG. 4 illustrates a flowchart of a method of providing a voice assistant service, according to an embodiment of the disclosure.

According to an embodiment of the disclosure, the voice assistant service providing apparatus 100 may receive a first voice command from a user (operation S410).

The voice assistant service providing apparatus 100 may determine, from among a plurality of candidate devices connected thereto, a plurality of devices to which information related to the first voice command of the user is to be transmitted.

The voice assistant service providing apparatus 100 may convert the first voice command into a first text and interpret the first text. The voice assistant service providing apparatus 100 may determine a plurality of devices related to the interpreted first text from among a plurality of candidate devices by using a device determination model.

According to an embodiment of the disclosure, the voice assistant service providing apparatus 100 may analyze a text by using a NLU model, determine a user's intent based on a result of analyzing the text, and determine a plurality of devices capable of providing services according to the user's intent from among a plurality of candidate devices. The voice assistant service providing apparatus 100 may determine, based on a relevance between the user's intent and each of the candidate devices, a plurality of devices to which the first voice command is to be transmitted, from among the candidate devices.

For example, the voice assistant service providing apparatus 100 may obtain pieces of device information respectively regarding a plurality of candidate devices and obtain, based on the pieces of device information, a plurality of probability values, each of which indicates a degree of relevance between the user's intent and each of the candidate devices. The voice assistant service providing apparatus 100 may determine, from among the candidate devices, a plurality of devices having probability values that are greater than or equal to a threshold value.

The voice assistant service providing apparatus 100 may determine a plurality of devices related to a user's intent recognized from a text, based on a matching model for determination of the relevance between the user's intent and each of a plurality of candidate devices. The voice assistant service providing apparatus 100 may determine, via a device determination model, a plurality of devices having a high probability of providing a service according to the user's intent from among the candidate devices.

According to an embodiment of the disclosure, the voice assistant service providing apparatus 100 may obtain a plurality of probability values, each indicating a degree of relevance between a user's intent and each of a plurality of candidate devices, by applying a matching model to the user's intent. The voice assistant service providing apparatus 100 may determine to transmit information related to a voice command to a plurality of devices having high probability values among the obtained probability values.

For example, the voice assistant service providing apparatus 100 may determine, via a device determination model, a predetermined number of devices having a high probability of providing a service according to a user's intent from among a plurality of candidate devices. As another example, the voice assistant service providing apparatus 100 may determine, via a device determination model, that all devices having a probability of providing a service according to a user's intent, which is greater than or equal to a threshold value, from among a plurality of candidate devices, are a plurality of devices to which information related to a voice command is to be transmitted.

The voice assistant service providing apparatus 100 may train a matching model between a user's intent and each candidate device by using, for example, a rule-based system, but is not limited thereto. For example, an AI model used by the voice assistant service providing apparatus 100 may be a neural network-based system (e.g., a convolution neural network (CNN) and a recurrent neural network (RNN)), a support vector machine (SVM), linear regression, logistic regression, Naive Bayes, random forest, decision tree, or a k-nearest neighbor algorithm. Alternatively, the AI model may be a combination of the above or another AI model.

Moreover, according to an embodiment of the disclosure, when a device or a request for a service provided by the device is specified in the first voice command of the user or information related to the device is included therein, the voice assistant service providing apparatus 100 may determine to transmit the first voice command to the device from among a plurality of candidate devices. Alternatively, the voice assistant service providing apparatus 100 may determine to transmit the first voice command to a plurality of devices associated with a certain device from among a plurality of candidate devices. When a target device from which to request a service is clearly specified in a voice command as described above, the voice assistant service providing apparatus 100 may easily determine a device to which the voice command is to be transmitted without using a device determination model.

According to an embodiment of the disclosure, the voice assistant service providing apparatus 100 may transmit information related to the first voice command to a plurality of devices (operation S420). The voice assistant service providing apparatus 100 may broadcast information related to the first voice command to a plurality of devices.

The "information related to the first voice command" transmitted to the plurality of devices may include an audio signal of the first voice command itself or a result of processing the first voice command. For example, a result of processing a voice command may include at least one of a feature vector extracted from a user's voice command, a text obtained by converting the user's voice command, a result output by performing NLU on the text, and a type of service requested by the user's voice command, which is determined based on a result of interpreting the text, a volume of the user's voice command, or a signal-to-noise ratio (SNR) of the user's voice command.

The voice assistant service providing apparatus 100 may convert the first voice command into a first text and interpret the first text. The voice assistant service providing apparatus 100 may transmit a result of analyzing the first text and information about a type of service requested by the first voice command.

The voice assistant service providing apparatus 100 may determine whether a type of service requested by the first voice command is a notification or action based on a result of analyzing the first text.

When it is determined that the first voice command requests a device to perform a certain action (e.g., media playback, recording, power on/off, etc.), the voice assistant service providing apparatus 100 may determine that the type of service requested by the first voice command is an "action". For example, when a user's voice command "play music" is received, the voice assistant service providing apparatus 100 may determine that a type of service requested by the user's voice command is an "action".

When it is determined that the first voice command does not request the device to perform a certain action, the voice assistant service providing apparatus 100 may determine that the type of service requested by the first voice command is a "notification". For example, when a user's voice command "I'm hungry, what should I eat?" is received, the voice assistant service providing apparatus 100 may determine that the type of service requested by the user's voice command is a "notification".

According to an embodiment of the disclosure, the voice assistant service providing apparatus may respectively receive, from the plurality of devices, a plurality of service provision messages generated in response to the first voice command and pieces of service provision history information of the plurality of devices (operation S430).

A "service provision message" received from each device may include at least one of information about whether the corresponding device provides a service in response to the first voice command, information about whether the device is included in a first group, ID information of the device, ID information of a service provided by the device in response to the first voice command, a type of the service, or ID information of an application used to provide the service.

"Service provision history information" received from each device may include at least one of information about whether the corresponding device provides a service that responds to the first voice command, the number of times that a service suggested by the device in response to the first voice command was selected by the user, the number of times that the service suggested by the device in response to the first voice command was not selected by the user, or context information when the service was selected in response to the first voice command.

The voice assistant service providing apparatus 100 may further receive, from each of the plurality of devices, device information regarding sub-devices constituting the corresponding device, together with a corresponding service provision message and service provision history information.

"Device information" refers to information about sub-devices constituting a device. In detail, the device information may include information about whether the device includes an I/O interface for receiving a user input or providing information to the user and information related to performance of the I/O interface. For example, the device information may include information about at least one of whether the device includes a display, a resolution supported by the display, whether the device includes a microphone, an audio quality supported by the microphone, whether the device includes a speaker, a sound quality supported by the speaker, or a field of a service providable by the device.

According to an embodiment of the disclosure, the voice assistant service proving apparatus 100 may select at least one of the service provision messages based on the pieces of service provision history information (operation S440).

The voice assistant service providing apparatus 100 may identify, based on service provision messages and/or pieces of service provision history information, devices included in a first group from among a plurality of devices.

For example, when a plurality of devices have not learned group information related to the first voice command of the user, the voice assistant service providing apparatus 100 may analyze pieces of service provision history information respectively received from the plurality of devices and determine devices included in the first group corresponding to the first voice command of the user based on a result of the analysis. The voice assistant service providing apparatus 100 may obtain, from service provision history information, information (isSupported data) about whether each device is able to provide a service in response to the first voice command.

As another example, when a plurality of devices have learned group information related to the first voice command, the voice assistant service providing apparatus 100 may identify devices included in the first group based on pieces of group information respectively contained in service provision messages received from the plurality of devices.

The voice assistant service providing apparatus 100 may select, based on pieces of service provision history information of the devices identified as being included in the first group, at least one of the service provision messages received from the identified devices.

The voice assistant service providing apparatus 100 may select at least one of the service provision messages by further taking into account pieces of device information regarding the devices together with the pieces of service provision history information.

The voice assistant service providing apparatus 100 may select at least one of a plurality of service provision messages by using a service recommendation model. The service recommendation model may be an AI algorithm trained based on a voice command, service provision histories for a plurality of devices with respect to the voice command, and pieces of device information regarding the devices. The voice assistant service providing apparatus 100 is trained to select and recommend a service most preferred by the user from among services suggested by the devices.

For example, to select at least one service provision message, the voice assistant service providing apparatus 100 may assign priorities or weights to a plurality of service provision messages based on pieces of service provision history information and/or pieces of device information. The voice assistant service providing apparatus 100 may assign priorities or weights to the service provision messages based on at least one of information about whether each device provides a service in response to the first voice command, a type of service provided by each device in response to the first voice command, the number of times that a service provided by each device in response to the first voice command was selected by the user, context information when the service provided by each device in response to the first voice command was selected, or device information regarding sub-devices constituting each device. The voice assistant service providing apparatus 100 may select one of the service provision messages based on the assigned priorities or weights.

As another example, the voice assistant service providing apparatus 100 may select two or more of a plurality of service provision messages based on priorities or weights assigned according to pieces of service provision history information and/or pieces of device information.

According to an embodiment of the disclosure, the voice assistant service providing apparatus 100 may output a response message in response to the first voice command based on a result of the selection (operation S450).

Each of the service provision messages received from the plurality of devices may include information related to a service provided by each of the plurality of devices in response to the first voice command. The voice assistant service providing apparatus 100 may generate a response message to include information related to at least one service in the selected at least one service provision message. The voice assistant service providing apparatus 100 may output the response message.

Moreover, according to an embodiment of the disclosure, when a device or a request for a service provided by the device is specified in the first voice command of the user or information related to the device is included therein, the voice assistant service providing apparatus 100 may not perform operations S410 through S440. The voice assistant service providing apparatus 100 may transmit information related to the first voice command to the device, receive a service provision message from the device, and generate and output a response message to include information related to a service in the received service provision message. When a target device from which to request a service is clearly specified in a voice command as described above, the voice assistant service providing apparatus 100 may easily generate a response message without using a device determination model and/or a service recommendation model.

Figure 5:
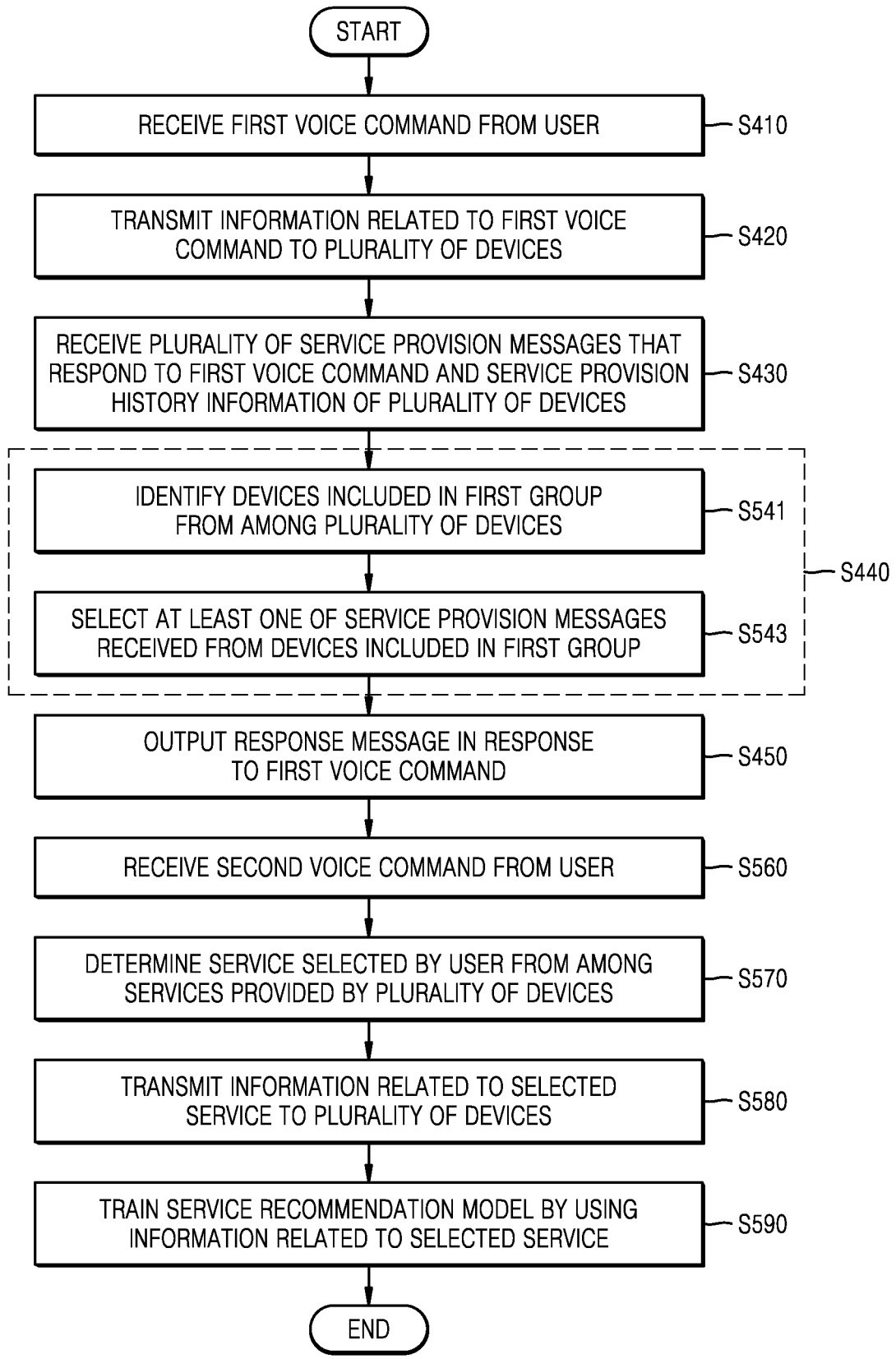
FIG. 5 illustrates a detailed flowchart of a method of providing a voice assistant service, according to an embodiment of the disclosure.

FIG. 5 illustrates a detailed flowchart of operation S440 of FIG. 4 in a method, performed by the voice assistant service providing apparatus 100, of providing a voice assistant service, according to an embodiment of the disclosure. Thus, descriptions of operations S410 through S430 already provided above with respect to FIG. 4 will be omitted herein.

According to an embodiment of the disclosure, the voice assistant service providing apparatus 100 may identify devices included in a first group from among the plurality of devices (operation S541). The voice assistant service providing apparatus 100 may identify devices included in the first group from among the plurality of devices, based on the service provision messages or pieces of service provision history information received from the plurality of devices.

For example, the voice assistant service providing apparatus 100 may obtain information about whether a device is included in the first group related to the first voice command from a corresponding service provision message and determine that the device is included in the first group based on the obtained information.

As another example, the voice assistant service providing apparatus 100 may obtain information about whether a device is able to provide a service in response to the first voice command from corresponding service provision history information and determine that the device is included in the first group based on the obtained information. The voice assistant service providing apparatus 100 may obtain, from the service provision history information, information (isSupported flag) about whether the device is able to provide a service in response to the first voice command.

According to an embodiment of the disclosure, the voice assistant service providing apparatus 100 may select, based on pieces of service provision history information of the devices identified as being included in the first group, at least one of the service provision messages received from the identified devices (operation S543).

The voice assistant service providing apparatus 100 may further take into account pieces of device information regarding a plurality of devices when selecting the at least one provision message.

According to an embodiment of the disclosure, the voice assistant service providing apparatus 100 may select all the service provision messages received from the devices in the first group.

According to another embodiment of the disclosure, the voice assistant service providing apparatus 100 may assign priorities or weights to service provision messages received from the devices in the first group based on pieces of service provision history information and/or pieces of device information and select at least one service provision message according to the assigned priorities or weights. For example, the voice assistant service providing apparatus 100 may select one service provision message having a highest priority assigned thereto or a plurality of service provision messages having a relatively high priority assigned thereto. As another example, the voice assistant service providing apparatus 100 may select at least one service provision message having an assigned weight greater than or equal to a threshold value.

According to an embodiment of the disclosure, the voice assistant service providing apparatus 100 may output a response message in response to the first voice command based on a result of the selection in operation S543 (operation S450).

According to an embodiment of the disclosure, the voice assistant service providing apparatus 100 may generate a response message to include information related to at least one service in the selected at least one service provision message. The voice assistant service providing apparatus 100 may generate a response message by performing a natural language generation (NLG) process for converting at least one selected service provision message into a natural language that a human is able to understand and text-to-speech (TTS) conversion for converting a natural language text into a speech signal.

According to an embodiment of the disclosure, when two or more service provision messages are selected in operation S543, the voice assistant service providing apparatus 100 may generate a response message by arranging the selected service provision messages and output the response message.

According to another embodiment of the disclosure, when two or more service provision messages are selected in operation S543, the voice assistant service providing apparatus 100 may generate a response message by combining the selected service provision messages and output the response message.

The user may listen to the response message output in response to the first voice command and decide whether to accept a service recommended by the voice assistant service providing apparatus 100. The user may utter a second voice command based on the decision.

The voice assistant service providing apparatus 100 may receive a second voice command from the user (operation S560).

The voice assistant service providing apparatus 100 may determine, based on the second voice command received from the user, whether the user has decided to accept a service recommended by the voice assistant service providing apparatus 100 (operation S570). The voice assistant service providing apparatus 100 may determine, based on the second voice command, a service selected by the user from among services provided by the plurality of devices.

The voice assistant service providing apparatus 100 may transmit information related to the service selected by the user to the plurality of devices (operation S580). The voice assistant service providing apparatus 100 may transmit information related to the service selected by the user to the devices identified as being included in the first group in operation S541.

According to an embodiment of the disclosure, the voice assistant service providing apparatus 100 may train a service recommendation model based on the information related to the service selected by the user (operation S590). The voice assistant service providing apparatus 100 may continuously train the service recommendation model according to a user's voice command in order to suggest an optimal service preferred by the user from among various services provided by a plurality of devices.

Referring to FIG. 5, according to an embodiment of the disclosure, the voice assistant service providing apparatus 100 determines a service selected by the user based on the second voice command of the user. However, various embodiments of the disclosure are not limited to the example shown in FIG. 5.

According to another embodiment of the disclosure, the voice assistant service providing apparatus 100 may determine a service selected by the user by detecting a user's motion or receiving a user input. For example, a device capable of receiving a touch input from a user, such as a smartphone or wearable device, may determine whether the user has selected a service suggested to the user based on the touch input from the user.

For example, in response to a first voice command "What should I eat?", the voice assistant service providing apparatus 100 may output a response message "There is pork belly in the refrigerator". When the user decides to accept the service suggested by the voice assistant service providing apparatus 100, the user may take the pork belly out of the refrigerator. The voice assistant service providing apparatus 100 may determine, based on the user's action of taking the pork belly out of the refrigerator, that the user has decided to accept the service suggested by the voice assistant service providing apparatus 100.

Moreover, according to an embodiment of the disclosure, the voice assistant service providing apparatus 100 may obtain pieces of device information from a plurality of devices connected to the voice assistant service providing apparatus 100. For example, device information may include resource information and/or capability information. Resource information of a device may include information about components used for operation of the device, such as a storage device, an I/O device, or a central processing unit (CPU). Capability information of the device may include information about functions that the device is able to perform, version information of software running on the device, or information related to performance of components of the device. For example, when a new device is additionally connected to the device, the voice assistant service providing apparatus 100 may obtain device information of the device from the new device connected thereto.

According to an embodiment of the disclosure, the voice assistant service providing apparatus 100 may perform more operations than those described with reference to FIG. 4 and play a more leading role in providing a voice assistant service, based on pieces of device information regarding a plurality of devices. In other words, at least some of the operations and/or functions of a device described in the disclosure may be performed by the voice assistant service providing apparatus 100.

For example, when a device has insufficient resources (e.g., a CPU capacity, memory storage space, etc.), the device may not be able to manage service provision history information. The voice assistant service providing apparatus 100 may determine, based on device information received from the device, that it is not possible to receive the service provision history information from the device and that a service provision message may be received therefrom. Alternatively, the voice assistant service providing apparatus 100 may determine that part of the service provision history information may be received from the device, based on the device information received from the device.

In this case, because the voice assistant service providing apparatus 100 is unable to determine whether the device is included in a group related to a voice command based on the service provision history information, for example, the voice assistant service providing apparatus 100 may determine that the device is included in the group related to the voice command by default. Furthermore, because the voice assistant service providing apparatus 100 is not able to take into account the service provision history information of the device when selecting a service provision message, the service provision message received from the device from among a plurality of service provision messages may be set as a default value that is always selected. As another example, the voice assistant service providing apparatus 100 may directly manage service provision history information of a certain candidate device.

A method, performed by a device interacting with a user via the voice assistant service providing apparatus 100, of providing service-related information to the voice assistant service providing apparatus 100 will now be described in detail.

Figure 6:
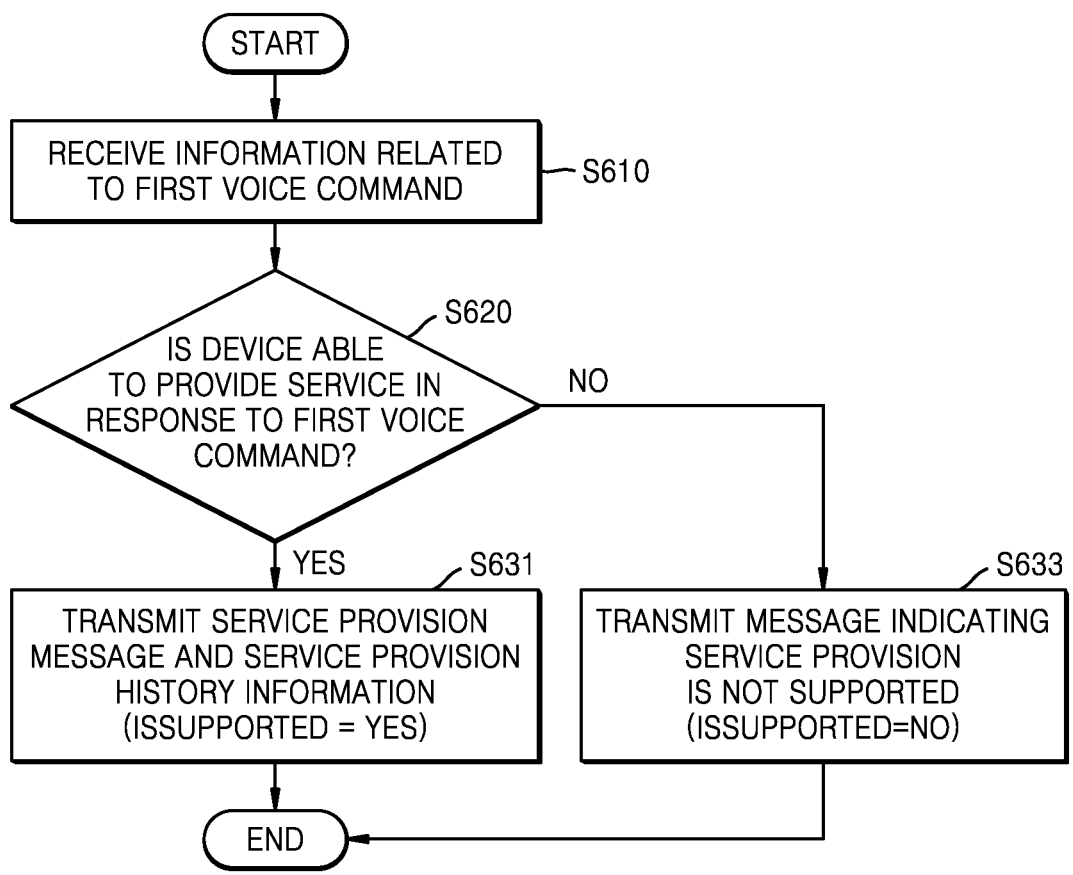
FIG. 6 illustrates a flowchart of an operation method of a device that interacts with a user via a voice assistant service providing apparatus, according to an embodiment of the disclosure.

FIG. 6 illustrates a flowchart of an operation method of the device 200 that interacts with a user via the voice assistant service providing apparatus 100, according to an embodiment of the disclosure.

According to an embodiment of the disclosure, the device 200 may receive information related to a first voice command from the voice assistant service providing apparatus 100 (operation S610).

The information related to the first voice command received by the device 200 from the voice assistant service providing apparatus 100 may include an audio signal of the first voice command itself of a user or a result of processing the first voice command. For example, a result of processing a voice command may include at least one of a feature vector extracted from a user's voice command, a text obtained by converting the user's voice command, a result output by performing NLU on the text, a type of service requested by the user's voice command, which is determined based on a result of interpreting the text, a volume of the user's voice command, or an SNR of the user's voice command.

For example, the device 200 may receive, as the information related to the first voice command, a result of analyzing a first text and information about a type of service requested by the first voice command.

According to an embodiment of the disclosure, the device 200 may determine whether the device 200 is able to provide a service in response to the information related to the first voice command (operation S620).

According to an embodiment of the disclosure, the device 200 may identify services that it is able to provide based on information about sub-devices (e.g., a screen, an input interface, etc.) constituting the device 200, information about software such as an application running on the device 200, and information prestored in the device 200 (e.g., current time information and location information of the device 200).

The information prestored in the device 200 may include information to perform learning for determining a service providable by the device 200. For example, the information prestored in the device 200 may include service provision history information of the device 200.

When the services identified as ones providable by the device 200 include a service corresponding to a type of service requested by the first voice command, the device 200 may generate a service provision message by selecting, from among the identified services, one service corresponding to the type of service requested by the first voice command.

According to an embodiment of the disclosure, the device 200 may perform machine learning to determine a supportable service and increase accuracy of a service suggested to the user. Hereinafter, a method of learning the capability of the device 200 related to a service that is supportable by the device 200 will be described in detail.

Initially, the device 200 interworking with the voice assistant service providing apparatus 100 may learn information about a service that is supportable by the device 200 by using incremental learning. For initial learning, general information such as location information of a device and time information and device information regarding the device may be used.

After the initial learning, transfer learning based on a trained model may be used. Each device may learn a final linear classifier layer of the trained model, thereby increasing accuracy of identifying the context of a voice command and accuracy of a service suggested in response to the voice command. For example, for transfer learning, information related to a user's voice command and a service selected by the user among suggested services may be used.

In addition, each group created by classifying devices into groups is classified as a classifier by using a mixture-of-experts algorithm for ensemble learning, thereby improving the accuracy of a suggested service. Each device may also learn domain assignment according to a capability of the device (gating function) in regard to a domain of each classifier, thereby increasing the accuracy of a suggested service. Furthermore, each device may learn information indicating that no service is available in response to a voice command or that a service suggested in response to the voice command has not been selected by the user, thereby increasing the accuracy of a suggested service.

When the device 200 determines that it is able to provide a service in response to the information related to the first voice command, the device 200 may generate a service provision message to be transmitted to the voice assistant service providing apparatus 100. The service provision message may include information related to a service suggested by the device 200 in response to the information related to the first voice command received from the voice assistant service providing apparatus 100.

For example, a service provision message may include at least one of information about whether a device is able to provide a service in response to a voice command, information about whether the device is included in a group related to the voice command, ID information of the device, ID information of a service provided by the device in response to the voice command, a type of the service, or ID information of an application used to provide the service.

According to an embodiment of the disclosure, the device 200 may transmit a service provision message and service provision history information (operation S631).

The service provision history information refers to information about a past history related to a service provided or suggested by the device 200 in response to the information related to the first voice command. For example, the service provision history information may include at least one of information about whether the device is able to provide a service in response to a voice command, the number of times that a service suggested by the device in response to the voice command was selected by the user, or context information (e.g., time information, location information, etc.) when the service was selected in response to the voice command.

According to an embodiment of the disclosure, when the device 200 determines that it is able to provide a service in response to the information related to the first voice command, the device 200 may transmit the service provision message and service provision history information by writing a value corresponding to "yes" to a isSupported flag included in the service provision history information.

On the other hand, when the device 200 determines that it is unable to provide a service in response to the information related to the first voice command, the device 200 may transmit a message indicating that provision of the service is not supported.

For example, the device 200 may transmit the message to the voice assistant service providing apparatus 100 by writing a value corresponding to "no" to the isSupported flag. However, an embodiment of the disclosure is not limited to the flowchart illustrated in FIG. 6, and when the device 200 is unable to provide the service in response to the first voice command, the device 200 may not transmit a message indicating that provision of the service is not supported nor perform any operation.

Figure 7:
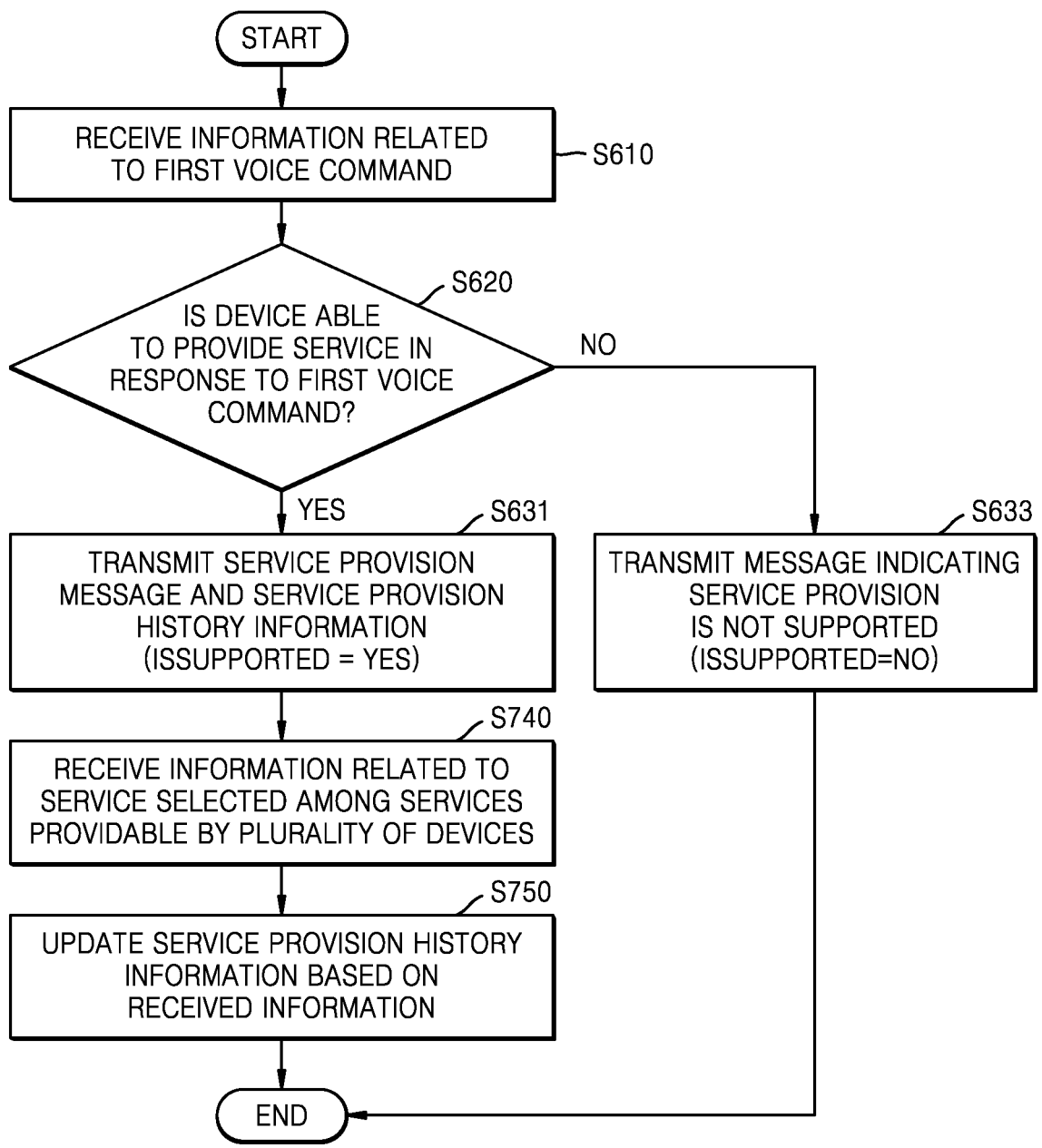
FIG. 7 illustrates a detailed flowchart of an operation method of a device that interacts with a user through a voice assistant service providing apparatus, according to an embodiment of the disclosure.

FIG. 7 illustrates a flowchart of a method, performed by the device 200, of learning a user's feedback with respect to a suggested service in addition to the operation method of FIG. 6.

FIG. 7 is a detailed flowchart of an operation method of the device 200 that interacts with the user through the voice assistant service providing apparatus 100, according to an embodiment of the disclosure. Descriptions of operations S610 and S620 already provided above with respect to FIG. 6 will be omitted herein.

When the device 200 transmits a service provision message and service provision history information in operation S631, according to an embodiment of the disclosure, the voice assistant service providing apparatus 100 may select, based on pieces of service provision history information, at least one of a plurality of service provision messages.

The voice assistant service providing apparatus 100 may identify devices included in a first group from among a plurality of devices. The voice assistant service providing apparatus 100 may select, based on pieces of service provision history information of the devices identified as being included in the first group, at least one of the service provision messages received from the identified devices.

The voice assistant service providing apparatus 100 may select at least one of a plurality of service provision messages based on at least one of device information or service provision history information regarding each of the plurality of devices. The voice assistant service providing apparatus 100 may output a response message generated in response to the first voice command based on the selected at least one service provision message.

The user may listen to the response message output in response to the first voice command and decide whether to accept a service recommended by the voice assistant service providing apparatus 100. The user may utter a second voice command based on the decision.

According to an embodiment of the disclosure, the voice assistant service providing apparatus 100 may receive a second voice command from the user. The voice assistant service providing apparatus 100 may determine, based on the second voice command received from the user, whether the user has decided to accept a service recommended by the voice assistant service providing apparatus 100. The voice assistant service providing apparatus 100 may determine, based on the second voice command, a service selected by the user from among services provided by the plurality of devices.

The device 200 may receive information related to the service selected by the user from the voice assistant service providing apparatus 100 (operation S740).

The device 200 may update service provision history information based on the received information (operation S750). For example, when a service suggested via the service provision message transmitted in operation S631 is selected by the user, the device 200 may increase a pick count in the service provision history information by 1. Alternatively, when a service suggested via the service provision message transmitted in operation S631 is not selected by the user, the device 200 may increase a no pick count in the service provision history information by 1.

Figure 8:
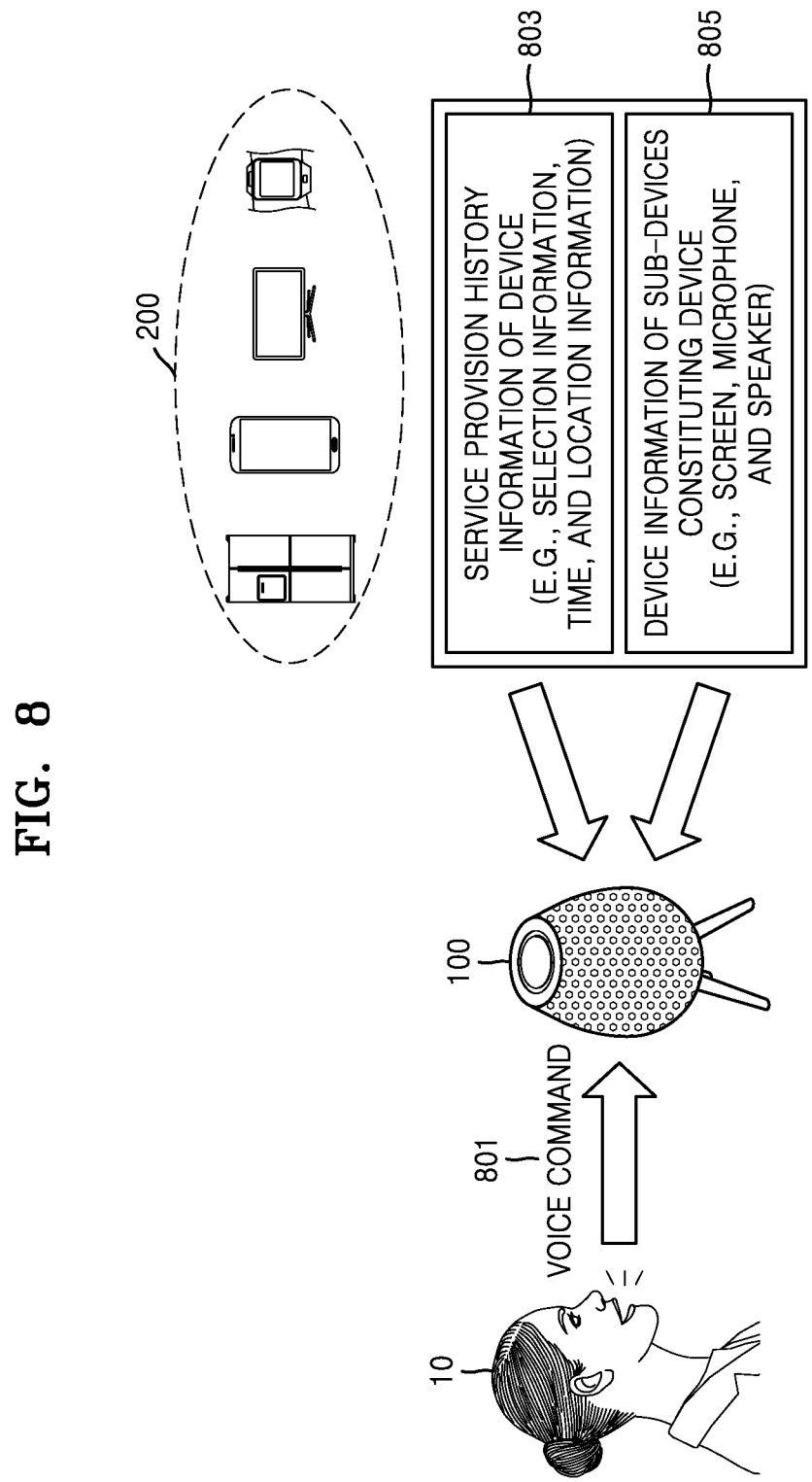
FIG. 8 illustrates an example of data learned by a voice assistant service providing apparatus, according to an embodiment of the disclosure.

FIG. 8 illustrates an example of data learned by the voice assistant service providing apparatus 100, according to an embodiment of the disclosure.

As illustrated in FIG. 8, when a user 10 utters a voice command 801, each of a plurality of devices 200 may receive information related to the voice command 801 from the voice assistant service providing apparatus 100. Each of the devices 200 may suggest one of the available services in response to the voice command 801 and transmit a service provision message including information related to the suggested service to the voice assistant service providing apparatus 100. Furthermore, each of the devices 200 may transmit, together with the service provision message, service provision history information 803 and device information 805 to the voice assistant service provision apparatus 100.

The voice assistant service providing apparatus 100 may select at least one service provision message from among a plurality of service provision messages based on a type of service requested by the voice command 801, the service provision history information 803 of each device, and the device information 805 of each device, and recommend a service corresponding to the selected at least one service message to the user 10.

FIG. 9 illustrates examples of a service provision message, service provision history information, and device information received by the voice assistant service providing apparatus 100, according to an embodiment of the disclosure.

A service provision message list 901 of FIG. 9 shows examples of service provision messages received by the voice assistant service providing apparatus 100 according to an embodiment of the disclosure from a plurality of devices in response to a user's voice command "I'm hungry, what should I eat?".

As shown in FIG. 9, a service provision message according to an embodiment of the disclosure may include group information, a device identifier, a service type, a service identifier, an application identifier, and a resulting text.

The group information included in the service provision message may include information about whether a device is grouped into a first group related to a first voice command. For example, the service provision message may include a group identifier indicating the first group related to the first voice command.

Furthermore, the service provision message may include a device identifier indicating a device that generates and transmits the service provision message. The service provision message may include at least one of ID information or type of a service provided by the device in response to the first voice command. For example, the service provision message may include information about whether the type of service provided by the device is a notification or an action.

The type of service included in the service provision message may be the type of service that the voice assistant service providing apparatus 100 determines and transmits as the type of service requested by the first voice command. The voice assistant service providing apparatus 100 may determine the type of service requested by the first voice command and transmit the determined type to the device 200. The device 200 may determine a service corresponding to the type of service received from the voice assistant service providing apparatus 100 from among various services providable by the device 200, generate a service provision message related to the service, and transmit the service provision message to the voice assistant service providing apparatus 100.

The service provision message may include ID information indicating an application used by a device to provide a service in response to the first voice command. Furthermore, the service provision message may include a response message related to a service that a device is able to provide in response to the first voice command.

For example, as shown in a first line of the service provision message list 901 of FIG. 9, a TV may generate, in response to the user's voice command "I'm hungry, what should I eat?", a service provision message [(I'm hungry/what/should I eat)/device 1/notification/service 1/application 1/"There is a popular restaurant nearby, as seen on TV."] and transmit the service provision message to the voice assistant service providing apparatus 100.

The voice assistant service providing apparatus 100 may determine, based on the service provision message received from the TV, that the TV is included in a group (I'm hungry/what/should I eat) related to the voice command and tries to provide service 1 that is a notification service via application 1 in response to the voice command. For example, the TV may suggest a service for recommending a restaurant around the user introduced on the TV via application 1 that provides information related to a TV program.

For example, as shown in a third line of the service provision message list 901 of FIG. 9, a refrigerator may generate, in response to the user's voice command "I'm hungry, what should I eat?", a service provision message [(I'm hungry/what/should I eat)/device 3/notification/service 3/application 4/"The refrigerator is empty."] and transmit the service provision message to the voice assistant service providing apparatus 100.

The voice assistant service providing apparatus 100 may determine, based on the service provision message received from the refrigerator, that the refrigerator is included in the group (I'm hungry/what/should I eat) related to the voice command and tries to provide service 3 that is a notification service via application 4 in response to the voice command. For example, the refrigerator may suggest a service for recommending food that the user may eat or notifying the user that the refrigerator is empty via application 4 for managing ingredients stored in the refrigerator.

A service provision history information list 902 of FIG. 9 shows examples of pieces of service provision history information received by the voice assistant service providing apparatus 100 according to an embodiment of the disclosure from the plurality of devices in response to the user's voice command "I'm hungry, what should I eat?".

As shown in FIG. 9, according to an embodiment of the disclosure, service provision history information may include at least one of information (isSupported) about whether a device is able to provide a service in response to a voice command, the number of times (pick count) that a service suggested by the device in response to the voice command was selected, the number of times (no pick count) that the service suggested by the device in response to the voice command was not selected by the user, location information of the device, or and time information when the service suggested by the device in response to the voice command was selected.

For example, as shown in the service provision history information list 902 of FIG. 9, each of the TV, the refrigerator, and a smartphone may transmit, to the voice assistant service providing apparatus 100, service provision history information including information (e.g., isSupporte=yes) indicating that each of the TV, refrigerator, and smartphone is able to provide a service in response to the user's voice command "I'm hungry, what should I eat?". On the other hand, an air conditioner may transmit, to the voice assistant service providing apparatus 100, service provision history information including information (e.g., isSupported=no) indicating that the air conditioner is unable to provide a service in response to the user's voice command "I'm hungry, what should I eat?".

The voice assistant service providing apparatus 100 may determine whether a service recommended by the voice assistant service providing apparatus 100 to the user was selected, or whether a service other than the service recommended by the voice assistant service providing apparatus 100 was selected. The voice assistant service providing apparatus 100 may transmit information related to the selected service to devices, and the devices may learn the information related to the selected service. Each of the devices may update, based on the information related to the selected service, 'the number of times that the service was selected by the user' or 'the number of times that the service was not selected by the user', which is included in service provision history information.

Device information list 903 of FIG. 9 shows examples of information about sub-devices constituting each device, the information being received by the voice assistant service providing apparatus 100 according to an embodiment of the disclosure from the plurality of devices.

According to an embodiment of the disclosure, device information may include information about whether a device includes an I/O interface for receiving a user input or providing information to the user and information related to performance of the I/O interface. For example, as shown in FIG. 9, the device information may include information about at least one of whether the device includes a display, a resolution supported by the display, whether the device includes a speaker, a sound quality supported by the speaker, whether the device includes a microphone, an audio quality supported by the microphone, whether the device includes a touch screen, sensitivity of the touch screen, or other information related to a specification of the device.

The other information related to the specification of the device may include information related to a service providable by the device. For example, the TV may provide TV program information, the air conditioner may provide information related to indoor temperature, humidity, and dust, and the refrigerator may provide information related to food.

According to an embodiment of the disclosure, the voice assistant service providing apparatus 100 may assign a higher priority to a device that provides a service corresponding to a domain of the user's voice command based on device specification information included in device information received from each of the devices.

Figure 10:
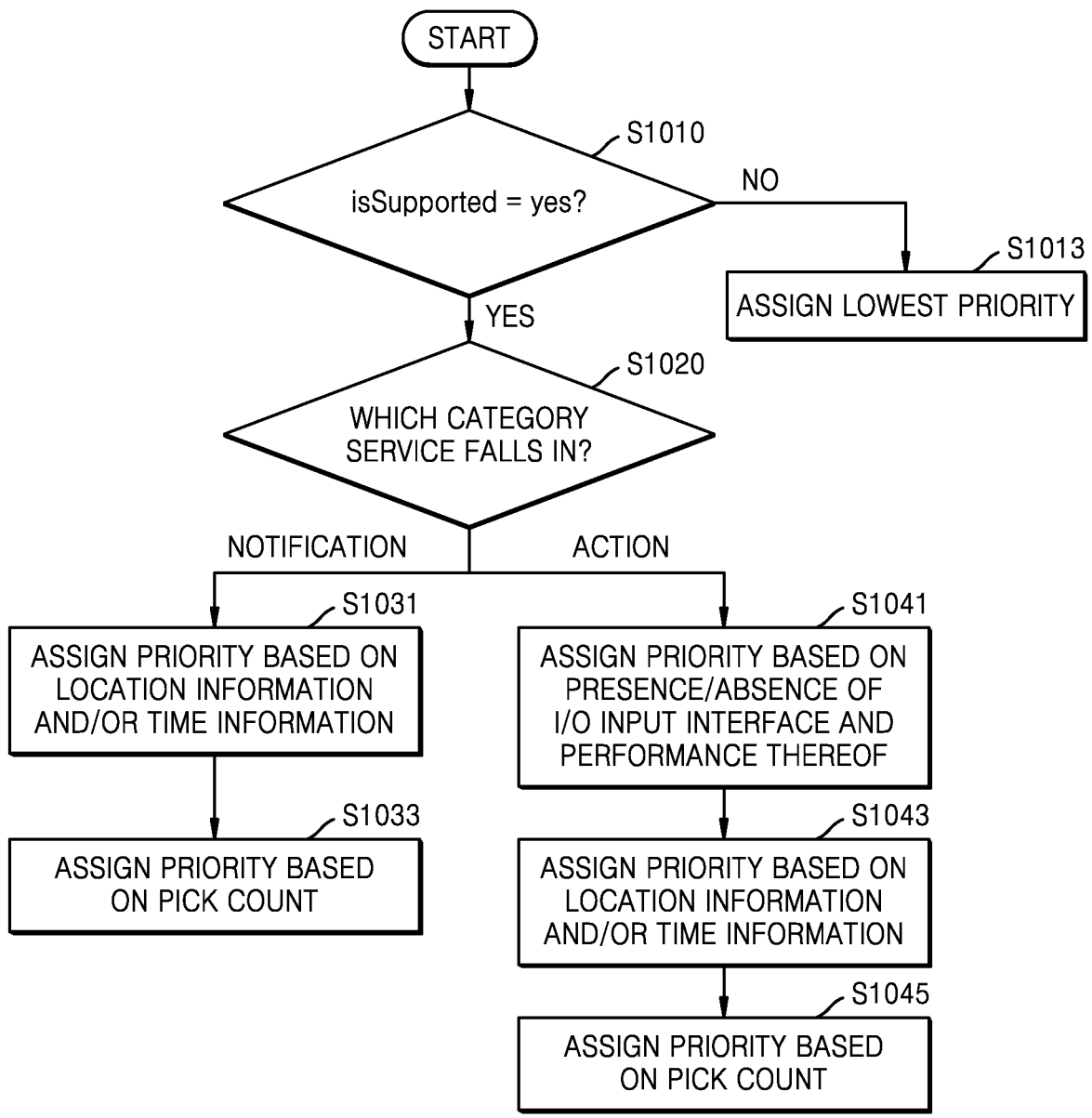
FIG. 10 illustrates a flowchart of a method, performed by a voice assistant service providing apparatus, of assigning priorities with respect to a plurality of service provision messages, according to an embodiment of the disclosure.

FIG. 10 illustrates a flowchart of a method, performed by the voice assistant service providing apparatus 100, of assigning priorities with respect to a plurality of service provision messages, according to an embodiment of the disclosure.

According to an embodiment of the disclosure, the voice assistant service providing apparatus 100 may select at least one service provision message from among a plurality of service provision messages, based on at least one of a type of service requested by a voice command, service provision history information of each device, or device information of each device.

The voice assistant service providing apparatus 100 may identify devices included in a group related to a voice command and create a group of the identified devices based on isSupported data included in pieces of service provision history information of a plurality of devices (operation S1010).

In operation S1010, the voice assistant service providing apparatus 100 may select devices that have transmitted information (e.g., isSupported=yes) indicating that they are able to provide services in response to information related to a voice command and assign priorities to the selected devices. On the other hand, the voice assistant service providing apparatus 100 may assign lowest priorities to devices that have transmitted information indicating that they are unable to provide a service (e.g., isSupported=no) in response to the information related to the voice command (operation S1013).

The voice assistant service providing apparatus 100 may determine what type of service is provided by each of the devices based on a service provision message (operation S1020).

The voice assistant service providing apparatus 100 may determine a type of service requested by the voice command and transmit the determined type to the device 200. The device 200 may determine a service corresponding to the type of service received from the voice assistant service providing apparatus 100 from among various services providable by the device 200, generate a service provision message related to the service, and transmit the service provision message to the voice assistant service providing apparatus 100. Accordingly, the type of service included in the service provision message may be a type of service that the voice assistant service providing apparatus 100 determines and transmits as the type of service requested by a first voice command.

For example, the voice assistant service providing apparatus 100 may apply a different method of assigning a priority depending on whether a type of service provided by each of the selected devices is a "notification' or an "action".

According to an embodiment of the disclosure, when the type of service requested by the voice command is a "notification", the voice assistant service providing apparatus 100 may assign priorities to devices based on pieces of location information and/or time information respectively included in pieces of service provision history information (operation S1031). For example, as a user is closer to a location of a device and a time at which the device was mainly selected is closer to a current time, the voice assistant service providing apparatus 100 may assign a higher priority to the device. A unit time interval at which a service provided by each of the devices was selected by the user may be variously set to 10 minutes, 1 hour, 6 hours, etc.

According to an embodiment of the disclosure, the voice assistant service providing apparatus 100 may assign different priorities to the devices that have been assigned the same priorities as in operation S1031 by further taking into account pick counts (i.e., the number of times that a service suggested by each device was selected by the user) included in the pieces of service provision history information (operation S1033). For example, the voice assistant service providing apparatus 100 may assign a higher priority to a device providing a service that was selected more frequently by the user in the past.

Furthermore, according to an embodiment of the disclosure, when the type of service requested by the voice command is an "action", the voice assistant service providing apparatus 100 may assign priorities to devices based on pieces of device information (operation S1041). The voice assistant service providing apparatus 100 may assign a priority to a device based on whether the device is equipped with an I/O interface for performing an action in response to the voice command and performance of the I/O interface. For example, when the voice command is uttered to request music playback, the voice assistant service providing apparatus 100 may assign a higher priority to a device equipped with a speaker having a better sound quality.

According to an embodiment of the disclosure, the voice assistant service providing apparatus 100 may assign different priorities to the devices that have been assigned the same priorities as in operation S1041 by further taking into account pieces of location information and/or time information respectively included in the pieces of service provision history information (operation S1043). For example, when an output sound quality of a speaker is the same across the devices, as the user is closer to a location of a device and a time at which the device was mainly selected is closer to a current time, the voice assistant service providing apparatus 100 may assign a higher priority to the device.

According to an embodiment of the disclosure, the voice assistant service providing apparatus 100 may assign different priorities to the devices that have been assigned the same priorities as in operation S1043 by further taking into account pick counts (i.e., the number of times that a service suggested by each device was selected by the user) included in the pieces of service provision history information (operation S1045). For example, the voice assistant service providing apparatus 100 may assign a high priority to a device providing a service that was selected very frequently by the user in the past.

However, the disclosure is not limited to the example illustrated in FIG. 10, and the voice assistant service providing apparatus 100 may assign priorities to devices in various orders based on various rules according to embodiments of the disclosure.

For example, the voice assistant service providing apparatus 100 may select, from among a plurality of service provision messages, a service provision message related to a service that has been selected most frequently by the user (i.e., a service having a highest pick count).

Furthermore, the voice assistant service providing apparatus 100 may additionally suggest, as an auxiliary message, a service provision message related to another service with a pick count value whose difference from a pick count value for the service corresponding to the selected service provision message is less than a preset value (e.g., 1).

For example, referring to the service provision history information list 902 of FIG. 9, a pick count for service 5 suggested by the smartphone has a highest value of 5, and a pick count for service 1 suggested by the TV has a next highest value of 4. In this case, the voice assistant service providing apparatus 100 may select, from among a plurality of service provision messages, a service provision message for the smartphone, which has been most frequently selected by the user, for recommendation to the user, and additionally recommend a next most frequently selected service provision message for the TV. The voice assistant service providing apparatus 100 may generate and output, based on the selected service provision messages, a response message saying, "Shall I order, by using the smartphone, pork belly for delivery? or "I can recommend a popular restaurant nearby, as seen on TV."

As another example, when the same service provision message related to a service having a high pick count value has been continuously selected for a first period (e.g., one week), the voice assistant service providing apparatus 100 may select, based on a user's selection ratio, another service provision message related to a service having a low pick count value for recommendation to the user. The voice assistant service providing apparatus 100 may sometimes select a service that was not selected much in the past for recommendation to the user, thereby allowing the user to receive various services.

As another example, the voice assistant service providing apparatus 100 may exclude, from the group related to the voice command, a device that provides a service provision message that has not been selected by the user during a second period (e.g., a quarterly period). The first period may be shorter than the second period. Accordingly, the voice assistant service providing apparatus 100 may select an optimal service preferred by the user for recommendation to the user.

In addition, FIG. 10 illustrates a method of assigning priorities to devices by sequentially determining each piece of information, such as information about whether each of the devices is able to provide a service that responds to a voice command, information about a category of a service provided by the device, location information of the device, and information about the number of times that the service provided by the device was selected, etc. However, the voice assistant service providing apparatus 100 according to various embodiments of the disclosure is not limited to the example shown in FIG. 10, and may select at least one service provision message that is best suited for a user's voice command by comprehensively taking into account service provision messages, pieces of service provision history information, and pieces of device information provided by devices.

When there are service provision messages having the same priority even after performing the operations illustrated in FIG. 10, the voice assistant service providing apparatus 100 may suggest a service to the user by combining the corresponding service provision messages. The voice assistant service providing apparatus 100 may output a response message suggesting an integrated service by learning a resulting text obtained by combining the service provision messages. According to an embodiment of the disclosure, the greater the amount of data that the voice assistant service providing apparatus 100 learns regarding services providable by devices, the higher the accuracy of selecting a service provision message suitable for a user.

Examples of detailed operating methods of a system for providing a voice assistant service according to various embodiments of the disclosure will be described below with reference to FIGS. 11 through 15.

Figure 11:
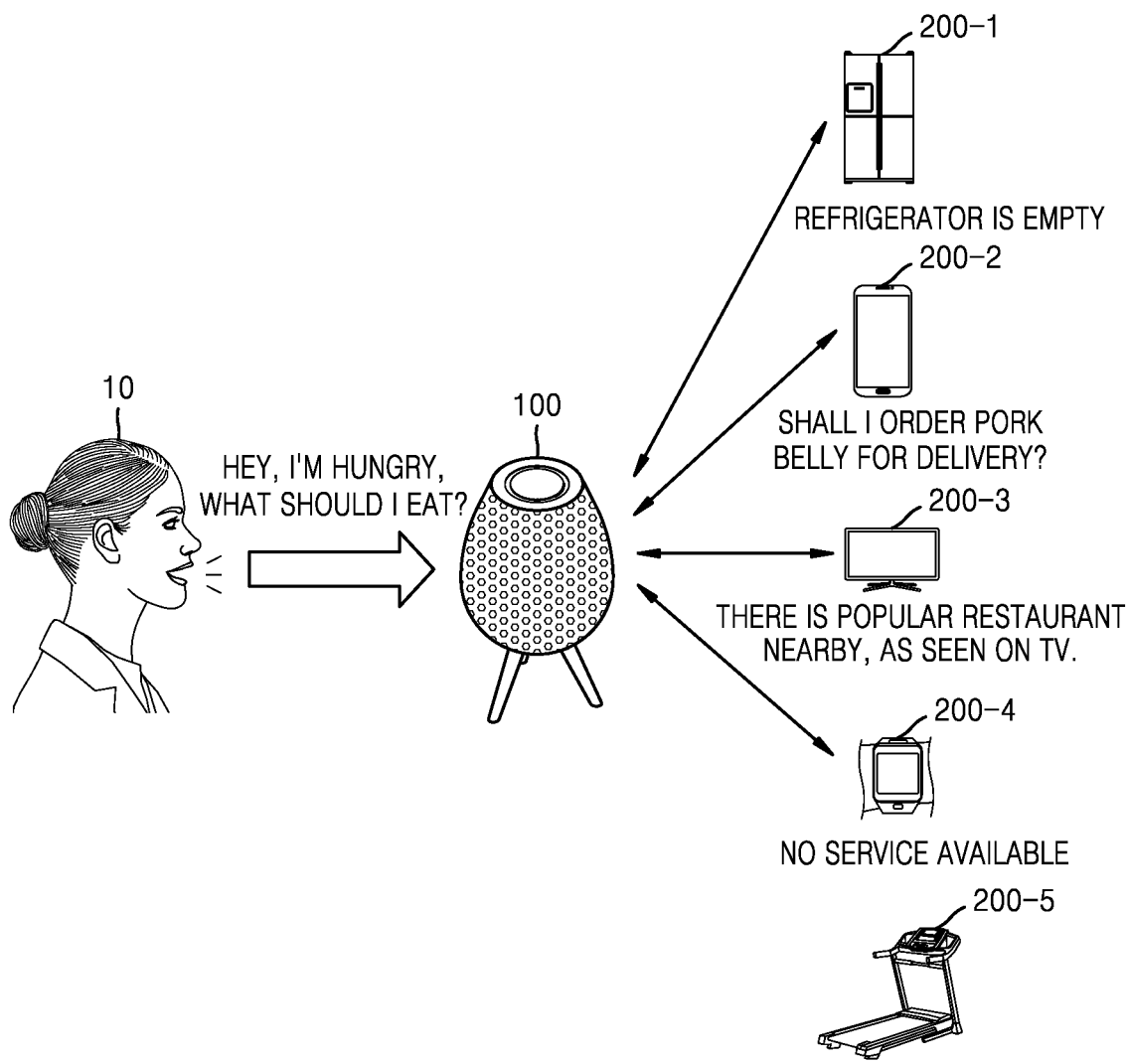
FIG. 11 illustrates an example of a detailed operation method of a system for providing a voice assistant service, according to an embodiment of the disclosure.
Figure 12:
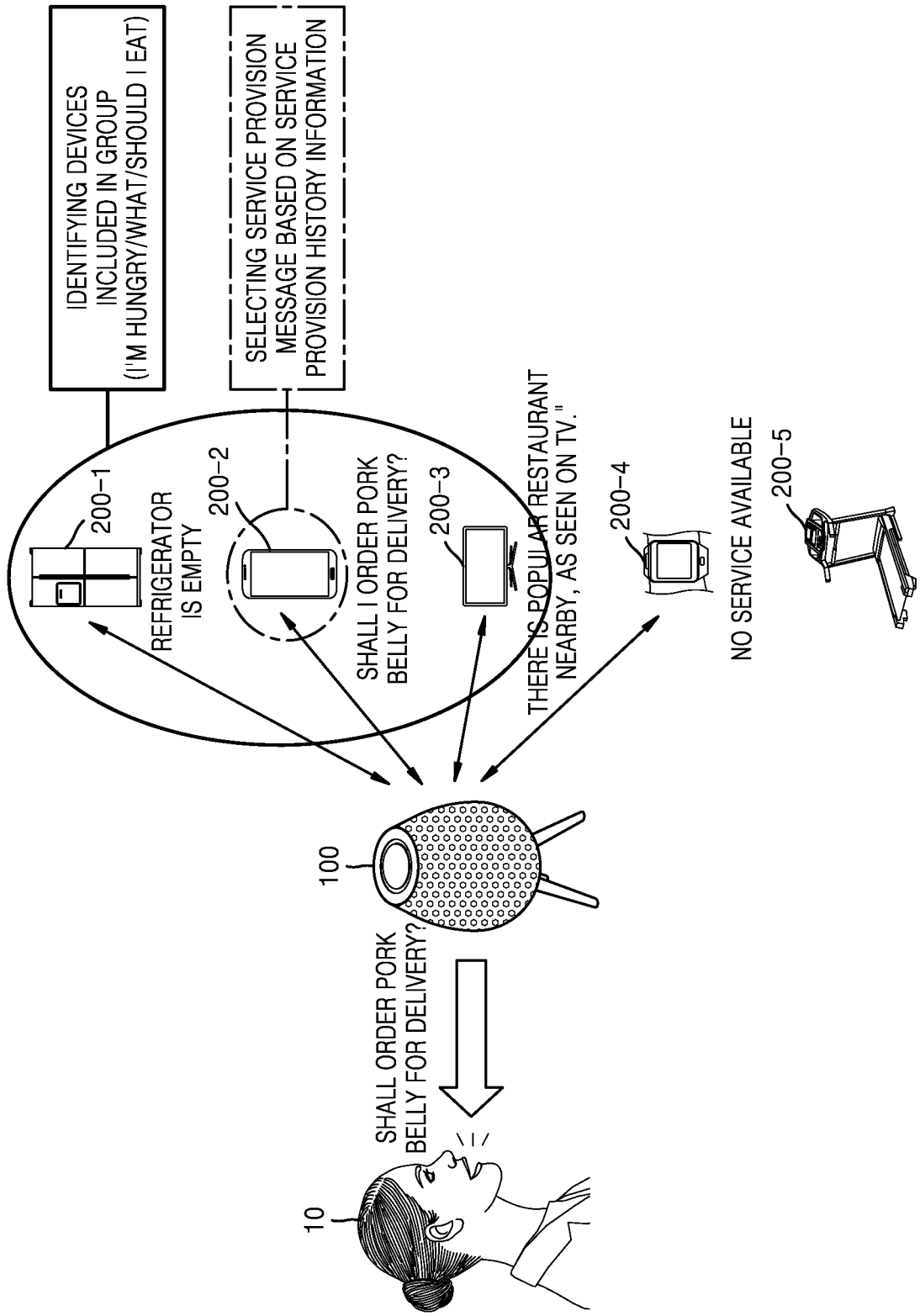
FIG. 12 illustrates another example of a detailed operation method of a system providing a voice assistant service, according to an embodiment of the disclosure.

FIG. 11 illustrates an example of a detailed operation method of a system for providing a voice assistant service, according to an embodiment of the disclosure, and FIG. 12 illustrates another example of a detailed operation method of a system providing a voice assistant service, according to the embodiment of the disclosure. FIGS. 11 and 12 illustrate examples in which the voice assistant service providing apparatus 100 is a smart speaker in the home and interworks with a refrigerator 200-1, a smartphone 200-2, a TV 200-3, a wearable device 200-4, and exercise equipment 200-5.

As shown in FIG. 11, the voice assistant service providing apparatus 100 may receive a user's voice command "I'm hungry, what should I eat?".

The voice assistant service providing apparatus 100 may determine, from among a plurality of candidate devices connected thereto, i.e., the refrigerator 200-1 through the exercise equipment 200-5, a plurality of devices, i.e., the refrigerator 200-1 through the wearable device 200-4, to which information related to the user's voice command is to be transmitted.

The voice assistant service providing apparatus 100 may convert the user's voice command into text and interpret the text. By using a device determination model, the voice assistant service providing apparatus 100 may determine the plurality of devices, i.e., the refrigerator 200-1 through the wearable device 200-4 related to the interpreted text from among the plurality of candidate devices, i.e., the refrigerator 200-1 through the exercise equipment 200-5.

According to an embodiment of the disclosure, the voice assistant service providing apparatus 100 may analyze a text by using a NLU model and determine, based on a text analysis result, the plurality of devices, i.e., the refrigerator 200-1 through the wearable device 200-4 capable of providing services (e.g., menu recommendation, decision on a restaurant, food order, etc.) according to the user's intent from among the candidate devices, i.e., the refrigerator 200-1 through the exercise equipment 200-5.

According to an embodiment of the disclosure, the voice assistant service providing apparatus 100 may determine, via the device determination model, that all the devices, i.e., the refrigerator 200-1 through the wearable device 200-4, having a probability of providing a service according to a user's intent, which is greater than or equal to a threshold value, from among the candidate devices, i.e., the refrigerator 200-1 through the exercise equipment 200-5, are a plurality of devices to which the information related to the voice command is to be transmitted. The voice assistant service providing apparatus 100 may determine that the exercise equipment 200-5 has a low relevance to the service (e.g., menu recommendation, decision on a restaurant, food order, etc.) that matches the user's intent compared to the other candidate devices. Thus, the voice assistant service providing apparatus 100 may determine to transmit the information related to the voice command to each of the refrigerator 200-1, the smartphone 200-2, the TV 200-3, and the wearable device 200-4 from among the candidate devices, i.e., the refrigerator 200-1 through the exercise equipment 200-5.

As shown in FIG. 11, according to an embodiment of the disclosure, even when a large number of devices are connected to the voice assistant service providing apparatus 100, the voice assistant service providing apparatus 100 may transmit information related to a voice command to select some of the connected devices and not to all of the connected devices. Thus, the selective transmission may prevent unnecessary communication resource use that may occur while the voice assistant service providing apparatus 100 is communicating with a lot of devices.

The voice assistant service providing apparatus 100 transmits the information related to the voice command to the devices, i.e., the refrigerator 200-1 through the wearable device 200-4. For example, the voice assistant service providing apparatus 100 may transmit, to the devices, i.e., the refrigerator 200-1 through the wearable device 200-4, [I'm hungry/what/should I eat], which is a result of interpreting the text obtained by converting the voice command, and information indicating that a type of service requested by the voice command is a "notification".

Each of the devices, i.e., the refrigerator 200-1 through the wearable device 200-4, may determine whether it is able to provide a service in response to the received information related to the voice command. For example, each device may select services, a type of which is a "notification" from among services providable by the device, and determine whether there is a service corresponding to the voice command among the selected services.

Referring to FIG. 11, the refrigerator 200-1, the smartphone 200-2, and the TV 200-3 determine that they are able to provide services in response to the user's voice command while the wearable device 200-4 determines that it is unable to provide a service in response to the user's voice command. When a device determines that it is able to provide a service in response to the information related to the voice command, the device may generate a service provision message to be transmitted to the voice assistant service providing apparatus 100. The service provision message that is transmitted to the voice assistant service providing apparatus 100 may be generated in the format illustrated in FIG. 9.

First, the refrigerator 200-1 may generate, in response to the user's voice command "I'm hungry, what should I eat?", a service provision message [(I'm hungry/what/should I eat)/device 3/notification/service 3/application 4/"The refrigerator is empty." ] and transmit the service provision message to the voice assistant service providing apparatus 100. The refrigerator 200-1 may transmit, to the voice assistant service providing apparatus 100, the service provision message including information indicating that the refrigerator 200-1 is included in a group (I'm hungry/what/should I eat) related to the voice command and tries to provide service 3 that is a notification service via application 4 in response to the voice command. For example, as shown in FIG. 11, the refrigerator 200-1 may suggest a service for notifying the user that the refrigerator 200-1 is empty via application 4 for managing ingredients stored in the refrigerator 200-1.

Next, the smartphone 200-2 may generate, in response to the user's voice command "I'm hungry, what should I eat?", a service provision message [(I'm hungry/what/should I eat)/device 4/notification/service 5/application 3/"Shall I order pork belly for delivery?"] and transmit the service provision message to the voice assistant service providing apparatus 100. The smartphone 200-2 may transmit, to the voice assistant service providing apparatus 100, the service provision message including information indicating that the smartphone 200-2 is included in the group (I'm hungry/what/should I eat) related to the voice command and tries to provide service 5 that is a notification service via application 3 in response to the voice command. For example, as shown in FIG. 11, the smartphone 200-2 may suggest a service for ordering delivery pork belly that is a user's most preferred food via application 3 for ordering food delivery.

The TV 200-3 may generate, in response to the user's voice command "I'm hungry, what should I eat?", a service provision message [(I'm hungry/what/should I eat)/device 1/notification/service 1/application 1/"There is a popular restaurant nearby, as seen on TV."] and transmit the service provision message to the voice assistant service providing apparatus 100. The TV 200-3 may transmit, to the voice assistant service providing apparatus 100, the service provision message including information indicating that the TV 200-3 is included in the group (I'm hungry/what/should I eat) related to the voice command and tries to provide service 1 that is a notification service via application 1 in response to the voice command. For example, as shown in FIG. 11, the TV 200-3 may suggest a service for recommending a restaurant around the user introduced on the TV via application 1 for providing TV program information.

Moreover, although not shown in FIG. 11, each of the refrigerator 200-1, the smartphone 200-2, and the TV 200-3 may transmit, to the voice assistant service providing apparatus 100, service provision history information together with a corresponding service provision message. The service provision history information transmitted to the voice assistant service providing apparatus 100 may be generated using the format illustrated in FIG. 9.

For example, the refrigerator 200-1 may transmit, to the voice assistant service providing apparatus 100, service provision history information indicating that the refrigerator 200-1 is able to provide a service that responds to the user's voice command "I'm hungry, what should I eat?" (isSupported=yes), the number of times that the service was selected by the user is 1 (pick count=1), the number of times that the service was suggested but not selected is 8 (no pick count=8), the refrigerator 200-1 is located in the kitchen, and the service provided by the refrigerator 200-1 is mainly selected at 18:00.

The smartphone 200-2 may transmit, to the voice assistant service providing apparatus 100, service provision history information indicating that the smartphone 200-2 is able to provide a service that responds to the user's voice command "I'm hungry, what should I eat?" (isSupported=yes), the number of times that the service was selected by the user is 5 (pick count=5), the number of times that the service was suggested but not selected is 4 (no pick count=4), the smartphone 200-2 is located in the living room, and the service provided by the smartphone 200-2 is mainly selected at 22:30.

The TV 200-3 may transmit, to the voice assistant service providing apparatus 100, service provision history information indicating that the TV 200-3 is able to provide a service that responds to the user's voice command "I'm hungry, what should I eat?" (isSupported=yes), the number of times that the service was selected by the user is 4 (pick count=4), the number of times that the service was suggested but not selected is 6 (no pick count=6), the TV 200-3 is located in the living room, and the service provided by the TV 200-3 is mainly selected at 22:30.

Next, referring to FIG. 12, the voice assistant service providing apparatus 100 may group the devices i.e., the refrigerator 200-1 through the wearable device 200-4, based on service provision messages respectively received from the devices. The voice assistant service providing apparatus 100 may determine that the refrigerator 200-1, the smartphone 200-2, and the TV 200-3 that have transmitted the service provision messages indicating that they are included in the group (I'm hungry/what/should I eat) related to the voice command are included in a single group.

The voice assistant service providing apparatus 100 may transmit, to the refrigerator 200-1, the smartphone 200-2, and the TV 200-3, group information indicating that the refrigerator 200-1, the smartphone 200-2, and the TV 200-3 are included in one group.

The voice assistant service providing apparatus 100 may select at least one service provision message from among the service provision messages transmitted by the refrigerator 200-1, the smartphone 200-2, and the TV 200-3 included in the group. The voice assistant service providing apparatus 100 may select at least one service provision message from among a group of the service provision messages, based on service provision history information of each device received together with a corresponding service provision message.

According to an embodiment of the disclosure, when a type of service requested by the voice command is a "notification", the voice assistant service providing apparatus 100 may assign a priority to a device based on location information and/or time information included in service provision history information. For example, when the current time is 22:30, the voice assistant service providing apparatus 100 may assign the same high priority to the smartphone 200-2 and the TV 200-3 that were mainly selected at 22:30.

Next, the voice assistant service providing apparatus 100 may select a service provision message for the smartphone 200-2 having a higher pick count between the smartphone 200-2 and the TV 200-3.

The voice assistant service providing apparatus 100 may output, based on the selected service provision message, a response message in response to the voice command. As illustrated in FIG. 12, the voice assistant service providing apparatus 100 may generate and output a response message "Shall I order pork belly for delivery?" based on the selected service provision message.

Referring to FIG. 12, the voice assistant service providing apparatus 100 selects a service provision message with a highest priority and generates and outputs a response message based on the selected service provision message. However, the voice assistant service providing apparatus 100 according to various embodiments of the disclosure is not limited to the example shown in FIG. 12.

Figure 13:
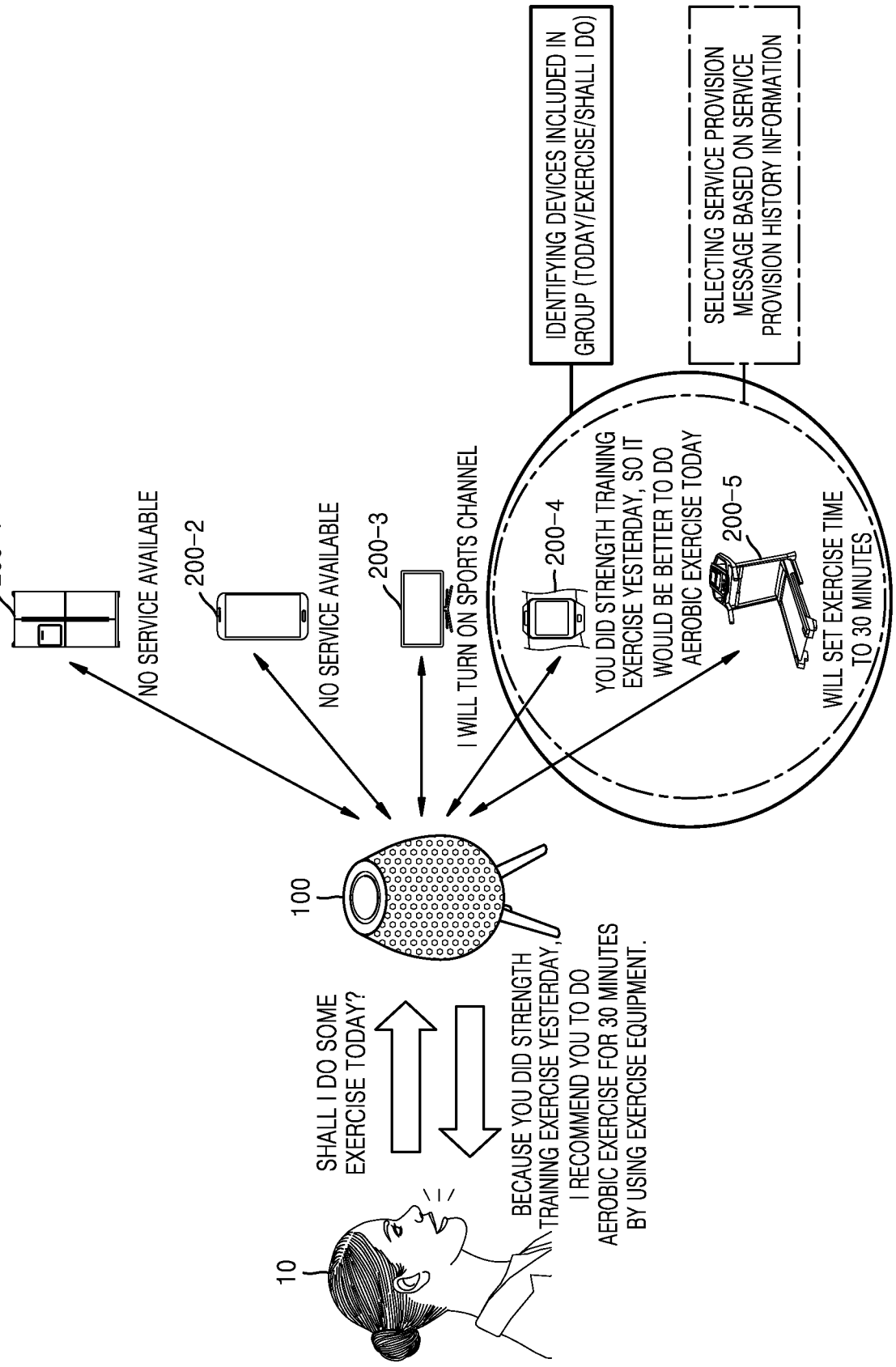
FIG. 13 illustrates an example of a detailed operation method of a system for providing a voice assistant service, according to another embodiment of the disclosure.

As shown in FIG. 13, according to an embodiment of the disclosure, the voice assistant service providing apparatus 100 may select a plurality of service provision messages and generate and output a response message to include information about the service provision messages.

FIG. 13 illustrates an example of a detailed operation method of a system for providing a voice assistant service, according to another embodiment of the disclosure;

As shown in FIG. 13, the voice assistant service providing apparatus 100 may receive a user's voice command "Shall I do some exercise today?". The voice assistant service providing apparatus 100 may determine, from among a plurality of candidate devices connected thereto, a plurality of devices, i.e., a refrigerator 200-1 through exercise equipment 200-5, to which information related to the user's voice command is to be transmitted.

The voice assistant service providing apparatus 100 transmits the information related to the voice command to the devices, i.e., the refrigerator 200-1 through the exercise equipment 200-5. For example, the voice assistant service providing apparatus 100 may transmit, to the devices, i.e., the refrigerator 200-1 through the exercise equipment 200-5, [today/exercise/shall I do], which is a result of interpreting a text obtained by converting the voice command, and information indicating that a type of service requested by the voice command is a "notification".

Each of the devices, i.e., the refrigerator 200-1 through the exercise equipment 200-5 may determine whether it is able to provide a service in response to the received information related to the voice command. Referring to FIG. 13, the TV 200-3, the wearable device 200-4, and the exercise equipment 200-5 determine that they are able to provide services in response to the user's voice command while the refrigerator 200-1 and the smartphone 200-2 determine that they are unable to provide a service in response to the user's voice command. When a device determines that it is able to provide a service in response to the information related to the voice command, the device may generate a service provision message to be transmitted to the voice assistant service providing apparatus 100. The service provision message that is transmitted to the voice assistant service providing apparatus 100 may be generated in the format illustrated in FIG. 9.

First, in response to the user's voice command "Shall I do some exercise today?", the TV 200-3 has not been notified that it is included in a group (today/exercise/shall I do) related to the voice command but may suggest a service for recommending changing a TV channel to a sports channel. The TV 200-3 may generate a service provision message including information "I'll turn on a sports channel" and transmit the service provision message to the voice assistant service providing apparatus 100.

Next, in response to the user's voice command "Shall I do some exercise today?", the wearable device 200-4 may transmit, to the voice assistant service providing apparatus 100, a service provision message including information indicating that the wearable device 200-4 is included in the group (today/exercise/shall I do) related to the voice command and suggests a service for recommending an aerobic exercise via an application that records the user's exercise history and recommends suitable exercises.

The wearable device 200-4 may generate a service provision message including information "You did strength training exercise yesterday, so it would be better to do aerobic exercise today," and transmit the service provision message to the voice assistant service providing apparatus 100.

Next, in response to the user's voice command "Shall I do some exercise today?", the exercise equipment 200-5 may transmit, to the voice assistant service providing apparatus 100, a service provision message including information indicating that the exercise equipment 200-5 is included in the group (today/exercise/shall I do) related to the voice command and suggests a service for setting a user's preferred exercise time on a timer via an application for recording the user's exercise history. The exercise equipment 200-5 may generate a service provision message including information "I'll set an exercise time to 30 minutes," and transmit the service provision message to the voice assistant service providing apparatus 100.

Furthermore, although not shown in FIG. 13, each of the TV 200-3, the wearable device 200-4, and the exercise equipment 200-5 may transmit, together with a corresponding service provision message, service provision history information and device information to the voice assistant service providing apparatus 100. The service provision history information and device information transmitted to the voice assistant service providing apparatus 100 may be generated in the format illustrated in FIG. 9.

The voice assistant service providing apparatus 100 may group the devices, i.e., the refrigerator 200-1 through the exercise equipment 200-5, based on service provision messages received respectively from the devices. The voice assistant service providing apparatus 100 may determine that the wearable device 200-4 and the exercise equipment 200-5 that have transmitted the service provision messages indicating that they are included in the group (today/exercise/shall I do) related to the voice command are included in a single group.

Referring to FIG. 13, the voice assistant service providing apparatus 100 identifies, from a service provision message, information about whether each device is included in the group related to the voice command and determines, based on the identified information, whether the corresponding device is included in the group related to the voice command. In other words, the voice assistant service providing apparatus 100 determines whether each device is included in the group related to the voice command, based on group information previously learned by and stored in the device. Accordingly, the voice assistant service providing apparatus 100 may not need to perform operations of analyzing service provision messages and pieces of service provision history information, which are received from devices, and grouping the devices, thereby improving a response speed.

Later, the voice assistant service providing apparatus 100 may analyze service provision messages received from the devices, regroup the devices, and update group information. For example, the voice assistant service providing apparatus 100 may update group information to include the TV 200-3 as well as the wearable device 200-4 and the exercise equipment 200-5 in one group. The voice assistant service providing apparatus 100 may transmit the updated group information to the TV 200-3, the wearable device 200-4, and the exercise equipment 200-5.

The voice assistant service providing apparatus 100 may select at least one of the service provision messages respectively received from the wearable device 200-4 and the exercise equipment 200-5 determined as being included in one group, based on at least one of service provision history information or device information of each device, which is received together with a corresponding service provision message. In FIG. 13, the voice assistant service providing apparatus 100 may select both the service provision messages respectively received from the wearable device 200-4 and the exercise equipment 200-5.

The voice assistant service providing apparatus 100 may output, based on the selected service provision messages, a response message in response to the voice command. As shown in FIG. 13, the voice assistant service providing apparatus 100 may generate and output one response message by combining selected service provision messages. For example, the voice assistant service providing apparatus 100 may combine the service provision messages respectively received from the wearable device 200-4 and the exercise equipment 200-5 to generate and output a response message saying, "Because you did strength training exercise yesterday, how about doing aerobic exercise for 30 minutes by using exercise equipment?".

Figure 14:
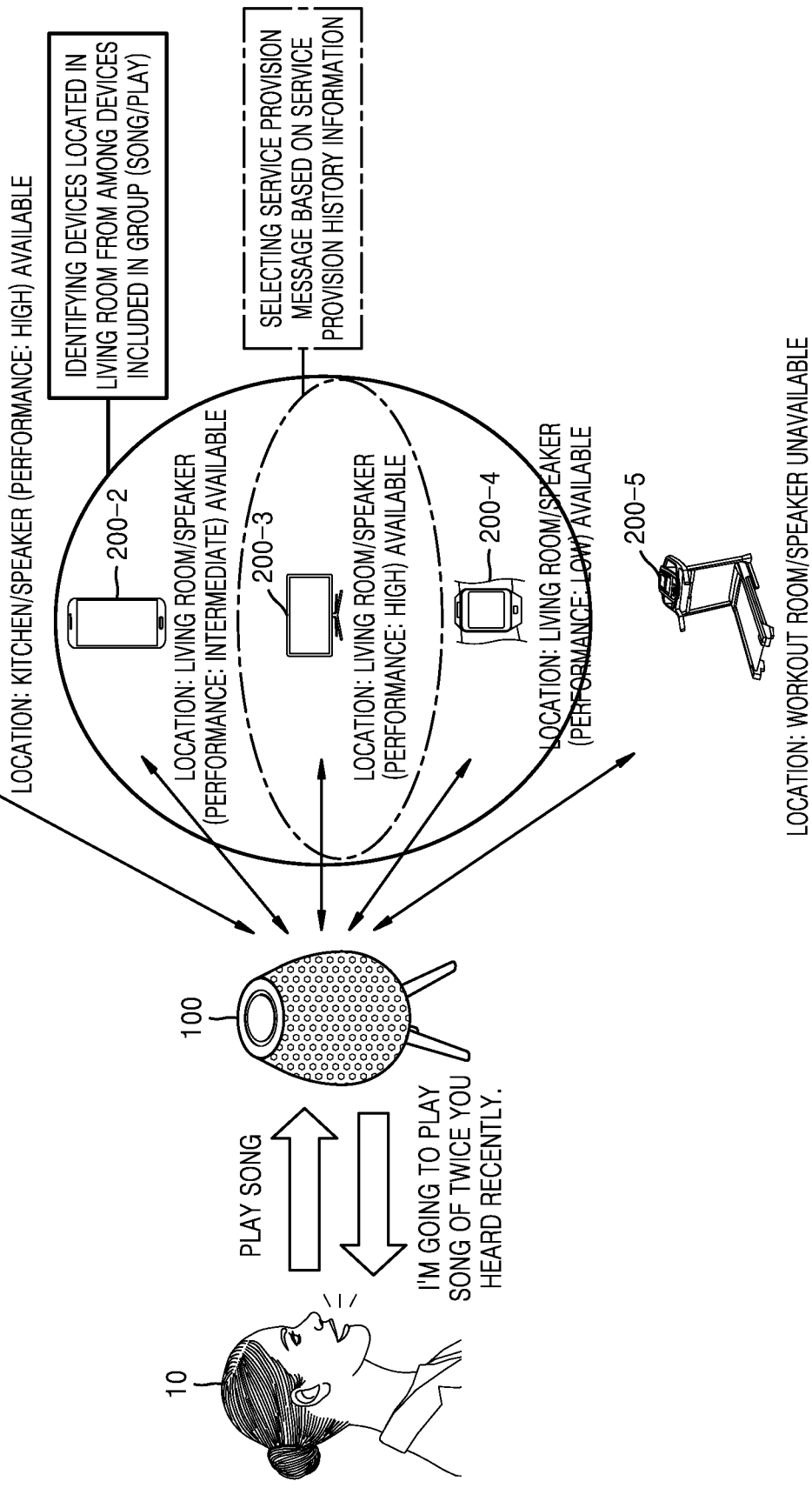
FIG. 14 illustrates an example of a detailed operation method of a system for providing a voice assistant service, according to another embodiment of the disclosure.

Moreover, according to an embodiment of the disclosure, the voice assistant service providing apparatus 100 may identify devices included in one group by taking into account service provision history information or device information of each device, which is received together with a corresponding service provision message. FIG. 14 illustrates an example of a detailed operation method of a system for providing a voice assistant service, according to another embodiment of the disclosure.

As shown in FIG. 14, according to an embodiment of the disclosure, the voice assistant service providing apparatus 100 may receive a user's voice command "Play a song". The voice assistant service providing apparatus 100 may determine, from among a plurality of candidate devices connected thereto, a plurality of devices, i.e., a refrigerator 200-1 through exercise equipment 200-5, to which information related to the user's voice command is to be transmitted.

The voice assistant service providing apparatus 100 transmits the information related to the voice command to the devices, i.e., the refrigerator 200-1 through the exercise equipment 200-5. For example, the voice assistant service providing apparatus 100 may transmit, to the devices, i.e., the refrigerator 200-1 through the exercise equipment 200-5, [song/play], which is a result of interpreting a text obtained by converting the voice command, and information indicating that a type of service requested by the voice command is an "action".

Each of the devices, i.e., the refrigerator 200-1 through the exercise equipment 200-5 may determine whether it is able to provide a service in response to the received information related to the voice command. The devices, i.e., the refrigerator 200-1 through the exercise equipment 200-5, may determine whether they are able to provide services based on the presence or absence of a speaker for reproducing a song.

Referring to FIG. 14, the refrigerator 200-1, the smartphone 200-2, the TV 200-3, and the wearable device 200-4 determine that they are able to provide services in response to the user's voice command while the exercise equipment 200-5 determines that it is unable to provide a service in response to the user's voice command. When a device determines that it is able to provide a service in response to the information related to the voice command, the device may generate a service provision message to be transmitted to the voice assistant service providing apparatus 100. The service provision message that is transmitted to the voice assistant service providing apparatus 100 may be generated in the format illustrated in FIG. 9.

In response to the user's voice command "Play a song," the refrigerator 200-1 may transmit, to the voice assistant service providing apparatus 100, a service provision message including information indicating that the refrigerator 200-1 is included in the group (song/play) related to the voice command and suggests a service for playing back a song that the user recently heard. The refrigerator 200-1 may generate a service provision message including information "I'm going to play a Twice song you recently heard" and transmit it to the voice assistant service providing apparatus 100.

Next, in response to the user's voice command "Play a song," each of the smartphone 200-2, the TV 200-3, and the wearable device 200-4 may transmit, to the voice assistant service providing apparatus 100, a service provision message including information indicating that the corresponding device is included in the group (song/play) related to the voice command and suggests a service for playing back a song that the user recently heard. Each of the smartphone 200-2, the TV 200-3, and the wearable device 200-4 may generate a service provision message including information "I'm going to play a Twice song you recently heard" and transmit the service provision message to the voice assistant service providing apparatus 100.

Furthermore, although not shown in FIG. 14, each of the TV 200-3, the wearable device 200-4, and the exercise equipment 200-5 may transmit, together with a corresponding service provision message, service provision history information and device information to the voice assistant service providing apparatus 100. The service provision history information and device information transmitted to the voice assistant service providing apparatus 100 may be generated in the format illustrated in FIG. 9.

For example, the refrigerator 200-1 may further transmit a service provision history including information indicating that the refrigerator 200-1 is located in the kitchen. Each of the smartphone 200-2, the TV 200-3, and the wearable device 200-4 may further transmit a service provision history including information indicating that the corresponding device is located in the living room.

The voice assistant service providing apparatus 100 may group the devices, i.e., the refrigerator 200-1 through the exercise equipment 200-5, based on service provision messages respectively received from the devices, i.e., the refrigerator 200-1 through the exercise equipment 200-5. The voice assistant service providing apparatus 100 may determine that the wearable device 200-4 and the exercise equipment 200-5 that have transmitted the service provision messages indicating that they are included in the group (song/play) related to the voice command are included in a single group.

The voice assistant service providing apparatus 100 may select at least one service provision message from among the service provision messages respectively received from the refrigerator 200-1, the smartphone 200-2, the TV 200-3, and the wearable device 200-4 determined as being included in one group, based on at least one of service provision history information or device information of each device, which is received together with a corresponding service provision message.

First, the voice assistant service providing apparatus 100 may identify, based on location information of a device included in the service provision history information, the voice assistant service providing apparatus 100 may identify the smartphone 200-2, the TV 200-3, and the wearable device 200-4 located in the "living room" close to a current location of the user or voice assistant service providing apparatus 100.

Next, the voice assistant service providing apparatus 100 may assign a priority to a device according to speaker performance for the device based on device information. The voice assistant service providing apparatus 100 may select a service provision message received from the TV 200-3 offering highest speaker performance.

The voice assistant service providing apparatus 100 may generate and output a response message "I'm going to play a Twice song you recently heard on TV," based on the selected service provision message.

Figure 15:
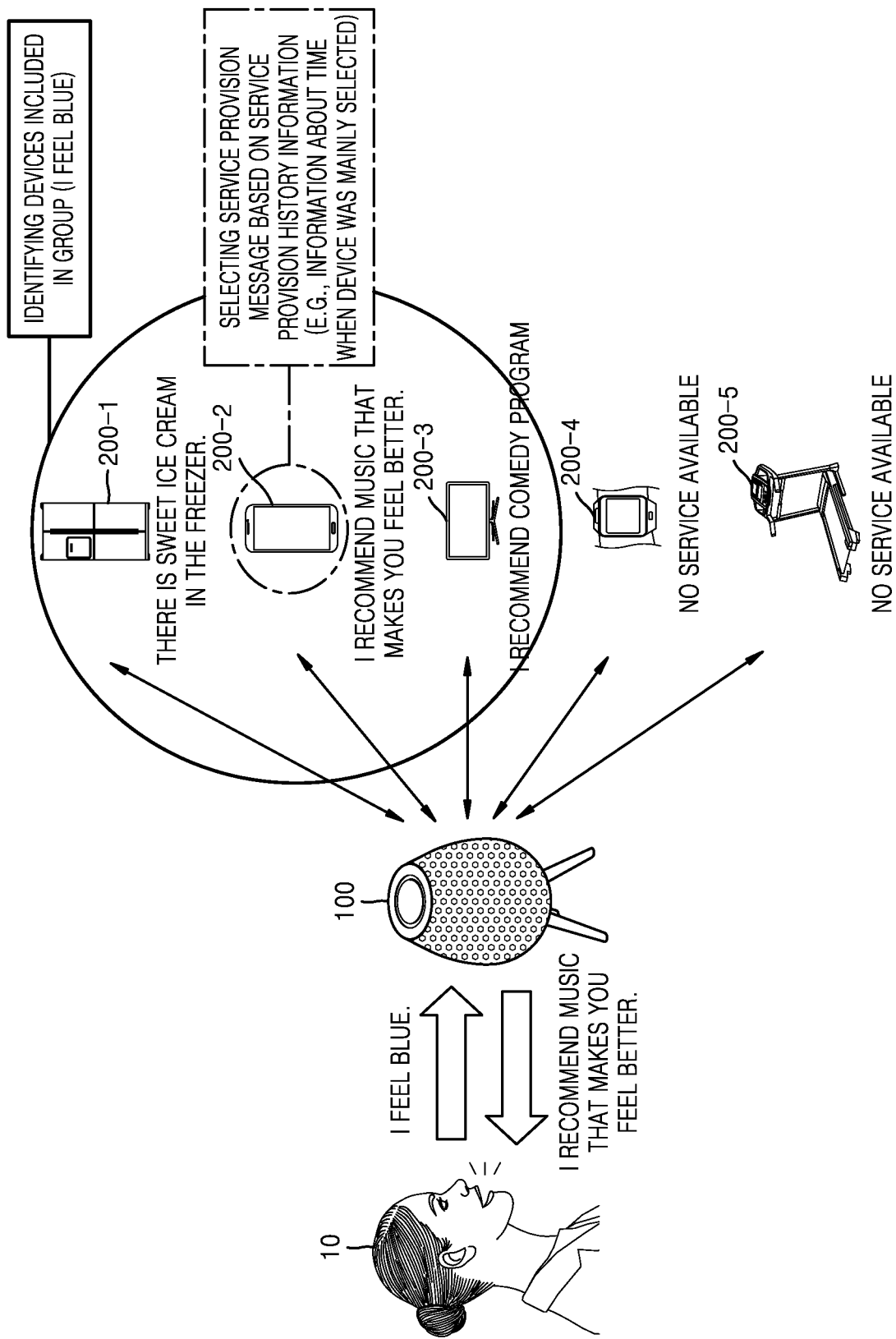
FIG. 15 illustrates an example of a detailed operation method of a system for providing a voice assistant service, according to another embodiment of the disclosure.

FIG. 15 illustrates an example of a detailed operation method of a system for providing a voice assistant service, according to another embodiment of the disclosure.

As shown in FIG. 15, according to an embodiment of the disclosure, the voice assistant service providing apparatus 100 may receive a user's voice command "I feel blue".

The voice assistant service providing apparatus 100 transmits the information related to the voice command to the devices, i.e., the refrigerator 200-1 through the exercise equipment 200-5. For example, the voice assistant service providing apparatus 100 may transmit, to the devices, i.e., the refrigerator 200-1 through the exercise equipment 200-5, [I feel blue], which is a result of interpreting a text obtained by converting the voice command, and information indicating that a type of service requested by the voice command is a "notification".

Each of the devices, i.e., the refrigerator 200-1 through the exercise equipment 200-5, may determine whether it is able to provide a service in response to the received information related to the voice command. Referring to FIG. 15, the refrigerator 200-1, the smartphone 200-2, and the TV 200-3 determine that they are able to provide services in response to the user's voice command while the wearable device 200-4 and the exercise equipment 200-5 determine that they are unable to provide a service in response to the user's voice command. When a device determines that it is able to provide a service in response to the information related to the voice command, the device may generate a service provision message to be transmitted to the voice assistant service providing apparatus 100. The service provision message that is transmitted to the voice assistant service providing apparatus 100 may be generated in the format illustrated in FIG. 9.

First, in response to the user's voice command "I feel blue," the refrigerator 200-1 may transmit, to the voice assistant service providing apparatus 100, a service provision message including information indicating that the refrigerator 200-1 is included in the group (I feel blue) related to the voice command and information about a service for recommending an ice cream to the user via an application for managing ingredients stored in the refrigerator 200-1.

Next, in response to the user's voice command "I feel blue," the smartphone 200-2 may transmit, to the voice assistant service providing apparatus 100, a service provision message including information indicating that the smartphone 200-2 is included in the group (I feel blue) related to the voice command and information about a service for recommending playing music via a music playback application.

Next, in response to the user's voice command "I feel blue," the TV 200-3 may transmit, to the voice assistant service providing apparatus 100, a service provision message including information indicating that the TV 200-3 is included in the group (I feel blue) related to the voice command and information about a service for recommending a comedy program via an application for providing TV program information.

The voice assistant service providing apparatus 100 may group the devices, i.e., the refrigerator 200-1 through the exercise equipment 200-5, based on service provision messages received from the devices. The voice assistant service providing apparatus 100 may determine that the refrigerator 200-1, the smartphone 200-2, and the TV 200-3 that have transmitted the service provision messages indicating that they are included in the group (I feel blue) related to the voice command are included in a single group.

The voice assistant service providing apparatus 100 may select at least one service provision message from among the service provision messages transmitted by the refrigerator 200-1, the smartphone 200-2, and the TV 200-3 included in the group. The voice assistant service providing apparatus 100 may select at least one service provision message from among a group of the service provision messages, based on service provision history information of each device received together with a corresponding service provision message.

According to an embodiment of the disclosure, when a type of service requested by the voice command is a "notification", the voice assistant service providing apparatus 100 may assign a priority to a device based on location information and/or time information included in service provision history information. For example, the voice assistant service providing apparatus 100 may assign a highest priority to the smartphone 200-2 that was mainly selected at a time close to the current time.

The voice assistant service providing apparatus 100 may output, based on the selected service provision message, a response message in response to the voice command. As illustrated in FIG. 15, the voice assistant service providing apparatus 100 may generate and output a response message "I recommend music that makes you feel better," based on the selected service provision message.

A configuration of the voice assistant service providing apparatus 100 according to an embodiment of the disclosure will now be described in detail. Each component of the voice assistant service providing apparatus 100 to be described below may perform a corresponding operation of the operation method of the voice assistant service providing apparatus 100. Thus, descriptions that are already provided above are omitted.

Figure 16:
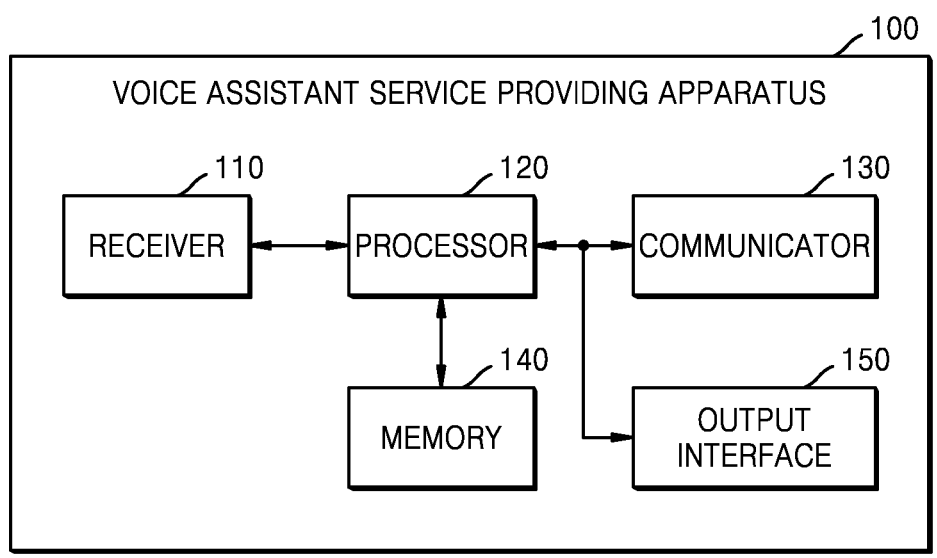
FIG. 16 illustrates a block diagram of a configuration of a voice assistant service providing apparatus according to an embodiment of the disclosure.

FIG. 16 illustrates a block diagram of a configuration of a voice assistant service providing apparatus 100 according to an embodiment of the disclosure.

Furthermore, according to an embodiment of the disclosure, the voice assistant service providing apparatus 100 may be a fixed or mobile terminal implemented as a computer device. For example, the voice assistant service providing apparatus 100 may be at least one of a smartphone, a mobile phone, a navigation device, a computer, a notebook computer, a digital broadcasting terminal, a smart speaker, a PDA, a PMP, or a tablet PC, but is not limited thereto. The voice assistant service providing apparatus 100 may communicate with other devices and/or servers through a network by using a wireless or wired communication method.

Referring to FIG. 16, the voice assistant service providing apparatus 100 may include a receiver 110, a processor 120, a communicator 130, a memory 140, and an output interface 150. All components shown in FIG. 16 are not essential components of the voice assistant service providing apparatus 100. The voice assistant service providing apparatus 100 may be implemented with more or fewer components than those shown in FIG. 16. For example, as shown in FIG. 18, according to some embodiments of the disclosure, the voice assistant service providing apparatus 100 may further include a user input interface 2100, a sensor module 2400, an audio/video (AV) input interface 2600. At least one component shown in FIGS. 16 through 18 may perform operations described with reference to FIGS. 4 and 5. Thus, descriptions that are already provided above with respect to FIGS. 4 and 5 are omitted.

According to an embodiment of the disclosure, the receiver 110 may receive a voice command from a user. For example, the receiver 110 may receive a voice command by converting an external sound into electrical audio data via a microphone. Although FIG. 16 shows that the receiver 110 is included in the voice assistant service providing apparatus 100, the receiver 110 according to another embodiment of the disclosure may be included in a separate device and connected to the voice assistant service providing apparatus 100 via a wire or wirelessly.

According to an embodiment of the disclosure, the memory 140 may store instructions for providing a voice assistant service, various models, neural networks, or dictionary information used for speech recognition, etc.

According to an embodiment of the disclosure, by executing one or more instructions stored in the memory 140, the processor 120 may control the receiver 110, the communicator 130, and the output interface 150 to provide a voice assistant service according to various embodiments of the disclosure. Although FIG. 16 shows that the voice assistant service providing apparatus 100 includes one processor 120, the disclosure is not limited to the illustrated embodiment. The voice assistant service providing apparatus 100 may include a plurality of processors. When the voice assistant service providing apparatus 100 includes a plurality of processors, operations and functions of the processor 120 to be described later may be partially performed by the processors.

According to an embodiment of the disclosure, the processor 120 may receive a first voice command from a user via the receiver 110.

The processor 120 may convert the first voice command into a first text, interpret the first text, and transmit a result of interpreting the first text and information about a type of service requested by the first voice command as information related to the first voice command.

The processor 120 may determine, from among a plurality of candidate devices, a plurality of devices to which information related to the first voice command is to be transmitted. The processor 120 may determine a user's intent based on the result of interpreting the first text. The processor may determine, based on a relevance between the user's intent and each of the candidate devices, a plurality of devices to which the first voice command is to be transmitted, from among the candidate devices. The processor 120 may determine, via a device determination model, a plurality of devices having a high probability of providing a service according to the user's intent from among the candidate devices.

The processor may control, based on a result of the determination, the communicator 130 to transmit the information related to the first voice command received from the user. According to an embodiment of the disclosure, the communicator 130 may communicate with an external device, device, or server by using a wireless or wired communication method. The communicator 130 may include a short-range wireless communication module, wired communication module, a mobile communication module, and a broadcast receiving module.

Each of the plurality of devices may generate and transmit a service provision message in response to the received information related to the first voice command of the user. Each of the plurality of devices may further transmit at least one of service provision history information or device information to the voice assistant service providing apparatus 100.

The processor 120 may respectively receive, via the communicator 130, from the plurality of devices, a plurality of service provision messages that respond to the first voice command and pieces of service provision history information of the plurality of devices. In addition, the processor 120 may further respectively receive, via the communicator 130, pieces of device information from the plurality of devices, each piece of information regarding sub-devices constituting each device.

A service provision message received from a device may include at least one of information about whether the device is able to provide a service in response to a voice command, information about whether the device is included in a group related to the voice command, ID information of the device, ID information of a service provided by the device in response to the voice command, a type of the service, or ID information of an application used to provide the service.

Service provision history information refers to information about a past history related to a service that has been provided or suggested by a device in response to information related to a certain voice command of the user, which is received from the voice assistant service providing apparatus 100. The service provision history information may include at least one of information about whether the device is able to provide a service in response to a voice command, the number of times that a service suggested by the device in response to the voice command was selected by the user, or context information when the service was selected in response to the voice command.

According to an embodiment of the disclosure, the processor 120 may select at least one of a plurality of service provision messages based on service provision history information.

According to an embodiment of the disclosure, the processor 120 may perform grouping to identify devices included in a first group related to the first voice command from among the plurality of devices. The processor 120 may group devices based on at least one of a service provision message or service provision history information received from each of the devices, and learn a result of the grouping.

Furthermore, the processor 120 may select, based on pieces of service provision history information of the devices identified as being included in the first group, at least one of the service provision messages received from the identified devices. The processor 120 may select at least one of a plurality of service provision messages by further taking into account pieces of device information regarding a plurality of devices.

According to an embodiment of the disclosure, the processor 120 may use a service recommendation model stored in the memory 140 to select at least one of a plurality of service provision messages. The service recommendation model may be an AI algorithm trained based on at least one of a voice command, service provision histories for a plurality of devices with respect to the voice command, or pieces of device information regarding the plurality of devices.

The processor 120 may assign priorities or weights to a plurality of service provision messages based on pieces of service provision history information and/or pieces of device information regarding devices. The processor 120 may assign priorities or weights to the service provision messages based on at least one of information about whether each device provides a service in response to the first voice command, a type of service provided by each device in response to the first voice command, the number of times that a service provided by each device in response to the first voice command was selected, context information obtained when a service provided by each device in response to the first voice command was selected, or device information regarding sub-devices constituting each device. The processor 120 may select at least one of the service provision messages based on the assigned weights or priorities.

According to an embodiment of the disclosure, the processor 120 may generate a response message responding to the first voice command based on the selected at least one service provision message and output the response message via the output interface 150.

The processor 120 may generate a response message to include service information related to the selected at least one service provision message. According to an embodiment of the disclosure, the output interface 150 may include a speaker for outputting a response message or a display for outputting a video signal.

The user may listen to the response message that responds to the first voice command and decide whether to accept a service suggested by the voice assistant service providing apparatus 100. The user may utter a second voice command based on the decision.

According to an embodiment of the disclosure, the processor 120 may receive a second voice command from the user.

According to an embodiment of the disclosure, the processor 120 may determine, based on a voice command received from the user, user's certain operation, or user input, a service selected by the user from among services provided by a plurality of devices. The processor 120 may transmit, via the communicator 130, information related to the service selected by the user to the devices. Furthermore, the processor 120 may train, based on the information related to the service selected by the user, the service recommendation model stored in the memory 140. The processor 120 may continuously train the service recommendation model according to a user's voice command in order to suggest an optimal service preferred by the user from among various services provided by the devices.

According to an embodiment of the disclosure, when a device or a request for a service provided by the device is specified in the first voice command of the user or information related to the device is included therein, the processor 120 of the voice assistant service providing apparatus 100 may operate to generate a response message more simply. The processor 120 may omit an operation of determining a plurality of devices and an operation of selecting at least one of service provision messages received from the devices. According to an embodiment of the disclosure, the processor 120 may transmit information related to the first voice command to a device, receive a service provision message from the device, and generate and output a response message to include information related to a service in the received service provision message.

Moreover, according to an embodiment of the disclosure, the processor 120 of the voice assistant service providing apparatus 100 may obtain pieces of device information from a plurality of devices connected to the voice assistant service providing apparatus 100. For example, device information may include resource information and/or capability information of a corresponding device. According to an embodiment of the disclosure, the processor 120 may play a more leading role in providing a voice assistant service based on the pieces of device information regarding the devices. The processor 120 may adaptively select a plurality of devices or at least one service provision message according to resource information and/or capability information of the devices.

Operations of components of the voice assistant service providing apparatus 100 will now be described in more detail with reference to FIG. 17.

Figure 17:
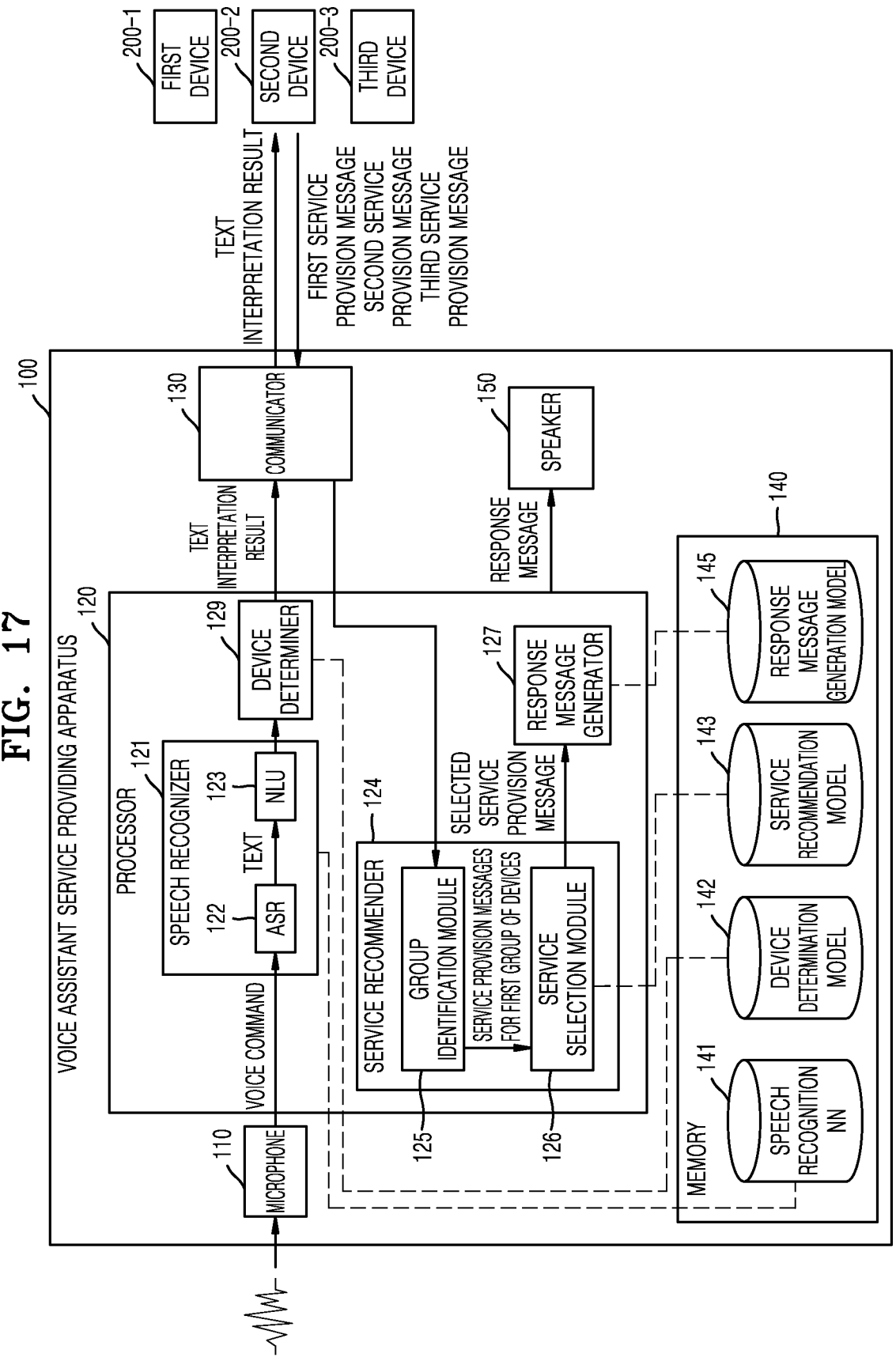
FIG. 17 illustrates a detailed block diagram of a configuration of a voice assistant service providing apparatus according to an embodiment of the disclosure.
Figure 18:
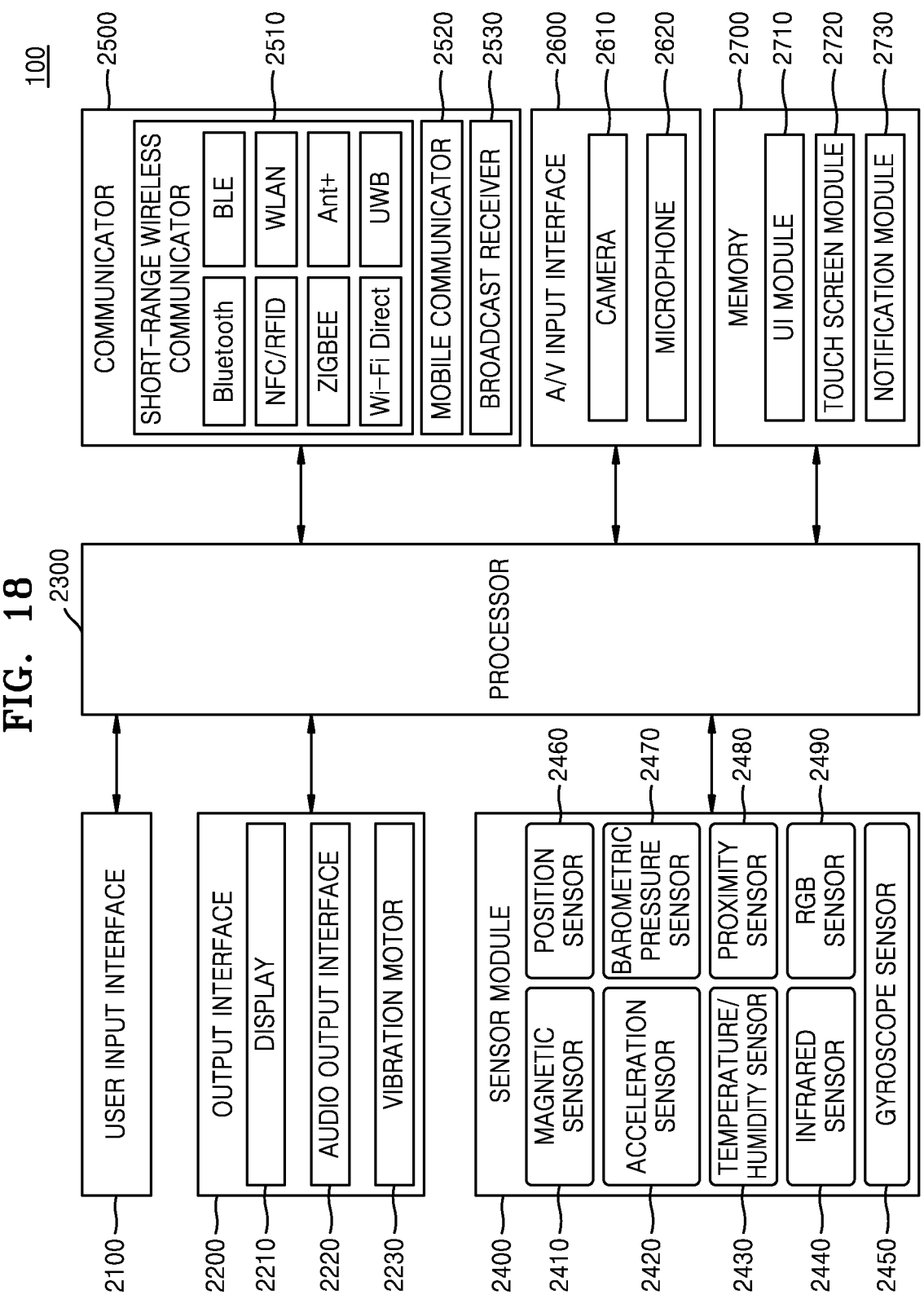
FIG. 18 illustrates a detailed block diagram of a voice assistant service providing apparatus according to an embodiment of the disclosure.

FIG. 17 illustrates a block diagram of a configuration of the voice assistant service providing apparatus 100 according to an embodiment of the disclosure.

According to an embodiment of the disclosure, the voice assistant service providing apparatus 100 may receive a first voice command from a user via a microphone 110. The microphone 110 may convert sound received from the user into the first voice command which is an electrical signal.

According to an embodiment of the disclosure, the processor 120 of the voice assistant service providing apparatus 100 may extract information related to the first voice command from the first voice command and transmit, via the communicator 130, the information related to the first voice command to a plurality of devices.

In detail, the processor 120 may include a speech recognizer 121 for performing speech recognition. According to an embodiment of the disclosure, the speech recognizer 121 may convert the first voice command into a first text via an auto speech recognition (ASR) module 122 and interpret the first text via an NLU module 123. The speech recognizer 121 may convert the first voice command into the first text and interpret the first text by using an AI neural network (NN) 141 designed for speech recognition.

By using a device determination model 142, a device determiner 129 of the processor 120 may determine, from among a plurality of candidate devices connected to the voice assistant service providing apparatus 100, a plurality of devices 200-1 through 200-3 to which the information related to the first voice command of the user is to be transmitted. The device determination model 142 may include a matching model for determination of relevance between a user's intent obtained from a result of interpreting the first text and each of the candidate devices. The device determiner 129 may determine, via the device determination model 142, a predetermined number of devices having a high probability of providing a service according to a user's intent from among the candidate devices.

According to an embodiment of the disclosure, the processor 120 of the voice assistant service providing apparatus 100 may transmit, via the communicator 130, information related to a voice command, which is output from the speech recognizer 121, to the plurality of devices 200-1 through 200-3.

The "information related to the voice command" transmitted to the plurality of devices 200-1 through 200-3 may include a result of processing the voice command. For example, the result of processing the voice command may include at least one of a feature vector extracted from a user's voice command, a text obtained by converting the user's voice command, a result output by performing NLU on the text, a type of service requested by the user's voice command, which is determined based on a result of interpreting the text, a volume of the user's voice command, or an SNR of the user's voice command.

According to an embodiment of the disclosure, the processor 120 of the voice assistant service providing apparatus 100 may transmit, to the plurality of devices 200-1 through 200-3, a result of interpreting a first text and information about a type of service requested by a first voice command. The speech recognizer 121 may extract text data representing an intent in a user's utterance according to a preset rule (e.g., the 5Ws and 1H rule) by performing natural language processing on the first text obtained by converting the first voice command. The processor 120 may transmit the text data extracted by the speech recognizer 121 to the plurality of devices 200-1 through 200-3 as the result of interpreting the first text. Furthermore, the speech recognizer 121 may determine, based on the result of interpreting the first text, whether a type of service requested by the first voice command is a notification or action.

When it is determined that the first voice command requests a device to perform a certain action (e.g., media playback, recording, power on/off, etc.), the speech recognizer 121 may determine that the type of service requested by the first voice command is an "action," and otherwise, the speech recognizer may determine that the type of service requested by the first voice command is a "notification".

For example, when a voice command "I'm hungry, what should I eat?" is received from the user, the voice assistant service providing apparatus 100 may transmit, to the plurality of devices 200-1 through 200-3, information indicating that a type of service requested by the voice command is a notification, together with text data (I'm hungry/what/should I eat) extracted from the voice command.

According to an embodiment of the disclosure, the plurality of devices 200-1 through 200-3 connected to the voice assistant service providing apparatus 100 may determine, based on the received information related to the first voice command, whether each device is able to provide a service in response to the first voice command. For example, the plurality of devices 200-1 through 200-3 may receive, from the voice assistant service providing apparatus 100, a result of interpreting the first text obtained by converting the first voice command and determine whether they are able to provide services based on the received result.

Each device may identify services providable by the corresponding device based on at least one of information about sub-devices (e.g., a screen, an input interface, etc.) constituting the device, information about software (e.g., an application, etc.) running on the device, or general context information (e.g., time information and location information) prestored in the device. Each device may determine whether a service capable of responding to the first voice command is included among the services identified as ones providable by the device.

Each device may determine whether a service corresponding to a type of service requested by the first voice command is included among the services identified as ones providable by the device. When at least one service corresponding to the type of service requested by the first voice command is included among the identified services, the device may determine whether a service capable of responding to the first voice command is included among the at least one service.

When the service capable of responding to the first voice command is included among the services identified as ones providable by the device, the device may determine that it is able to provide a service in response to information related to the first voice command.

When the device determines that it is able to provide a service in response to the first voice command, the device may generate a service provision message and transmit the service provision message to the voice assistant service providing apparatus 100. The device may generate a service provision message by selecting one service corresponding to the type of service requested by the first voice command from among services identified as ones providable by the device.

A "service provision message" means a message output by a device in response to information related to a user's voice command, which is received from the voice assistant service providing apparatus 100. For example, the service provision message may include at least one of information about whether the device is able to provide a service in response to a voice command, information about whether the device is included in a group related to the voice command, ID information of the device, ID information of a service provided by the device in response to the voice command, a type of the service, or ID information of an application used to provide the service.

According to an embodiment of the disclosure, the voice assistant service providing apparatus 100 may receive a service provision message from each of the plurality of devices 200-1 through 200-3. Furthermore, the voice assistant service providing apparatus 100 may further receive at least one of service provision history information or device information from each of the plurality of devices 200-1 through 200-3.

Service provision history information refers to information about a past history related to a service that has been provided or suggested by a device in response to information related to a certain voice command of the user, which is received from the voice assistant service providing apparatus 100. The service provision history information may include at least one of information about whether the device is able to provide a service in response to a voice command, the number of times that a service suggested by the device in response to the voice command was selected by the user, or context information (e.g., time information, location information of the user or device, etc.) when the service was selected in response to the voice command.

"Device information" refers to information about sub-devices constituting a device. In detail, the device information may include information about whether the device includes an I/O interface for receiving a user input from a user or providing information to the user and information related to performance of the I/O interface. For example, the device information may include information about at least one of whether the device includes a display, a resolution supported by the display, whether the device includes a microphone, an audio quality supported by the microphone, whether the device includes a speaker, a sound quality supported by the speaker, or a field of a service providable by the device.

According to an embodiment of the disclosure, the voice assistant service providing apparatus 100 may recommend a service suitable for the user from among services providable by the plurality of devices 200-1 through 200-3. The processor 120 of the voice assistant service providing apparatus 100 may include a service recommender 124 for recommending a service suitable for the user based on service provision messages received from the plurality of devices 200-1 through 200-3.

A group identification module 125 of the service recommender 124 may group the plurality of devices 200-1 through 200-3 based on at least one of a service provision message or service provision history information received from each of the plurality of devices 200-1 through 200-3.

Furthermore, when the plurality of devices 200-1 through 200-3 have not learned group information related to the first voice command, the group identification module 125 according to an embodiment of the disclosure may analyze pieces of service provision history information received from the plurality of devices 200-1 through 200-3 and determine, based on a result of the analysis, devices included in a first group corresponding to the first voice command of the user. The group identification module 125 may form a group of devices capable of providing services in response r to the first voice command.

The group identification module 125 may obtain, from service provision history information, information (isSupported data) about whether each device is able to provide a service in response to the first voice command. The group identification module 125 may identify, based on pieces of service provision history information received from the plurality of device 200-1 through 200-3, devices included in the first group corresponding to the first voice command of the user from among the plurality of devices 200-1 through 200-3. The group identification module 125 may output service provision messages received from the devices identified as being in the first group (hereinafter, referred to as 'service provision messages of the first group').

When the plurality of devices 200-1 through 200-3 have learned information about grouping of devices related to the first voice command, the group identification module 125 according to an embodiment of the disclosure may identify the devices in the first group based on group information included in service provision messages received from the plurality of devices 200-1 through 200-3. The group identification module 125 may obtain information about whether each device is included in a group related to the first voice command from a corresponding service provision message. The group identification module 125 may output service provision messages received from the first group of devices identified based on a service provision message for each device.

Next, a service selection module 126 of the service recommender 124 may select at least one service provision message from among the service provision messages received from the first group of devices.

According to an embodiment of the disclosure, the service selection module 126 may select all the service provision messages received from the first group of devices.

For example, the group identification module 125 may respectively receive a plurality of service provision messages from a plurality of devices in response to a voice command "Play music". The group identification module 125 may identify, based on information contained in the service provision messages, that a TV and a smartphone are included in a group corresponding to the received voice command. The service selection module 126 may select all service provision messages received from the TV and the smartphone included in the group and output the selected service provision messages.

According to another embodiment of the disclosure, the service selection module 126 may select at least one service provision message based on pieces of service provision history information and/or pieces of device information received from the first group of devices. The service selection module 126 may assign, based on the pieces of service provision history information and/or the pieces of device information, priorities or weights to the service provision messages of the first group and select at least one service provision message according to the assigned priorities or weights. For example, the service selection module 126 may assign priorities or weights to a plurality of service provision messages based on at least one of information about whether each device provides a service in response to the first voice command, a type of service provided by each device in response to the first voice command, the number of times that a service provided by each device in response to the first voice command was selected by the user, context information when the service was selected in response to the first voice command, or device information regarding sub-devices constituting each device.

For example, the service selection module 126 may select one service provision message having a highest priority assigned thereto or a plurality of service provision messages having a relatively high priority assigned thereto. As another example, the service selection module 126 may select at least one service provision message having an assigned weight greater than or equal to a threshold value.

For example, the group identification module 125 may receive a plurality of service provision messages from a plurality of devices in response to a voice command "Play music". The group identification module 125 may identify the TV and the smartphone as being included in the group corresponding to the received voice command based on information contained in the service provision messages. The service selection module 126 may assign a priority to a device according to speaker performance for the device based on pieces of device information regarding the TV and smartphone. The service selection module 126 may select, based on the assigned priority, a service provision message received from the TV offering highest speaker performance and output the selected service provision message.

According to an embodiment of the disclosure, the voice assistant service provision apparatus 100 may use the service recommendation model 143 to select at least one of the service provision messages of the first group. For example, the service recommendation model 143 may be an AI algorithm trained based on at least one of a voice command, service provision histories for a plurality of devices with respect to the voice command, or pieces of device information regarding the devices.

According to an embodiment of the disclosure, the service recommendation model 143 may select at least one service provision message from among the service provision messages of the first group by comprehensively taking into account the first voice command, current context information (e.g., a location of the voice assistant service providing apparatus 100, current time information, etc.), and service provision history information and device information of each device.

According to an embodiment of the disclosure, a response message generator 127 of the voice assistant service providing apparatus 100 may generate a response message to include information related to at least one service in the selected at least one service provision message. The response message generator 127 may include a NLG module for converting the selected at least one service provision message into a natural language that a human is able to understand and a TTS conversion module for converting a natural language text into a speech signal.

According to an embodiment of the disclosure, when the service selection module 126 selects two or more service provision messages, the response message generator 127 may arrange the selected service provision messages to generate a response message to be output.

For example, the service selection module 126 may select service provision messages for the TV and the smartphone from among a plurality of service provision messages that respond to a voice command "Play music". In this case, the response message generator 127 may output a response message saying "You can play music on TV or play music on the smartphone" by combining the selected service provision messages for the TV and smartphone. In this case, the user may listen to the output response message and decide which service to select.

According to another embodiment of the disclosure, when the service selection module 126 selects two or more service provision messages, the response message generator 127 may combine the selected service provision messages to generate and output a single response message.

For example, the service selection module 126 may select service provision messages for a wearable device and exercise equipment from among a plurality of service provision messages that respond to a voice command "Shall I do exercise?". In this case, the response message generator 127 may receive a service provision message for the wearable device, including a resulting text "You did strength training exercise yesterday, so I recommend aerobic exercise today," and a service message for the exercise equipment, including a resulting text "Exercise time may be set to 30 minutes." The response message generator 127 may generate and output a response message "Because you did strength training exercise yesterday, how about doing aerobic exercise for 30 minutes by using exercise equipment?" by combining the service provision messages for the wearable device and exercise equipment.

The response message generator 127 may learn resulting texts included in selected service provision messages to generate and output a response message in which the resulting texts are combined. For example, the response message generator 127 may analyze resulting texts and extract entities that are in the same or similar domains from the resulting texts. The response message generator 127 may generate a response message based on the extracted entities and a user's conversation history.

The response message generator 127 may use a response message generation model 145 for generating a response message to generate one response message by combining the selected service provision messages. For example, the response message generation model 145 may be an AI algorithm trained based on service provision messages, pieces of service provision history information, and pieces of device information received from a plurality of devices.

The response message generated by the response message generator 127 may be output via a speaker 150 of the voice assistant service providing apparatus 100. As described above, according to an embodiment of the disclosure, the voice assistant service providing apparatus 100 may suggest an optimal service preferred by the user from among various services provided by a plurality of devices, thereby allowing the user to conveniently communicate with a large number of devices and control the devices.

Moreover, the user may listen to the response message output in response to the first voice command and decide whether to accept a service suggested by the voice assistant service providing apparatus 100. The user may utter a second voice command or perform a certain operation based on the decision.

For example, in response to a first voice command "Play music," the voice assistant service providing device 100 may output a response message "Shall I play music on TV?" through the speaker 150. When the user decides to accept the service suggested by the voice assistant service providing apparatus 100, the user may utter a second voice command "Yes, play music on TV." When the user decides not to accept the service suggested by the voice assistant service providing apparatus 100, the user may utter a second voice command "No, play music through the smartphone".

According to an embodiment of the disclosure, the voice assistant service providing device 100 may determine, based on the second voice command received from the user, whether the user has decided to accept the service suggested by the voice assistant service providing device 100.

According to an embodiment of the disclosure, the voice assistant service providing apparatus 100 may train the service recommendation model 143 based on information related to the service selected by the user. The voice assistant service providing apparatus 100 may continuously train the service recommendation model 143 according to a user's voice command in order to suggest an optimal service preferred by the user from among various services provided by a plurality of devices.

FIG. 18 illustrates a detailed block diagram of a voice assistant service providing apparatus 100 according to an embodiment of the disclosure.

The voice assistant service providing apparatus 100 of FIG. 18 may include components corresponding to their counterparts of the voice assistant service providing apparatus 100 described with reference to FIGS. 16 and 17. For example, among the components shown in FIG. 18, a processor 2300 corresponds to the processor 120 shown in FIG. 16 or 17, and an output interface 2200 corresponds to the output interface or speaker 150 shown in FIG. 16 or 17.

The voice assistant service providing apparatus 100 of FIG. 18 may perform all the operations and functions of the voice assistant service providing apparatus 100 described with reference to FIGS. 1 through 17. Thus, components of the voice assistant service providing apparatus 100, which have not been described above, will be described.

Referring to FIG. 18, the voice assistant service providing apparatus 100 may include a user input interface 2100, an output interface 2200, a processor 2300, a sensor module 2400, a communicator 2500, an A/V input interface 2600, and a memory 2700.

The user input interface 2100 refers to a device via which a user inputs data for controlling an operation of the voice assistant service providing apparatus 100. Examples of the user input interface 2100 may include, but are not limited to, a keypad, a dome switch, a touch pad (a capacitive overlay type, a resistive overlay type, an infrared beam type, a surface acoustic wave type, an integral strain gauge type, a piezoelectric type, etc.), a jog wheel, and a jog switch. The user input interface 2100 may receive a user input to generate conversational information to be provided to the user.

The output interface 2200 may output an audio signal, a video signal, or a vibration signal, and include a display 2210, an audio output interface 2220, and a vibration motor 2230.

The vibration motor 2230 may output a vibration signal. For example, the vibration motor 2230 may output a vibration signal corresponding to an output of video data or audio data (e.g., a call signal reception sound, a message reception sound, etc.).

The sensor module 2400 may detect a status of the voice assistant service providing apparatus 100 or the surroundings thereof and transmit information about the detected status to the processor 2300.

The sensor module 2400 may include, but is not limited to, at least one of a magnetic sensor 2410, an acceleration sensor 2420, a temperature/humidity sensor 2430, an infrared sensor 2440, a gyroscope sensor 2450, a position sensor (e.g., a global positioning system (GPS)) 2460, a barometric pressure sensor 2470, a proximity sensor 2480, or an RGB sensor (an illuminance sensor) 2490. Because functions of the above-described sensors may be inferred intuitively by those of ordinary skill in the art, detailed descriptions thereof will be omitted below.

The communicator 2500 may include components for performing communication with another device. For example, the communicator 2500 may include a short-range wireless communicator 2510, a mobile communicator 2520, and a broadcast receiver 2530.

The short-range wireless communicator 2510 may include, but is not limited to, a Bluetooth communication module, a Near Field communication (NFC) module, a wireless local area network (WLAN) (or Wi-Fi) communication module, a Zigbee communication module, an Infrared Data Association (IrDA) communication module, a Wi-Fi direct (WFD) communication module, a ultra-wideband (UWB) communication module, and an Ant+ communication module.

The mobile communicator 2520 transmits or receives a wireless signal to or from at least one of a base station, an external terminal, or a server on a mobile communication network. In this case, the wireless signal may be a voice call signal, a video call signal, or data in any one of various formats according to transmission and reception of a text/multimedia message.

The broadcast receiver 2530 receives broadcast signals and/or broadcast-related information from the outside via a broadcast channel. The broadcast channel may include a satellite channel and a terrestrial channel. According to an embodiment of the disclosure, the voice assistant service providing apparatus 100 may not include the broadcast receiver 2530.

Furthermore, the communicator 1500 may exchange information for generating conversational information to be provided to a first user with another device and a server.

The A/V input interface 2600 for inputting an audio or video signal may include a camera 2610, a microphone 2620, etc. The camera 2610 may obtain an image frame such as a still or moving image via an image sensor in a video call mode or capture mode. An image captured via the image sensor may be processed by the processor 2300 or a separate image processor (not shown).

An image frame processed by the camera 2610 may be stored in the memory 2700 or transmitted to the outside via the communicator 2500. The camera 2610 may include two or more cameras depending on a configuration of the voice assistant service providing apparatus 100.

The microphone 2620 receives an external sound signal and process the sound signal as electrical audio data. For example, the microphone 2620 may receive a sound signal from an external device or a speaker. The microphone 2620 may use various noise removal algorithms to remove noise generated in the process of receiving an external sound signal.

The memory 2700 may store programs for processing or control operations performed by the processor 2300 or store data input to or output from the voice assistant service providing apparatus 100.

The memory 2700 may include at least one type of storage medium, i.e., at least one of a flash memory-type memory, a hard disk-type memory, a multimedia card micro-type memory, a card-type memory (e.g., an SD card or an XD memory), random access memory (RAM), static RAM (SRAM), read-only memory (ROM), electrically erasable programmable ROM (EEPROM), PROM, a magnetic memory, a magnetic disc, or an optical disc.

Programs stored in the memory 2700 may be categorized into a plurality of modules according to their functions, such as a user interface (UI) module, a speech recognition module, a voice assistant service provision module, a touch screen module, and a notification module. The UI module may provide, for each application, a specialized UI, a graphical UI (GUI), etc. interworking with the voice assistant service providing apparatus 100. The speech recognition module may provide a TTS function, an NLU function, etc. for recognizing a user's voice command. The voice assistant service provision module may determine a device to which a user's voice command is to be transmitted to generate a response message for the user's voice command, analyze service provision messages received from devices, and generate a response message based on a selected service provision message.

The touch screen module may detect a user's touch gesture on a touch screen and transmit information about the detected touch gesture to the processor 2300. According to some embodiments of the disclosure, the touch screen module may recognize and analyze a touch code. The touch screen module may be formed by separate hardware components including a controller.

The notification module may generate a signal for notifying the occurrence of an event in the voice assistant service providing apparatus 100. Examples of events occurring in the voice assistant service providing apparatus 100 include call signal reception, message reception, key signal input, and schedule notification. The notification module may output a notification signal in the form of a video signal via the display 2210, a notification signal in the form of an audio signal via the audio output interface 2220, and a notification signal in the form of a vibration signal via the vibration motor 2230.

A configuration of a device 200 operating by connecting to the voice assistant service providing apparatus 100 according to an embodiment of the disclosure will now be described in detail. Each component of the device 200 to be described below may perform a corresponding operation of the operation method of the device 200. Thus, descriptions that are already provided above are omitted.

Figure 19:
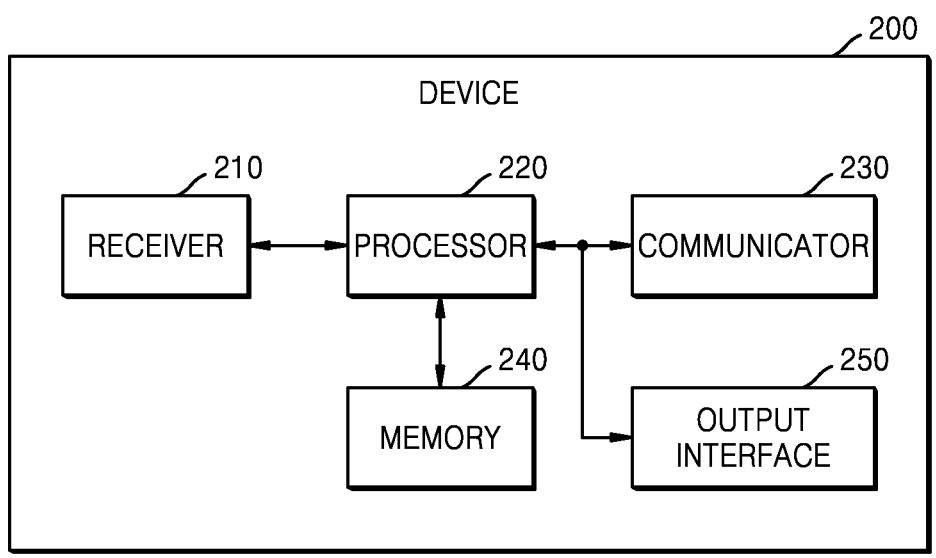
FIG. 19 illustrates a block diagram of a configuration of a device according to an embodiment of the disclosure.

FIG. 19 illustrates a block diagram of a configuration of the device 200 according to an embodiment of the disclosure.

According to an embodiment of the disclosure, the device 200 may be a mobile terminal or a fixed terminal implemented as a computer device. For example, the device 200 may be at least one of a smartphone, smart home appliances, a wearable device, a navigation device, a computer, a notebook computer, a digital broadcasting terminal, an AI speaker, a PDA, a PMP, or a tablet PC, but is not limited thereto. The device 200 may communicate with the voice assistant service providing apparatus 100, another device and/or a server through a network by using a wireless or wired communication method.

Referring to FIG. 19, the device 200 may include a receiver 210, a processor 220, a communicator 230, a memory 240, and an output interface 250. All components shown in FIG. 19 are not essential components of the device 200. The device 200 may be implemented with more or fewer components than those shown in FIG. 19. At least one component shown in FIG. 19 may perform operations described with reference to FIGS. 6 and 7. Thus, descriptions that are already provided above with respect to FIGS. 6 and 7 are omitted.

According to an embodiment of the disclosure, the receiver 210 may receive a voice command from a user. For example, the receiver 210 may receive a voice command by converting an external sound into electrical audio data via a microphone.

According to an embodiment of the disclosure, the memory 240 may store instructions for providing a voice assistant service, various models, neural networks, or dictionary information used for speech recognition, etc.

According to an embodiment of the disclosure, by executing one or more instructions stored in the memory 240, the processor 220 may control the receiver 210, the communicator 230, and the output interface 250 to provide a voice assistant service according to various embodiments of the disclosure. Although FIG. 19 shows that the device 200 includes one processor 220, the disclosure is not limited to the illustrated embodiment. The device 200 may include a plurality of processors. When the device 200 includes a plurality of processors, operations and functions of the processor 220 to be described later may be partially performed by the processors.

First, the processor 220 may receive, via the communicator 230, information related to a first voice command from the voice assistant service providing apparatus 100.

The information related to the first voice command received by the processor 220 of the device 200 from the voice assistant service providing apparatus 100 may include an audio signal of the first voice command itself of the user or a result of processing the first voice command. For example, the processor 220 may receive, as the information related to the first voice command, a result of analyzing a first text and information about a type of service requested by the first voice command.

According to an embodiment of the disclosure, the processor 220 may determine whether the device 200 is able to provide a service in response to the information related to the first voice command.

The processor 220 may identify services providable by the device 200 based on information about sub-devices (e.g., a screen, an input interface, etc.) constituting the device 200, information about software such as an application running on the device 200, and information prestored in the device 200 (e.g., current time information and location information of the device 200).

For example, the processor 220 may identify services providable by the device 200 based on at least one of information about sub-devices constituting the device 200, current time information, or location information of the device 200. When a service corresponding to the type of service requested by the first voice command is included among the services identified as ones providable by the device 200, the processor 220 may determine that the device 200 is able to provide a service in response to the information of the first voice command.

When the processor 220 determines that the device 200 is able to provide a service in response to the information related to the first voice command, the processor 220 may generate a service provision message to be transmitted to the voice assistant service providing apparatus 100. The service provision message may include information related to a service suggested by the device 200 in response to the information related to the first voice command received from the voice assistant service providing apparatus 100.

For example, the service provision message may include at least one of information about whether the device 200 is able to provide a service in response to a voice command, information about whether the device 200 is included in a group related to the voice command, ID information of the device 200, ID information of a service provided by the device 200 in response to the voice command, a type of the service, or ID information of an application used to provide the service.

According to an embodiment of the disclosure, the processor 220 of the device 200 may transmit a service provision message and service provision history information.

The service provision history information refers to information about a past history related to a service provided or suggested by the device 200 in response to the information related to the first voice command. For example, the service provision history information may include at least one of information about whether the device 200 is able to provide a service in response to a voice command, the number of times that a service suggested by the device 200 in response to the voice command was selected by the user, or context information (e.g., time information, location information, etc.) when the service was selected in response to the voice command.

On the other hand, when the processor 220 determines that the device 200 is unable to provide a service in response to the information related to the first voice command, the processor 220 may transmit, via the communicator 230, a message indicating that provision of the service is not supported.

Furthermore, the processor 220 may receive, via the communicator 230, information related to the service selected by the user from the voice assistant service providing apparatus 100. The processor 220 may update service provision history information stored in the memory 240 based on the received information.

According to the disclosure, functions related to AI may operate via a processor and a memory. The processor may be configured as one or a plurality of processors. In this case, the one or plurality of processors may be a general-purpose processor such as a CPU, an application processor (AP), or a digital signal processor (DSP), a dedicated graphics processor such as a graphics processing unit (GPU) or a vision processing unit (VPU), or a dedicated AI processor such as a neural processing unit (NPU). The one or plurality of processors may control input data to be processed according to predefined operation rules or an AI model stored in the memory. Alternatively, when the one or more processors are a dedicated AI processor, the dedicated AI processor may be designed with a hardware structure specialized for processing a particular AI model.

The predefined operation rules or AI model may be created via a training process. The creation via the training process means that the predefined operation rules or AI model set to perform desired characteristics (or purpose) are created by training a basic AI model based on a large number of training data via a learning algorithm. The training process may be performed by an apparatus itself in which AI is performed or via a separate server and/or system. Examples of a learning algorithm may include, but are not limited to, supervised learning, unsupervised learning, semi-supervised learning, and reinforcement learning.

An AI model may include a plurality of neural network layers. Each of the neural network layers has a plurality of weight values and may perform neural network computations via calculations between a result of computations in a previous layer and a plurality of weight values. A plurality of weight values assigned to each of the neural network layers may be optimized based on a result of training the AI model. For example, a plurality of weight values may be modified to reduce or minimize a loss or cost value obtained in the AI model during a training process. An artificial neural network may include a deep neural network (DNN) and may be, for example, a convolutional neural network (CNN), a DNN, a recurrent neural network (RNN), a restricted Boltzmann machine (RBM), a deep belief network (DBN), a bidirectional recurrent DNN (BRDNN), or deep Q-networks (DQN) but is not limited thereto.

Furthermore, embodiments of the disclosure may be implemented as a software program including instructions stored in computer-readable storage media.

A computer refers to a device configured to retrieve an instruction stored in a computer-readable storage medium and to operate, in response to the retrieved instruction, and may include a voice assistant service providing apparatus and a device according to embodiments of the disclosure.

The computer-readable storage medium may be provided in the form of a non-transitory storage medium. In this regard, the term 'non-transitory' only means that the storage medium does not include a signal and is a tangible device, and the term does not differentiate between where data is semi-permanently stored in the storage medium and where the data is temporarily stored in the storage medium.

Furthermore, voice assistant service providing apparatuses or methods according to embodiments of the disclosure may be provided in the form of a computer program product. The computer program product may be traded, as a product, between a seller and a buyer.

The computer program product may include a software program and a computer-readable storage medium having stored thereon the software program. For example, the computer program product may include a product (e.g. a downloadable application) in the form of a software program electronically distributed by a manufacturer of the electronic device or through an electronic market (e.g., Google Play Store™ and App Store™). For such electronic distribution, at least a part of the software program may be stored on the storage medium or may be temporarily generated. In this case, the storage medium may be a storage medium of a server of the manufacturer, a server of the electronic market, or a relay server for temporarily storing the software program.

In a system consisting of a server and a terminal (e.g., a voice assistant service providing apparatus or device), the computer program product may include a storage medium of the server or a storage medium of the terminal. Alternatively, in a case where there is a third device (e.g., a smartphone) communicatively connected to the server or the terminal, the computer program product may include a storage medium of the third device. Alternatively, the computer program product may include a software program itself that is transmitted from the server to the terminal or the third device or that is transmitted from the third device to the terminal.

In this case, one of the server, the terminal, and the third device may execute the computer program product to perform methods according to embodiments of the disclosure. Alternatively, at least two of the server, the terminal, and the third device may execute the computer program product to perform the methods according to embodiments of the disclosure in a distributed manner.

For example, the server (e.g., a cloud server, an AI server, or the like) may execute the computer program product stored in the server to control the terminal communicatively connected to the server to perform the methods according to embodiments of the disclosure.

As another example, the third device may execute the computer program product to control the terminal communicatively connected to the third device to perform the methods according to embodiments of the disclosure.

In a case where the third device executes the computer program product, the third device may download the computer program product from the server, and may execute the downloaded computer program product. Alternatively, the third device may execute the computer program product that is pre-loaded therein, and may perform the methods according to the embodiments of the disclosure.

According to an embodiment of the disclosure, a voice assistant service providing apparatus may suggest an optimal service preferred by a user from among various services provided by a plurality of devices, thereby allowing the user to conveniently communicate with a large number of devices and control the devices.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for providing a voice assistant service, the method comprising:
    receiving a first voice command from a user;
    determining, from among a plurality of candidate devices, a plurality of devices for the first voice command;
    transmitting, to the plurality of devices, information related to the first voice command;
    receiving, from the plurality of devices, a plurality of service provision messages generated in response to receiving the first voice command and a plurality of pieces of service provision history information of the plurality of devices, wherein the service provision history information includes time information indicating a current time when a service is selected in response to receiving the first voice command,
    identifying a type of the service requested by the first voice command, comprising a first type and a second type, wherein the plurality of devices is prioritized based on the time information indicating the current time and location information of the plurality of devices when the type of the service is identified as the first type and the plurality of devices is prioritized based on device information when the type of the service is identified as the second type;
    selecting, based on the plurality of the pieces of service provision history information, at least one of the plurality of service provision messages; and
    outputting, based on a selection of the at least one of the plurality of service provision messages, a response message in response to receiving the first voice command.

2. The method of claim 1, wherein determining the plurality of devices comprises:
    converting the first voice command into a first text;
    interpreting the first text by using a natural language understanding (NLU) model;
    determining an intent of the user based on a result of the interpreting of the first text; and
    determining, based on a relevance between the intent of the user and each of the plurality of candidate devices, the plurality of devices for the first voice command, from among the plurality of candidate devices.

3. The method of claim 2, wherein determining the plurality of devices based on the relevance comprises:
    obtaining a plurality of pieces of the device information, respectively, regarding the plurality of candidate devices;
    obtaining, based on the plurality of pieces of the device information, a plurality of probability values indicating a degree of the relevance between the intent of the user and each of the plurality of candidate devices; and determining the plurality of devices including probability values that are greater than or equal to a threshold value.

4. The method of claim 1, wherein a first service provision message received from a first device among the plurality of devices includes at least one of information whether the first device is able to provide the service in response to receiving the first voice command, information whether the first device is included in a first group, identification information of the first device, identification information of a first service provided by the first device in response to receiving the first voice command, a type of the first service, or identification information of an application used to provide the first service.

5. The method of claim 4, wherein selecting the at least one of the plurality of service provision messages comprises:
identifying, from among the plurality of devices, one or more devices included in the first group; and
selecting, based on the plurality of pieces of service provision history information of the identified one or more devices, at least one service provision message from among the plurality of service provision messages received from the identified one or more devices.

6. The method of claim 1, wherein each of the plurality of devices is capable of providing the service based on information for sub-devices including at least one of a screen or an input interface in response to receiving the first voice command.

7. The method of claim 1, wherein:
receiving the plurality of service provision messages and the plurality of pieces of service provision history information comprises, respectively, receiving, from the plurality of devices, a plurality of pieces of the device information, each piece of the device information regarding sub-devices constituting a corresponding device, together with the plurality of service provision messages and the plurality of pieces of service provision history information, and
selecting the at least one of the plurality of service provision messages comprises selecting at least one of the plurality of service provision messages, based on the plurality of pieces of the device information regarding the plurality of devices and the plurality of pieces of service provision history information thereof.

8. The method of claim 1, wherein selecting the at least one of the plurality of service provision messages comprises selecting at least one of the plurality of service provision messages by using a service recommendation model, and
wherein the service recommendation model comprises:
an artificial intelligence (AI) algorithm trained based on a voice command,
service provision histories for the plurality of devices with respect to the voice command, and
a plurality of pieces of the device information regarding the plurality of devices.

9. The method of claim 1, wherein selecting the at least one of the plurality of service provision messages comprises:
assigning priorities to the plurality of service provision messages based on at least one of information whether each device provides the service in response to receiving the first voice command, the type of the service provided by each device in response to receiving the first voice command, a number of times that the service provided by each device in response to receiving the first voice command was selected, context information when the service was selected in response to receiving the first voice command, or the device information regarding sub-devices constituting each device; and
selecting at least one of the plurality of service provision messages, based on the assigned priorities.

10. The method of claim 1, wherein selecting the at least one of the plurality of service provision messages comprises:
assigning priorities to the plurality of service provision messages based on at least one of information whether each device provides the service in response to receiving the first voice command, the type of the service provided by each device in response to receiving the first voice command, a number of times that the service provided by each device in response to receiving the first voice command was selected, context information obtained when the service provided by each service in response to receiving the first voice command was selected, or the device information regarding sub-devices constituting each device; and
selecting, based on the assigned priorities, two or more service provision messages from among the plurality of service provision messages.

11. The method of claim 1, wherein:
each of the plurality of service provision messages, respectively, received from the plurality of devices includes information related to the service provided by each of the plurality of devices in response to receiving the first voice command; and
the outputting of the response message in response to receiving the first voice command comprises:
generating the response message to include information related to at least one service in the selected at least one of the plurality of service provision messages; and
outputting the response message.

12. The method of claim 1, wherein:
selecting the at least one of the plurality of service provision messages comprises:
identifying, based on the plurality of service provision messages, one or more devices included in a first group from among the plurality of devices; and
by using a service recommendation model, selecting, based on the plurality of pieces of service provision history information of the identified one or more devices, at least one service provision message from among the plurality of service provision messages received from the identified one or more devices, and
the method further comprising:
receiving a second voice command from the user;
determining, based on the second voice command, the service selected by the user from among services provided by the plurality of devices in response to receiving the first voice command;
transmitting information related to the service selected by the user to the plurality of devices; and
training the service recommendation model by using the information related to the service selected by the user.

13. An apparatus for providing a voice assistant service, the apparatus comprising:
a receiver configured to receive a command from a user;
a communicator;
memory configured to store voice assistant program including one or more instructions; and at least one processor operably connected to the receiver, the communicator, the memory, and, where the processor is configured to:
control the receiver to receive a first voice command from the user;
determine, from among a plurality of candidate devices, a plurality of devices to that the first voice command is to be transmitted;
control the communicator to transmit information related to the first voice command to the plurality of devices and respectively receive, from the plurality of devices, a plurality of service provision messages generated in response to receiving the first voice command and a plurality of pieces of service provision history information of the plurality of devices, wherein the service provision history information includes time information indicating a current time when a service is selected in response to receiving the first voice command;
identify a type of the service requested by the first voice command, comprising a first type and a second type, wherein the plurality of devices is prioritized based on the time information indicating the current time and location information of the plurality of devices when the type of the service is identified as the first type and the plurality of devices is prioritized based on device information when the type of the service is identified as the second type;
select, based on the plurality of pieces of service provision history information, at least one of the plurality of service provision messages; and
output, based on a selection of the at least one of the plurality of service provision message, a response message in response to receiving the first voice command.

14. The apparatus of claim 13, wherein a first service provision message received from a first device among the plurality of devices includes at least one of information whether the first device is included in a first group, identification information of the first device, identification information of a first service provided by the first device in response to receiving the first voice command, a type of the first service, or identification information of an application used to provide the first service.

15. The apparatus of claim 14, wherein the at least one processor is further configured to:
identify, from among the plurality of devices, one or more devices included in the first group; and
select, based on the plurality of pieces of service provision history information of the identified one or more devices, at least one service provision message from among the plurality of service provision messages received from the identified one or more devices.

16. The apparatus of claim 13, wherein service provision history information of a first device includes at least one of a number of times that a first service suggested by the first device in response to receiving the first voice command was selected by the user or context information obtained when the first service was selected in response to receiving the first voice command.

17. The apparatus of claim 13, wherein:
the communicator is configured to respectively receive, from the plurality of devices, a plurality of pieces of the device information, each piece of the device information regarding sub-devices constituting a corresponding device and the at least one processor is further configured to select at least one of the plurality of service provision messages based on the plurality of pieces of the device information regarding the plurality of devices and the plurality of pieces of service provision history information thereof.

18. The apparatus of claim 13, wherein the at least one processor is further configured to select at least one of the plurality of service provision messages by using a service recommendation model, and
wherein the service recommendation model comprises an artificial intelligence (AI) algorithm trained based on a voice command, service provision histories for the plurality of devices with respect to the voice command, and a plurality of pieces of the device information regarding the plurality of devices.

19. The apparatus of claim 13, wherein:
the at least one processor is further configured to:
identify, based on the plurality of service provision messages, one or more devices included in a first group from among the plurality of devices; and
by using a service recommendation model, select, based on the plurality of pieces of service provision history information of the identified one or more devices, at least one service provision message from among the plurality of service provision messages received from the identified one or more devices,
the receiver is further configured to further receive a second voice command; and
the at least one processor is further configured to:
determine, based on the second voice command, the service selected by the user from among services provided by the plurality of devices in response to receiving the first voice command,
control the communicator to transmit information related to the service selected by the user to the plurality of devices, and
train the service recommendation model by using the information related to the service selected by the user.

20. A non-transitory computer-readable medium embodying a computer program, the computer program comprising computer readable program code that when executed by a processor of an electronic device causes processor to:
receive a first voice command from a user;
determine, from among a plurality of candidate devices, a plurality of devices that the first voice command is to be transmitted;
transmit information related to the first voice command to the plurality of devices;
respectively receive, from the plurality of devices, a plurality of service provision messages generated in response to receiving the first voice command and a plurality of pieces of service provision history information of the plurality of devices, wherein the service provision history information includes time information indicating a current time when a service is selected in response to receiving the first voice command, and
identify a type of the service requested by the first voice command, comprising a first type and a second type, wherein the plurality of devices is prioritized based on the time information indicating the current time and location information of the plurality of devices when the type of the service is identified as the first type and the plurality of devices is prioritized based on device information when the type of the service is identified as the second type;

select, based on the plurality of pieces of service provision history information, at least one of the plurality of service provision messages; and output, based on a selection of the at least one of the plurality of service provision messages, a response message in response to receiving the first voice command.

* * * * *